United States Patent
Ohta et al.

(10) Patent No.: US 7,161,744 B2
(45) Date of Patent: Jan. 9, 2007

(54) OBJECTIVE LENS AND OPTICAL PICKUP APPARATUS

(75) Inventors: Tatsuo Ohta, Otsuki (JP); Takashi Nozaki, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 93 days.

(21) Appl. No.: 11/097,159

(22) Filed: Apr. 4, 2005

(65) Prior Publication Data

US 2005/0225879 A1    Oct. 13, 2005

(30) Foreign Application Priority Data

Apr. 7, 2004    (JP)    ............................. 2004-113166

(51) Int. Cl.
- G02B 13/24   (2006.01)
- G02B 1/10    (2006.01)
- G02B 13/14   (2006.01)

(52) U.S. Cl. ...................... 359/719; 359/581; 359/586; 359/355

(58) Field of Classification Search ................ 359/355, 359/581, 586, 719, 722
See application file for complete search history.

(56) References Cited

U.S. PATENT DOCUMENTS 6,813,096 B1 *  11/2004  Ohta ......................... 359/719

* cited by examiner

Primary Examiner—David N. Spector
(74) Attorney, Agent, or Firm—Finnegan, Henderson, Farabow, Garrett & Dunner, L.L.P.

(57) ABSTRACT

An objective lens for converging a monochromatic light flux having a specific wavelength in a range of 350 to 450 nm on an optical information recording medium while the objective lens is placed facing the optical information recording medium, the objective lens comprising: a lens body containing a polymer resin having an alicyclic structure; a first film having a refractive index of less than 1.7 for light having a wavelength of 405 nm; a second film having a refractive index of 1.7 or more for the light having the wavelength of 405 nm; and a third film having a refractive index of 1.55 or less for the light having the wavelength of 405 nm, wherein: the first film, the second film and the third film are provided on the lens body; the first film is provided between the lens body and the second film; the second film is provided between the first film and the third film; and a thickness of the first film is in a range of 50 to 15000 nm.

15 Claims, 7 Drawing Sheets

OBJECTIVE LENS AND OPTICAL PICKUP APPARATUS

This application is based on Japanese Patent Application No. 2004-113166 filed on Apr. 7, 2004 in Japanese Patent Office, the entire content of which is hereby incorporated by reference.

TECHNICAL FIELD

The present invention relates to an objective lens converging a monochromatic light flux having a wavelength of 350 to 450 nm on an optical information recording medium and an optical pickup apparatus equipped with the objective lens.

BACKGROUND

In recent years, various sizes of optical elements have been manufactured and put into market, for example, from large size optical elements utilized as such as a telescope lens and a microscope lens to small size optical elements, for example, pickup lenses of such as CD (Compact Disc) and DVD (Digital Video Disc). Specifically, development of an optical pickup lens (an objective lens) applicable to at least one of BD (Blue-ray Disc), CD and DVD has been actively carried out in accordance with a proposal of a standard on BD or AOD (Advanced Optical Disc). On these optical elements, a functional layer depending on applications is generally formed to obtain a specific property determined by a combination of the function of the layer and a wavelength range of light irradiated to the functional layer.

For example, in Patent Document 1, disclosed is an optical element on which an antireflection layer is formed, and the antireflection layer works on a transmitting light of an ultraviolet region. On this optical element, a film of a high refractive index material (12) prepared from neodymium fluoride is formed directly on a synthetic quartz substrate (11) and a film of a low refractive index material (13) prepared from aluminum fluoride is formed directly on the high refractive index film. In Patent Document 1, it has been proved that the optical element exhibited a sufficient antireflective function (refer to paragraph Nos. 0016–0019, FIGS. 1 and 2).

Since ultraviolet light has a short wavelength and large energy of light, a technique to provide a film exhibiting a different refractive index on the surface of a lens body, as disclosed in Patent Document 1, is useful to obtain an antireflective function. However, an objective lens having a high refractive index antireflection film on a lens body made of a resin tends to have a problem in that the lens surface facing to an optical information recording medium is deformed or abrasion resistance of the antireflection film decreases due to a local heat generated at the surface and subsequently conveyed to the lens body, the local heat being generated when the antireflection film absorbs the energy of light at the surface facing to the optical information recording medium side surface. This may be a bigger problem for an antireflection film having an refractive index of 1.7 or more. When the generated local heat is conveyed to the lens body, due to the difference in thermal expansion coefficients of the antireflection film and the lens body, the abrasion resistance of the antireflection film may be reduced. Further, when an additive is used in a resin forming a lens body, oxidation or deterioration of the additive may occur and enhances the reduction of abrasion resistance or deformation of the lens surface.

(Patent Document 1) Japanese Patent Publication Open to Public Inspection (hereafter referred to as JP-A) No. 8-179103.

SUMMARY OF THE INVENTION

An object of the present invention is to improve abrasion resistance of an antireflection film and to prevent deformation of surface of an objective lens which transmits blue light of a short wavelength range of 350 to 450 nm.

One of the aspects of the present invention is an objective lens for converging a monochromatic light flux having a specific wavelength in a range of 350 to 450 nm on an optical information recording medium while the objective lens is placed facing the optical information recording medium, the objective lens containing: a lens body containing a polymer resin having an alicyclic structure; a first film having a refractive index of less than 1.7 for light having a wavelength of 405 nm; a second film having a refractive index of 1.7 or more for the light having the wavelength of 405 nm; and a third film having a refractive index of 1.55 or less for the light having the wavelength of 405 nm, wherein: the first film, the second film and the third film are provided on the lens body; the first film is provided between the lens body and the second film; the second film is provided between the first film and the third film; and a thickness of the first film is in a range of 50 to 15000 nm.

DESCRIPTION OF THE PREFERRED EMBODIMENTS

Figure 1:
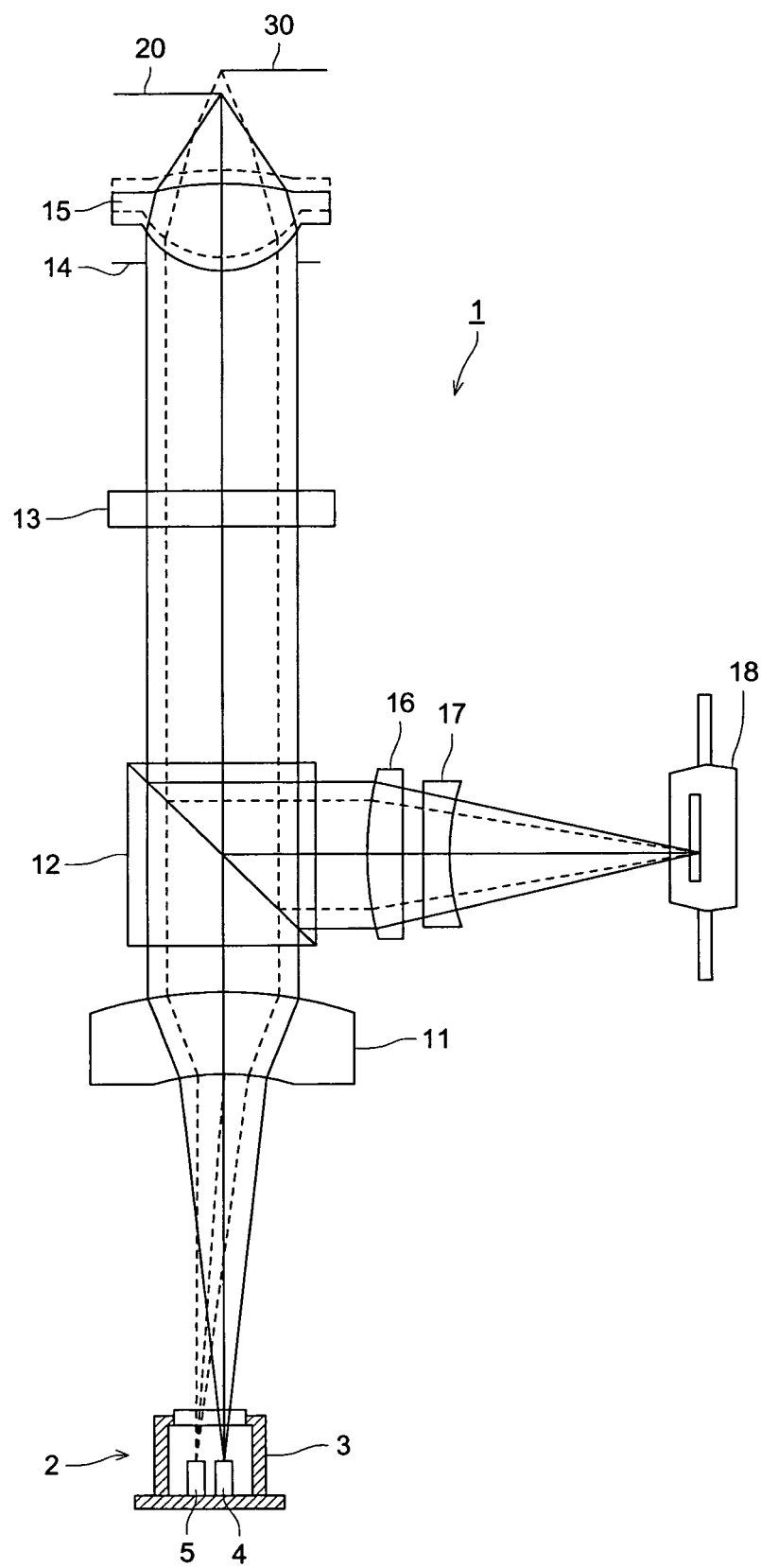
FIG. 1 is a schematic cross-section view of the optical pickup apparatus.

The above object of the present invention is achieved by the following structures.

(1) An objective lens for converging a monochromatic light flux having a specific wavelength in a range of 350 to 450 nm on an optical information recording medium while the objective lens is placed facing the optical information recording medium, the objective lens containing:

a lens body contains a polymer resin having an alicyclic structure;

a first film having a refractive index of less than 1.7 for light having a wavelength of 405 nm;

a second film having a refractive index of 1.7 or more for the light having the wavelength of 405 nm; and a third film having a refractive index of 1.55 or less for the light having the wavelength of 405 nm, wherein:
the first film, the second film and the third film are provided on the lens body;
the first film is provided between the lens body and the second film;
the second film is provided between the first film and the third film; and
a thickness of the first film is in a range of 50 to 15000 nm.
(2) The objective lens of Item 1, wherein the thickness of the first film is in a range of 100 to 15000 nm.
(3) The objective lens of Item 1, wherein the thickness of the first film is in a range of 500 to 12000 nm.
(4) The objective lens of any one of Items (1) to (3), wherein the first film contains a material selected from the group consisting of:
silicon oxide, magnesium fluoride, aluminum fluoride, yttrium fluoride, lead fluoride, cerium fluoride, neodymium fluoride, lanthanum fluoride, aluminum oxide and a mixture thereof.
(5) The objective lens of any one of Items (1) to (4), wherein the second film contains a material selected from the group consisting of:
hafnium oxide, zirconium oxide, yttrium oxide, lanthanum oxide, lanthanum aluminate, lanthanum titanate, praseodymium titanate, tantalum oxide, titanium oxide, niobium oxide and a mixture thereof.
(6) The objective lens of any one of Items (1) to (5), wherein the third film contains a material selected from the group consisting of:
silicon oxide, magnesium fluoride, aluminum fluoride, yttrium fluoride and a mixture thereof; and
a mixture of silicon oxide and aluminum oxide.
(7) The objective lens of any one of Items (1) to (6), wherein a refractive index of the first film for the light having the wavelength of 405 nm lies within ±10% of a refractive index of the lens body for the light having the wavelength of 405 nm.
(8) The objective lens of any one of Items (1) to (7), wherein the polymer resin forming the lens body contains an alicyclic hydrocarbon copolymer having a weight average molecular weight (Mw) of 1,000 to 1,000,000, wherein the copolymer contains:
repeat unit (a) having a alicyclic structure represented by Formula (1); and
repeat unit (b) having a chain structure represented by Formula (2) or Formula (3),
provided that:
a total weight of repeat units (a) and repeat units (b) is 90% by weight or more; and
a total weight of repeat units (b) is 1% by weight or more and less than 10% by weight,

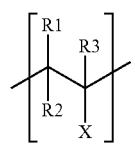

Formula (1)

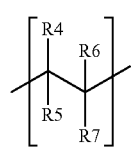

Formula (2)

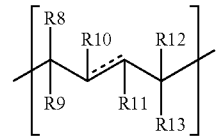

Formula (3)

where in Formula (1), X represents an alicyclic hydrocarbon group, R1 through R13 in Formulae (1), (2) and (3) each independently represent a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group), and in Formula (3), "......" represents a carbon-carbon saturated bond or a carbon-carbon unsaturated bond.
(9) The objective lens of Item (8), wherein the polymer resin forming the lens body contains a block polymer comprising polymer block [A] and polymer block [B], wherein:
polymer block [A] contains a first repeating unit represented by Formula (11);
polymer block [B] contains repeating units of one of the following combinations:
(i) a combination of the first repeating unit represented by Formula (11) and a second repeating unit represented by Formula (12);
(ii) a combination of the first repeating unit represented by Formula (11) and a third repeating unit represented by Formula (13); and
(iii) a combination of the first repeating unit represented by Formula (11), the second repeating unit represented by Formula (12) and the third repeating unit represented by Formula (13),

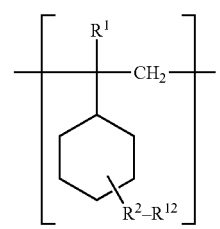

Formula (11)

where in Formula (11), $R^1$ represents a hydrogen atom or an alkyl group having a carbon number of 1 to 20, $R^2$ through $R^{12}$ each independently represent a hydrogen atom, an alkyl group having a carbon number of 1 to 20, a hydroxyl group, an alkoxy group having a carbon number of 1 to 20 or a halogen group,

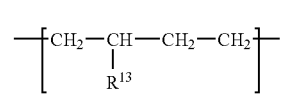

Formula (12)

where, in Formula (12), $R^{13}$ represents a hydrogen atom or an alkyl group having a carbon number of 1 to 20,

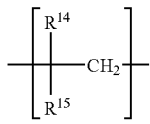

Formula (13)

where, in Formula (13), $R^{14}$ and $R^{15}$ each independently represent a hydrogen atom or an alkyl group having a carbon number of 1 to 20.

(10) The objective lens of any one of Items (1) to (7), wherein the polymer resin forming the lens body contains hydrogenated norbornene ring-opening polymer.

(11) The objective lens of any one of Items (1) to (10), wherein the lens body has thereon the first film, the second film and the third film on a surface facing to the optical information recording medium.

(12) The objective lens of any one of Items (1) to (11), wherein the lens body contains:

a first optical element arranged at the light source side of the lens body; and a second optical element arranged at the optical information recording medium side of the lens body, wherein the second optical element has a positive paraxial power and the objective lens satisfies Formula (41) and Formula (42), $$|P1/P2| \leq 0.2 \quad \text{Formula (41)}$$

$$0.8 \leq d_2/f_2 \leq 1.8 \quad \text{Formula (42)}$$

wherein:

in Formula (41), P1 represents a paraxial power of the first optical element and P2 represents the paraxial power of the second optical element; and in Formula (42), $d_2$ represents a thickness of the second optical element on an optical axis and $f_2$ represents a focal length of the second optical element.

(13) The objective lens of any one of Items (1) to (11), wherein the lens body contains:

a first optical element on a surface of the lens body facing a light source; and a second optical element on a surface of the lens body facing to the optical information recording medium, wherein the first optical element and the second optical element each has a positive paraxial power and the objective lens satisfies Formula (51) and Formula (52), $$0.8 \leq NA \quad \text{Formula (51)}$$

$$0.2 \leq \beta < 0.5 \quad \text{Formula (52)}$$

wherein:

in Formula (51), NA represents a numerical aperture on a image side; and in Formula (52), β represents a lens magnification of the second optical element.

(14) The objective lens of any one of Items (1) to (11), wherein the lens body contains a single constituent, and the objective lens satisfies Formula (60), $$0.8 \leq d/f \leq 1.8 \quad \text{Formula (60)}$$

where, in Formula (60), d represents a thickness of the objective lens on an optical axis, and f represents a focal length of the objective lens for a light flux having a wavelength of 405 nm.

(15) An optical pickup apparatus containing the objective lens of any one of Items (1) to (14) and a light source emitting the monochromatic light having the specific wavelength in the range of 350 to 450 nm.

In the invention described in Items (1) to (14), since the first layer having a refractive index of less than that of the second layer is arranged between a lens body and the second layer, it is possible to reduce conduction of heat, which is generated in the third layer surface, to the lens body by the presence of said first layer, and in addition, since the thickness of the first layer is 50 to 15000 nm, it is possible to reduce conduction of heat generated in the third layer surface to the lens body by the presence of said first layer. Therefore, it is possible to improve abrasion resistance of the first, second and third layers as well as restrain deformation of the lens body surface, even when blue light of a short wavelength of 350 to 450 nm having a large energy is treated as a transmitting light.

In the invention described in Item 15, since an optical pickup apparatus is equipped with the objective lens described in any one of Items 1 to 11, abrasion resistance of the first, second and third layers of said objective lens can be improved as well as deformation of the lens body surface can be depressed.

In the following, the best embodiment to practice this invention will be explained referring to the drawings. However, the present invention is not limited thereto.

FIG. 1 is a schematic cross-section view of optical pickup apparatus 1.

As shown in FIG. 1, optical pickup apparatus 1 is provided with light source unit 2. Light source unit 2 is provided with a box form basket 3 the upper portion in FIG. 1 of which is constituted of a light transmitting board. Inside basket 3, arranged are blue light source 4 (laser diode), which emits monochromatic light (laser) of a specific wavelength (such as 405 nm and 407 nm) within 350–450 nm for a BD or an AOD (HD DVD), and red light source 5 (laser diode), which emits monochromatic light (laser) of a specific wavelength within 620–680 nm for a DVD.

Light (blue light) emitted from blue light source 4 is transmitted, as light illustrated by a solid line in FIG. 1, through the light transmitting board of basket 3 toward the transmitting direction as it is, and light (red light) emitted from red light source 5 is transmitted, as light illustrated by a broken line in FIG. 1, through the light transmitting board of basket 3 toward the transmitting direction as it is.

Along the light axis direction of each light emitted from blue light source 4 and red light source 5, collimator 11, splitter 12, ¼ wavelength plate 13, iris member 14 and objective lens 15 are arranged in this order from the downward to the upward in FIG. 1, and BD or AOD 20 or DVD 30 as an optical information recording medium is to be placed at the position opposing to objective lens 15. On the light side in FIG. 1 of splitter 12, cylindrical lens 16, concave lens 17 and sensor 18 are arranged in this order from the left side to the light side in FIG. 1.

Objective lens 15 according to this invention is arranged to be opposed to BD or AOD 20, or DVD 30 as an optical information recording medium, and is provided with a function to converge each light emitted from blue light source 4 and red light source 5 onto BD or AOD 20, or DVD 30. Objective lens 15 is arranged freely transferable in the up and down directions in FIG. 1, and it is placed at the position shown by a solid line in FIG. 1 in the case of reading information of BD or AOD 20 while it is placed at the position shown by a broken line in FIG. 1 in the case of reading information of DVD 30.

Movement and action in optical pickup apparatus 1 will now be briefly explained. In the case of reading information of BD or AOD 20, objective lens is placed at the position shown by a solid line in FIG. 1 and blue light source 4 emits light in this state. Light emitted from blue light source 4 is firstly transmits collimator 13 to form a parallel light flux, then transmits splitter 12 and ¼ wavelength plate 13 followed by being reduced the aperture by iris member 14, and transmits objective lens 15 resulting in formation of a converged light spot on the recording surface of BD or AOD 20.

The light having formed a converged light spot is modulated on the recorded surface by information pits and reflects on said recorded surface, and the reflected light transmits objective lens 15, iris member 14 and ¼ wavelength board 13, then being branched by splitter 12, and transmits cylindrical lens 16 and concave lens 17 to be received by sensor 18. Thereby, information recorded on BD or AOD 20 is read out.

On the other hand, in the case of reading out information of DVD 30, objective lens is arranged at the position shown by a broken line in FIG. 1 and red light source 5 emits light in that state, thereafter, information recorded on DVD 30 is read out by similar movements and/or actions in the case of reading out information of BD or AOD 20.

Figure 2:
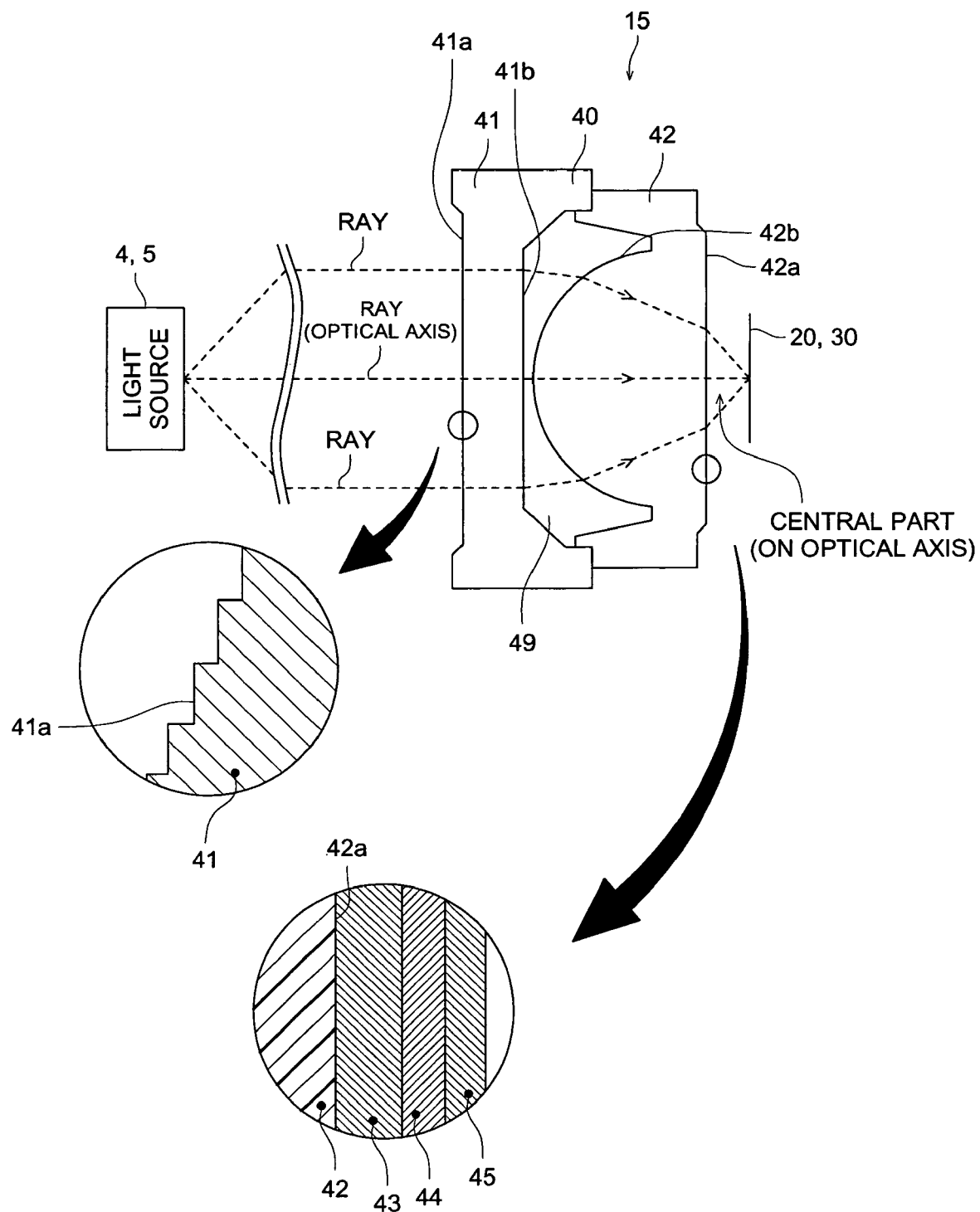
FIG. 2 is a schematic cross-section view of the objective lens.

FIG. 2 is a schematic cross-section view of the objective lens 15.

As shown in FIG. 2, objective lens 15 is an optical lens for light of a specific wavelength within 350–450 nm emitted from blue light source 4 or a specific wavelength within 620–680 nm emitted from red light source 5 as transmitting light, and is provided with a resinous lens body 40. Lens body 40 is constituted of two optical elements 41 and 42 which are formed by molding a resin containing a polymer having an alicyclic structure. Lens body 40 is constituted by adhering the edge portion of each of optical element 41 and 42, and hollow portion 49 is formed between optical elements 41 and 42.

Optical element 41 as the first optical element is arranged on the side of blue light source 4 or of red light source 5, and optical element 42 as the second optical element is arranged on the side of, BD, AOD 20, or DVD 30. In more detail, surface 41a of optical element 41 is facing to blue light source 4 or of red light source 5; surface 42a of optical element 42 is facing to BD, AOD 20, or DVD 30; and rear surface 41b of optical element 41 and rear surface 42b of optical element 42 are facing to each other.

Surface 41a and rear surface 41b of optical element 41 are both form aspheric surfaces, and, as shown in magnified drawing FIG. 2, are provided with a diffraction structure of a ring-shape zone. Herein, in a magnified drawing in FIG. 2, only surface 41a of optical element 41 is illustrated. Both of surface 42a and rear surface 42b of optical element 42 form an aspheric surface.

The light emitted from blue light source 4 or red light source 5 is incident into surface 41a of optical element 41 to transmit said optical element 41 and emitted from rear surface 41b; and further, it is incident into surface 42a of optical element 42 via hollow portion 49 to transmit said optical element 42 and emitted from rear surface 42b; then, it falls on the recording surface BD or AOD 20, or DVD 30.

On the other hand, the light reflected on BD or AOD 20, or DVD 30, is incident into surface 42a of optical element 42 to transmit said optical element 42 and emitted from rear surface 42b; and further, it is incident into rear surface 41b of optical element 41 via hollow portion 49 to transmit said optical element 41 and emitted from surface 41a.

Herein, optical element 42 is provided with a positive paraxial power and optical elements 41 and 42 each are molded so as to satisfy the both conditions represented by following Formulae (41) and (42).

$$|P1/P2| \leq 0.2 \qquad \text{Formula (41)}$$

$$0.8 \leq d_2/f_2 \leq 1.8 \qquad \text{Formula (42)}$$

In above Formula (41), P1 is a paraxial power of optical element 41, and P2 is a paraxial power of optical element 42. In above Formula (42), $d_2$ is a thickness on the optical axis of optical element 42, and $f_2$ is a focal distance of optical element 42 for light of a wavelength 405 nm.

In the case that the conditions of above Formulae (41) and (42) are satisfied, objective lens 15 for an optical pick up apparatus, which exhibits no deterioration of image height characteristics and capability of easy and proper correction of various aberrations resulting in a high capability and a high light utilization efficiency, can be prepared as an objective lens commonly utilized when information is recorded and/or reproduced against at least two types of optical information recording media including BD or AOD 20.

Specifically, when Formula (41) is satisfied, since the paraxial power of optical element 41 becomes small and the curvature of optical surface can be decreased, it is possible to easily provide a ring-shape zone on one side or both sides of optical element 41, the ring-shape zone having a step structure and being able to provide an optical path difference and diffracted light. By using the ring-shape zone, various aberrations are properly corrected, for example, a color aberration and a spherical aberration due to differences in thickness of the transparent substrate of an optical information recording medium. Further, a ring-shape zone having a larger pitch is available, resulting in obtaining a highly precise ring-shape zone, by which: (i) the decrease of a utilization ratio of light due to manufacturing errors of optical elements 41 and 42 is avoided; and (ii) the effect of the shade formed by the steps of the ring-shape zone is minimized, and an objective lens 15 enabling a high utilization ratio of light is obtained. Since the paraxial power of optical element 41 is small and the curvature of optical surface can be decreased, a large distance (working distance WD) between the objective lens and the optical information recording medium BD, AOD 20 or DVD 30 is obtained.

Further, when Formula (42) is satisfied and $d_2/f_2$ is not less than 0.8, the center thickness (the thickness on axis) of optical element 42 becomes not too small, and image height characteristics does not deteriorates nor the shift sensitivity of an optical surface becomes large. On the other hand, when $d_2/f_2$ is not more than 1.8, the center thickness (the thickness on axis) of optical element 42 becomes not too large; image height characteristics does not deteriorates; the sensitivity of surface decentering error decreses; and a spherical aberration and a coma aberration are possible to be properly corrected. Herein, these effects are achieved similarly as whole objective lens 15 containing optical element 41 and optical element 42, when Formula (41) is satisfied.

Herein, a functional layer for the purpose of antireflection is deposited on surface 42a of optical element 42 which constitutes lens body 40. The layer composition is shown in a magnified drawing of FIG. 2.

As shown in a magnified drawing of FIG. 2, three layers containing first layer 43, second layer 44 and third layer 45 are deposited on surface 42a of optical element 42. First layer 43 is deposited directly on surface 42a of optical element 42; second layer 44 is deposited directly on first layer 43; and third layer 45 is deposited directly on second layer 44. That is, first layer 43 is arranged between optical element 42 and second layer 44, and second layer 44 is arranged between first layer 43 and third layer 45.

First layer 43 contains a low refractive index material or an intermediate refractive index material having a refractive index for light of a wavelength 405 nm of less than 1.7. "A low refractive index material" referred in this invention is a material, a refractive index of which for light of a wavelength 405 nm is less than 1.55, and includes silicon oxide, magnesium fluoride, aluminum fluoride, yttrium fluoride, a mixture of two or more compounds thereof and a mixture of silicon oxide and aluminum oxide. "An intermediate refractive index material" referred in this invention is a material, a refractive index of which for light of a wavelength 405 nm is less than 1.7 and over 1.55, and includes lead fluoride, cerium fluoride, neodymium fluoride, lanthanum fluoride and aluminum oxide and a mixture of two or more compounds thereof.

First layer 43 may be constituted of a single layer containing only a low refractive index material, a single layer containing only an intermediate refractive index material, a single layer containing a mixture of a low refractive index material and an intermediate refractive index material, or at least two layers in which these each layer is arbitrarily accumulated.

On the other hand first layer 43 has a layer thickness of 50–15000 nm. The layer thickness of said first layer 43 is preferably 100–15000 nm and more preferably 500–12000 nm. When the layer thickness range is made narrower, significant become the effects (being described later) characteristic to objective lens 15 of this invention.

Further, with respect to first layer 43, the refractive index of said first layer 43 for light of a wavelength 405 nm is within a range of ±10% of the refractive index of lens body 40 (optical element 42) for light of a wavelength 405 nm.

Second layer 44 contains a high refractive index material having a refractive index for light of a wavelength 405 nm of not less than 1.7. "A high refractive index material" referred in this invention is a material, a refractive index of which for light of a wavelength 405 nm is not less than 1.7, and includes hafnium oxide, zirconium oxide, yttrium oxide, lanthanum oxide, lanthanum aluminate, lanthanum titanate, praseodymium titanate, tantalum oxide, titanium oxide, niobium oxide and a mixture of at least two compounds thereof.

Third layer 45 contains a low refractive index material having a refractive index for light of a wavelength 405 nm of not more than 1.55 or a low/intermediate refractive index material. "A low/intermediate refractive index material" referred in this invention is a mixture of silicon oxide and aluminum oxide having a refractive index for light of a wavelength 405 nm is less than 1.55. That is, since third layer 45 contains a low refractive index material or a low/intermediate refractive index material having a refractive index for light of a wavelength 405 nm of not more than 1.55, specifically, it has a refractive index for light of a wavelength 405 nm of not more than 1.55, and containing silicon oxide, magnesium fluoride, aluminum fluoride and yttrium fluoride, a mixture of at least two compounds thereof, or a mixture of silicone oxide and aluminum oxide.

Herein, as shown in a magnified drawing of FIG. 2, first layer 43 is directly in contact with surface 42a of optical element 42 and second layer 44, however, first layer 43 is not necessarily directly brought in contact with surface 42a of optical element 42 and second layer 44; and a different layer from first layer 43 containing a low refractive index material, an intermediate refractive index material or a low/intermediate refractive index material may be included between first layer 42 and surface 42a of optical element 42; as well as another different layer containing a low refractive index material, an intermediate refractive index material or a low/intermediate refractive index material may be included also between first layer 42 and second layer 44; finally, it is satisfactory when first layer 43 is provided between optical element 42 and second layer 44.

Further, as shown in a magnified drawing of FIG. 2, in this embodiment, example of a three-layered structure in which first layer 43, second layer 44 and third layer 45 are deposited on surface 42a of optical element 42, however, a four-layered structure may be possible by depositing a layer similar to second layer 44 on third layer 45, and a five-layered structure is also possible by depositing a layer similar to second layer 44 and a layer similar to third layer 45 alternately on third layer 45; the layer composition on surface 42a of optical element 42 including these layer structures may be also applied on surface 41a of optical element 41, on rear surface 41b of optical element 41, and on rear surface 42b of optical element 42.

Herein, "resin containing a polymer provided with an alicyclic structure", which constitutes lens body 40 (optical elements 41 and 42) will be detailed.

"Resin containing a polymer provided with an alicyclic structure" preferably contains repeating unit (a) provided with an alicyclic structure represented by following Formula (1), and chain structure repeating unit (b) represented by following Formula (2) or (3), in the whole repeating unit of a polymer having a weight average molecular weight of 1,000–1,000,000, so as to make the total content of not less than 90 weight %; and preferably further contains a alicyclic hydrocarbon type copolymer, in which the content of repeating unit (b) is not less than 1 weight % and less than 10 weight % and the chain of repeating unit (a) satisfies following Formula (Z).

$$A \leq 0.3 \times B \qquad \text{Formula (Z)}$$

wherein, A=(a weight average molecular weight of a repeating unit chain provided with an alicyclic structure), and B=(a weight average molecular weight of a repeating unit provided with an alicyclic structure (Mw))×(a number of repeating units provided with an alicyclic structure/a total number of a repeating units composing an alicyclic hydrocarbon type copolymer).

Formula (1)

Formula (2)

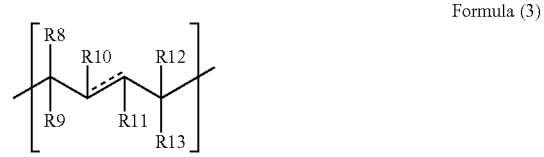

Formula (3)

R1–R13 in formulas (1), (2) and (3) each independently represent such as a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group). Among them, preferable is the case of a hydrogen atom or a chain hydrocarbon group having a carbon number of 1–6, because of excellent heat resistance and low water absorbability. Halogen atoms include a fluorine atom, a chlorine atom, a bromine atom and an iodine atom. Chain hydrocarbon groups substituted by a polar group include, for example, alkyl halogenide groups having a carbon number of 1–20, preferably 1–10 and more preferably 1–6. Chain hydrocarbon groups include, for example, alkyl groups having a carbon number of 1–20, preferably 1–10 and more preferably 1–6; and alkenyl groups having a carbon number of 2–20, preferably 2–10 and more preferably 2–6.

X in formula (1) represents an alicyclic hydrocarbon group, the carbon number of which is generally 4–20, preferably 4–10 and more preferably 5–7. By setting the carbon number to constitute an alicyclic structure in this range, it is possible to decrease birefringence. Further, alicyclic structure is not limited to a monocyclic structure and may be a polycyclic structure such as a norbornane ring and a dicyclohexane ring.

Alicyclic hydrocarbon groups may be provided with a carbon-carbon unsaturated bond, however, the content is not more than 10%, preferably not more than 5% and more preferably not more than 3%, of the total carbon-carbon bonds. By setting the content of a carbon-carbon unsaturated bond of alicyclic hydrocarbon groups in this range transparency and heat resistance are improved. Further, carbon atoms constituting an alicyclic hydrocarbon group may be bonded with chain hydrocarbon substituted by a hydrogen atom, a hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group), and among them a hydrogen atom or a chain hydrocarbon group having a carbon number of 1–6 is preferred with respect to heat resistance and low water absorbability.

Further, "------" in formula (3) represents a carbon-carbon saturated or unsaturated bond in the main chain, and in the case of transparency and heat resistance are strongly required, the content of the unsaturated bond is generally not more than 10%, preferably not more than 5% and more preferably not more than 3% of the total carbon-carbon bonds constituting the main chain.

Among repeating units represented by formula (1), a repeating unit represented by following formula (4) is superior with respect to heat resistance and low water absorbability.

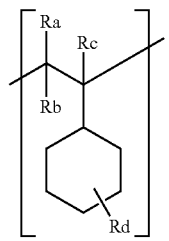

Formula (4)

Among repeating units represented by formula (2), a repeating unit represented by following formula (5) is superior with respect to heat resistance and low water absorbability.

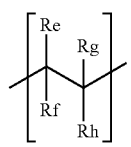

Formula (5)

Among repeating units represented by formula (3), a repeating unit represented by following formula (6) is superior with respect to heat resistance and low water absorbability.

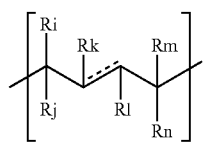

Formula (6)

In formulas (4), (5) and (6), Ra, Rb, Rc, Rd, Re, Rf, Rg, Rh, Ri, Rj, Rk, Rl, Rm and Rn each independently represent a hydrogen atom or a lower chain hydrocarbon group and a hydrogen atom or a lower alkyl group having a carbon number of 1–6 is superior with respect to heat resistance and low water absorbability.

Among chain structure repeating units represented by formulas (2) and (3), a chain structure repeating unit represented by formula (3) is more superior in strength characteristics of the obtained hydrocarbon type copolymer.

In this invention, the total content of repeating unit (a) provided with an alicyclic structure represented by formula (1) and chain structure repeating unit (b) represented by formula (2) and/or formula (3) is generally not less than 90% by weight, preferably not less than 95% by weight and more preferably not less than 97% by weight. By setting the total content in the above range, low birefringence, sufficient heat resistance and low water absorbability as well as mechanical strength are obtained while being highly balanced with each other.

The content of chain structure repeating unit (b) in an alicyclic hydrocarbon type copolymer is suitably selected depending on application purposes, however, generally in a range of not less than 1% and less than 10%, preferably not less than 1% and not more than 8% and more preferably not less than 2% and not more than 6%, based on weight. When the content of repeating unit (b) is in the above range, low birefringence, heat resistance and low water absorbability are obtained while being highly balanced with each other.

Further, the chain length of repeating unit (a) is sufficiently shorter than the molecular chain length of an alicyclic hydrocarbon type copolymer; and specifically, when A=(a weight average molecular weight of a repeating unit provided with an alicyclic structure), and B=(a weight average molecular weight of a repeating unit provided with an alicyclic structure (Mw))×(a number of repeating units provided with an alicyclic structure/the total number of repeating units constituting an alicyclic hydrocarbon type copolymer), A is in a range of not more than 30%, preferably not more than 20%, more preferably not more than 15% and most preferably not more than 10%, of B. When A is out of this range, birefringence may increase.

Further, it is also preferred that the chain length of repeating unit (a) is provided with a specific distribution. Specifically, when A=(a weight average molecular weight of a repeating unit chain provided with an alicyclic structure), and C=(a number average molecular weight of a repeating unit chain provided with an alicyclic structure), A/C is in a range of preferably not less than 1.3, more preferably 1.3–8 and most preferably 1.7–6. A block degree is increased when A/C is extremely small while a random degree is increased when A/C is extremely large, and increase in birefringence results in the both cases.

The molecular weight of an alicyclic hydrocarbon type copolymer of this invention is in a range of 1,000–1,000,000, preferably 5,000–500,000, more preferably 10,000–300,000 and most preferably 50,000–250,000, based on a polystyrene (or polyisoprene) conversion weight average molecular weight (Mw) which is measured by means of gel permeation chromatography (hereinafter, referred to as GPC). Strength characteristics of an optical element are inferior when the weight average molecular weight of an alicyclic hydrocarbon type copolymer is extremely small, while birefringence increases when it is extremely large.

The molecular weight distribution of such copolymers is suitably selected according to application purposes, however, is in a range of generally not more than 2.5, preferably not more than 2.3 and more preferably not more than 2, based on a ratio of a weight average molecular weight (Mw) to a number average molecular weight (Mn), of polystyrene (or polyisoprene) conversion measured by means of GPC. When Mw/Mn is in this range, mechanical strength and heat resistance are obtained while being highly balanced with each other.

The glass transition temperature (Tg) of the copolymer may be suitably selected according to application purposes, however, it is generally 50–250° C., preferably 70–200° C. and more preferably 90–180° C.

Next, a manufacturing method of "polymers provided with an alicyclic structure" described above will be explained.

A manufacturing method of an alicyclic hydrocarbon type copolymer include (1) a method in which an aromatic vinyl type compound and a copolymerizable other monomer are copolymerized and carbon-carbon unsaturated bonds of the main chain and aromatic ring are hydrogenated and (2) a method in which an alicyclic vinyl type compound and a copolymerizable other monomer are copolymerized and the copolymer is appropriately hydrogenated.

In the case of manufacturing an alicyclic hydrocarbon type copolymer of this invention is manufactured by the above-described methods, said copolymer is efficiently prepared by hydrogenation of carbon-carbon unsaturated bonds of such as the main chain and unsaturated rings such as an aromatic ring and a cycloalkene ring, in a copolymer containing an aromatic vinyl type compound and/or an alicyclic vinyl type compound (a') and copolymerizable other monomer (b') and provided with a chain structure, wherein D is not more than 30%, preferably not more than 20%, more preferably not more than 15% and most preferably not more than 10%, of E, when D=(a weight average molecular weight of a repeating unit chain arising from an aromatic vinyl type compound and/or an alicyclic vinyl type compound) and E=(a weight average molecular weight of a hydrocarbon type copolymer (Mw)×(a repeating unit number arising from an aromatic vinyl type compound and/or an alicyclic vinyl type compound/a repeating unit number of the total repeating unit number constituting a hydrocarbon type copolymer)). When D is out of the above range, birefringence in the obtained alicyclic hydrocarbon type copolymer becomes large.

In this invention, an alicyclic hydrocarbon type copolymer can be prepared more efficiently by method (1).

The above described copolymers before hydrogenation preferably have D/F of a predetermined range, when F=(a number average molecular weight of a repeating unit chain arising from an aromatic vinyl type compound and/or an alicyclic vinyl type compound). Specifically, D/F is in a range of preferably not less than 1.3, more preferably not less than 1.3 and not more than 8 and most preferably not less than 1.7 and not more than 6. When D/F is out of this range, birefringence in the obtained alicyclic hydrocarbon type copolymer becomes large.

The weight average molecular weight and the number average molecular weight of a repeating unit chain arising from the above-described compound (a') can be determined by such as a method in which unsaturated double bonds in the main chain of an aromatic vinyl type copolymer are subjected to ozone addition being followed by reduction decomposition and the molecular weight of the taken out aromatic vinyl chain is measured, as described, for example, in literature Macromolecules, 16, 1925–1928 (1983).

The molecular weight of a copolymer before hydrogenation is in a range of 1,000–1,000,000, preferably 5,000–500, 000 and more preferably 10,000–300,000, based on a polystyrene (or polyisoprene) conversion weight average molecular weight (Mw) measured by means of GPC. When the weight average molecular weight of a copolymer (Mw) is extremely small, an optical element containing an alicyclic hydrocarbon type copolymer obtained from the aforesaid copolymer is inferior in strength characteristics while the hydrogenation reactivity is inferior when it is extremely large.

Specific examples of an aromatic vinyl type compound utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenyl styrene; and preferable are such as styrene, 2-methylstyrene, 3-methylstyrene and 4-methylstyrene.

Specific examples of an alicyclic vinyl type compound utilized in above-described method (2) include, for example, cyclobutylethylene, cyclopentylethylene, cyclohexylethylene, cylheptylethylene, cyclooctylethylene, norbornylethylene, dicyclohexylethylene, α-methylcyclohexylethylene, α-t-butylcyclohexylethylene, cyclopentenylethylene, cyclohexenylethylene, cycloheptenylethylene, cyclooctenylethylene, cyclodecenylethylene, norbonenylethylene, α-methylcyclohexenylethylene and α-t-butylcyclohexenylethylene; and preferable among them are cyclohexylethylene and α-methylcyclohexylethylene.

These aromatic vinyl type compounds and alicyclic vinyl type compounds each can be utilized alone or in combination of at least two types.

Copolymerizable other monomers are not specifically limited, however, chain vinyl compounds and chain conjugated diene compounds are utilized, and operational capability in the manufacturing process is superior and strength characteristics of the obtained alicyclic hydrocarbon type copolymer is excellent when chain conjugated diene is employed.

Specific examples of a chain vinyl compound include chain olefin monomers such as ethylene, propylene, 1-butene, 1-pentene and 4-metyl-1-pentene; nitrile type monomers such as 1-cyanoethylene (acrylonitrile), 1-cyano-1-methylethylene (methacrylonitrile) and 1-cyano-1chloroethylene (α-chloroacrylonitrile); (meth)acrylicacid ester type monomers such as 1-(methoxycarbonyl)-1-methylethylene (methacrylic acid methylester), 1-(ethoxycarbonyl)-1-methylethylene (methacrylic acid ethylester), 1-(propoxycarbonyl)-1-methylethylene (methacrylic acid propylester), 1-(butoxycarbonyl)-1-methylethylene (methacrylic acid butylester), 1-methoxycarbonyl ethylene (acrylic acid methylester), 1-ethoxycarbonyl ethylene (acrylic acid ethylester), 1-propoxycarbonyl ethylene (acrylic acid propylester) and 1-butoxycarbonyl ethylene (acrylic acid butylester); unsaturated fatty acid type monomers such as 1-carboxyethylene (acrylic acid), 1-carboxy-1-methylethylene (methacrylic acid) and maleic acid anhydride; and among them preferable are chain olefin monomers and most preferable are ethylene, propylene and 1-butene.

Chain conjugated dienes include, for example, 1,3-butadiene, isoprene, 2,3-dimethyl-1,3-butadiene, 1,3-pentadiene and 1,3-hexadiene. Chain conjugated dienes are preferable among these chain vinyl compounds and chain conjugated dienes, and specifically preferable are butadiene and isoprene.

These chain vinyl compounds and chain conjugated dienes can be utilized each alone or in combination of at least two types.

A polymerization method of compound (a') is not specifically limited, and includes such as a collective polymerization method (a batch method) and a monomer consecutive addition method (a method to proceed polymerization while consecutively adding the residual monomer after starting polymerization by use of a part of the total using amount of the monomer), and, in particular, a hydrocarbon type copolymer provided with a preferable chain structure can be obtained by use of a monomer consecutive addition method. Copolymers before hydrogenation are provided with a more random chain structure when the aforesaid D value is the smaller and/or D/F is the larger. How much randomness a copolymer has is determined by a rate ratio of a polymerization rate of aromatic vinyl type compound and that of a copolymerizable other monomer; and a chain structure of the more randomness is provided when this rate ratio is the smaller.

According to the aforesaid monomer consecutive addition method, since homogeneously mixed monomers are consecutively added into the polymerization system, polymerization selectivity of the monomer in the growing process by polymerization of the monomer can be decreased, different from a batch method, resulting in the obtained copolymer having a more random chain structure. Further, polymerization temperature can be maintained to be low and stable because of small accumulation of polymerization reaction heat in the polymerization system.

In the case of a monomer consecutive addition method, first, a monomer of generally 0.01–60 weight %, preferably 0.02–20 weight % and more preferably 0.05–10 weight % of the total using amount of the monomer are charged in a polymerization reaction vessel in advance as an initial monomer, and polymerization is started by addition of an initiator. By setting the initial monomer amount in this range, it is possible to easily remove reaction heat which is generated at the initial reaction of a polymerization initiator, resulting in making the prepared copolymer being provided with more random chain structure.

When the reaction is continued until to make the polymer conversion ratio of the above initial monomer of not less than 70%, preferably not less than 80% and more preferably not less than 90%, the prepared copolymer comes to have more random chain structure. Thereafter, the residual portion of the above monomer is intermittently added, and the addition rate is determined in consideration of a monomer consumption rate in the polymerization system.

Generally, addition of the residual monomer is made to completed within a range of 0.5–3 times, preferably 0.8–2 times and more preferably 1–1.5 times of the time given by relational equation [(100−I)×T/I], when the time required until the polymerization conversion ratio of the initial monomer reaches to 90% is T, and the ratio (%) of the initial monomer against the total using monomer is I. Specifically, the initial monomer amount and the addition rate of the residual monomer are determined so that addition of the residual monomer is completed in a range of generally 0.1–30 hours, preferably 0.5–5 hours and more preferably 1–3 hours. Further, the polymerization conversion ratio immediately after the end of monomer addition is generally not less than 80%, preferably not less than 85% and more preferably not less than 90%. By setting the polymerization conversion ratio of the whole monomer immediately after the end of monomer addition in the above-described range, a chain structure of a prepared copolymer becomes more random.

Polymerization reaction may be any of such as radical polymerization, anionic polymerization and cationic polymerization, without any specific limitation, however, is preferably anionic polymerization in view of polymerization operations, easiness of a hydrogenation reaction in the post-process, and mechanical strength of a hydrocarbon type copolymer as the final product.

In the case of radical polymerization, utilized can be such as bulk polymerization, solution polymerization, suspension polymerization and emulsion polymerization, in the presence of an initiator at generally 0–200° C. and preferably 20–150° C.; however, bulk polymerization and suspension polymerization are preferred in the case that contamination of such as impurities in resin has to be prevented. As a radical initiator, utilized can be organic peroxides such as benzoyl peroxide, lauroyl peroxide, t-butyl-peroxy-2-ethylhexanoate; azo compounds such as azoisobutyronitrile, 4-azobis-4-cyanopentanate and azodibenzoyl; water-soluble catalysts represented by potassium persulfate and ammonium persulfate; and redox initiators.

In the case of anionic polymerization, utilized can be such as bulk polymerization, solution polymerization and slurry polymerization, in the presence of an initiator at generally 0–200° C., preferably 20–100° C. and specifically preferably 20–80° C.; however, solution polymerization is preferred in consideration of removal of the reaction heat. In this case, an inert solvent, which can dissolve a polymer and a hydride thereof, is utilized. Inert solvents utilized in a solution reaction include, for example, aliphatic hydrocarbons such as n-butane, n-pentane, iso-pentane, n-hexane, n-heptane and iso-octane; alicyclic hydrocarbons such as cyclopentane, cyclehexane, methylcyclopentane, methylcyclohexane and decalin; aromatic hydrocarbons such as benzene and toluene, and in the case of employing aliphatic hydrocarbons and alicyclic hydrocarbons among them, they can be utilized as they are as an inert solvent also for a hydrogenation reaction. These solvents each can be utilized alone or in combination of at least two types, and generally utilized at a ratio of 200–10,000 weight parts per 100 weight parts of the whole using monomer.

As an initiator of the above-described anionic polymerization, for example, mono-organic lithium compounds such as n-butyl lithium, sec-butyl lithium, t-butyl lithium, hexyl lithium and phenyl lithium, poly-functional organic lithium compounds such as dilithiomethane, 1,4-dilithiobutane, 1,4-dilithio-2-ethylcyclohexane can be utilized.

In polymerization reaction, such as a polymerization promoter and a randomizer (an additive provided with a function to prevent a chain of one specific component from growing too long) can be further utilized. In the case of anionic polymerization, for example, a Lewis base compound can be utilized as a randomizer. Specific examples of a Lewis base compound include ether compounds such as dimethyl ether, diethyl ether, diisopropyl ether, dibutyl ether, tetrahydrofuran, diphenyl ether, ethyleneglycol diethyl ether and ethyleneglycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphosphine. These Lewis base compounds can be utilized each alone or in combination of at least tow types.

Polymers prepared by radical polymerization or anionic polymerization described above can be recovered by a commonly known method such as a steam stripping method, a direct desolvent method and an alcohol coagulation method. Further, in the case of utilizing a solvent, which is inert in hydrogenation reaction, at the time of polymerization, it is possible not to recover the polymer from the polymerization solution but to utilize the polymer solution in hydrogenation process as it is.

(Hydrogenation Method of Unsaturated Bond)

When performing a hydrogenation reaction of, such as a carbon-carbon double bond of an unsaturated ring such as an aromatic ring and a cycloalkene ring, and an unsaturated bond of a main chain, in a copolymer before hydrogenation, there is no specific limitation with respect to a reaction method and a reaction form and a commonly known method can be applied; however, preferable is a hydrogenation method which can provide a high hydrogenation ratio and minimize polymer chain cutting reaction caused concurrently with a hydrogenation reaction, for example, including a method which is performed in an organic solvent utilizing a catalyst containing at least one metal selected from nickel, cobalt, iron, titanium, rhodium, palladium, ruthenium and rhenium. As a hydrogenation catalyst, either of an inhomogeneous system catalyst and a homogeneous system catalyst can be utilized.

An inhomogeneous system catalyst can be utilized as a metal or a metal compound itself, or being held by a suitable carrier. Carriers include, for example, active carbon, silica, alumina, calcium carbon, titania, magnesia, zirconia, diatomaceous earth and silicon carbide, and the carrying amount of a catalyst is in a range of generally 0.01–80 weight % and preferably 0.05–60 weight %. As a homogeneous system catalyst, utilized can be a catalyst in which a nickel, cobalt, titanium or iron compound and an organometalic compound are combined, or an organometalic complex catalyst of such as rhodium, parlladium, platinum, ruthenium and rhenium. As compounds of nickel, titanium and iron, for example, acetylacetone salts, naphtene salts, cyclobutadienyl compounds and cyclopentadienyl dichloro compounds, of various metals can be preferably utilized. As organoaluminum compounds, preferably utilized can be alkylaluminums such as triethylaluminum and triisobutylaluminum; halogenated aluminums such as diethylaluminum chloride and ethylaluminum dichloride; and hydrogenated alkyl aluminums such as diiosbutylaluminum hydride.

As examples of an organometallic complex catalyst, utilized are metal complexes such as a γ-dichloro-π-benzene complex, a dichloro-tris(triphenylphosphine) complex and a hydride-chloro-triphenylphosphine of each metal described above. These hydrogenation catalysts can be utilized each alone or in combination of at least two types, and the using amount is generally 0.01–100 parts, preferably 0.05–50 parts and more preferably 0.1–30 parts, against a polymer based on weight.

A hydrogenation reaction is performed at generally 10–250° C., however, preferably at 50–200° C. and more preferably at 80–180° C., because a hydrogenation ratio can be increased as well as a polymer chain cutting reaction, which causes simultaneously with the hydrogenation reaction, can be minimized. Further, the hydrogen pressure is generally 0.1–30 MPa, however, is preferably 1–20 MPa and more preferably 2–10 MPa, with respect to operation easiness in addition to the above reasons.

A hydrogenation ratio of thus obtained hydrides, with respect to any of a carbon-carbon unsaturated bond of the main chain, a carbon-carbon double bond of an aromatic ring and a carbon-carbon double bond of an unsaturated ring, is generally not less than 90%, preferably not less than 95% and more preferably not less than 97%, based on a measurement by means of $^1$H-NMR. When the hydrogenation ratio is low, birefringence may increase and thermal stability of the obtained copolymer may be deteriorated.

A method to recover a hydride after finishing a hydrogenation reaction is not specifically limited, and generally utilized can be a method in which a solvent is directly removed from the solution of a hydride by drying after removing a hydrogenation catalyst residue by a method such as filtration and centrifugal separation, or a method, in which the solution of a hydride is poured into a poor solvent for the hydride resulting in coagulation of the hydride.

Herein, an antioxidant may be contained in the above "resin containing a polymer provided with an alicyclic structure".

Antioxidants include phenolic antioxidants, phosphite antioxidants and sulfur-containing antioxidants, and preferable among these are phenolic antioxidants and specifically alkylphenolic antioxidants. By incorporating these antioxidants, coloring and strength decrease of an optical element, due to such as oxidation deterioration at the time of optical element, can be prevented without deteriorating transparency and low water absorbability.

As phenolic antioxidants, utilized can be those conventionally well known, which include, for example, acrylate type compounds such as 2-t-butyl-6-(3-t-butyl-2-hydroxy- 5-methylbenzyl)-4-methylphenyl acrylate and 2,4-di-t-amyl-6-(1-(3,5-di-t-amyl-2-hydroxyphenyl)ethyl)phenyl acrylate, described in JP-A Nos. 63-179953 and 1-168643; alkyl substituted phenol type compounds such as octadecyl-3-(3,5-di-t-butyl-4-hydroxyphenyl)propionate, 2,2'-methylene-bis(4-methyl-6-t-butylphenol), 1,1,3-tris(2-mehtyl-4-hydroxy-5-t-butylphenyl)butane, 1,3,5-trimethyl-2,4,6-tris(3,5-di-t-butyl-4-hydroxybenzyl)benzene, tetrakis (methylene-3-(3'5'-di-t-butyl-4'-hydroxyphenylpropionate) methane [that is pentaerythrimethyl-tetrakis(3-(3,5-di-t-butyl-4-hydroxypropionate))], triethyleneglycol bis(3-(3-t-butyl-4-hydroxy-5-mehtylphenyl)propionate); and triazine group containing phenol type compounds such as 6-(4-hydroxy-3,5-di-t-butylanilino)-2,4-bisoctylthio-1,3,5-triazine, 4-bisoctylthio-1,3,5-triazine and 2-octylthio-4,6-bis-(3,5-di-t-butyl-4-oxyanilino)-1,3,5-triazine.

Phosphite antioxidants are not specifically limited provide they are commonly utilized in a general resin industry, and include, for example, monophosphite type compounds such as triphenylphosphie, diphenylisodecyl phosphite, phenyldiisodecyl phosphite, tris(nonylphenyl)phosphite, tris(dinonylphenyl)phosphite, tris(2,4-di-t-butylphenyl)phosphite, and 10-(3,5-di-t-butyl-4-hydroxybenzyl)-9,10-dihydro-9-oxa-10-phosphaphenanthrene-10-oxide; diphosphite compounds such as 4,4'-butylidene-bis(3-methyl-6-t-butylphenyl-di-tridecylphosphite) and 4,4'-isopropylidene-bis (phenyl-di-alkyl(C12–C15)phosphite). Among these, monophosphite type compounds are preferable and such as tris(nonylphenyl)phosphite, tris(dinonylphenyl)phosphite, and tris(2,4-di-t-butylphenyl)phosphite are specifically preferable.

Phosphite antioxidants include, for example, dilauryl 3,3-thiopropionate, dimyristyl 3,3'-thiodipropionate, distearyl 3,3-thiodipropionate, laurylstearyl 3,3-thiodipropionate, pentaerythritol-tetrakis-(β-lauryl-thio-propionate) and 3,9-bis(2-dodecylthioethyl)-2,4,8,10-tetraoxaspiro[5,5]undecane.

These antioxidants can be utilized each alone or in combination of at least two types, and the blending amount, which is suitably selected in a range of not disturbing the purpose of this invention, is generally 0.001–5 weight parts and preferably 0.01–1 weight parts against 100 weight parts of an alicyclic hydrocarbon type copolymer.

Further in "resin containing a polymer provided with an alicyclic structure" described above, contained may be the aforesaid alicyclic hydrocarbon type copolymer and at least one type of a compounding agent selected from the group of (1) a soft polymer, (2) an alcoholic compound and (3) organic or inorganic filler. By blending these compounding agents, milky-whitening under an environment of high temperature and high humidity for a long period can be prevented without deteriorating various characteristics such as transparency, low water absorbability and mechanical strength.

Among these, (1) a soft polymer and (2) an alcoholic compound are superior in an effect to prevent milky-whitening under an environment of high temperature and high humidity as well as in transparency of the obtained resin composition.

(1) A soft polymer utilized in this invention is a polymer provided with a Tg of generally not higher than 30° C., and at least the lowest Tg is not higher than 30° C. when plural Tg's exist.

Specific examples of these soft polymers include, for example, olefin type soft polymers such as liquid polyethylene, polypropyrene, poly-1-butene, an ethylene.α-olefine copolymer, a propylene.α-olefine copolymer, an ethylene.propylene.diene copolymer (EPDM) and an ethylene.propylene.styrene copolymer; isobutylene type soft polymers such as polyisobutylene, isobutylene.isoprene rubber and an isbutylene.styrene copolymer; diene type soft polymers such as polybutadiene, polyisoprene, a butadiene.styrene random copolymer, an isoprene.styrene random copolymer, an acrylonitrile.butadiene copolymer, an acrylonitrile.butadiene.styrene copolymer, a butadiene.styrene block copolymer, an isoprene.styrene block copolymer and a styrene.soprene.styrene block copolymer; silicon-containing soft polymers such as dimethylpolysiloxane, diphenylpolysiloxane and dihydroxypolysiloxane; soft polymers containing an α,β-unsaturated acid such as polybutylacrylate, polybutylmethacrylate, polyhydroxyethylmethacrylate, polyacrylamide, polyacrylonitrile and a butylacrylate.styrene copolymer; soft polymers containing an unsaturated alcohol, and amine or an acyl derivative thereof or acetal, such as polyvinyl alcohol, polyvinyl acetate, polyvinyl stearate, a vinyl acetate.styrene copolymer; epoxy type soft polymers such as polyethylene oxide, polypropylene oxide and epichlorohydrine rubber; fluorine-containing soft polymers such as vinylidene fluoride type rubber and tetrafluoroethylene-propyrene rubber; and other soft polymers such as natural rubber, polypeptide, protein, a polyester type thermoplastic elastomer, a vinyl chloride type thermoplastic elastomer and a polyamide type thermoplastic elastomer. These soft polymers may be those provided with a cross-linking structure or those in which a functional group is introduced by a modification reaction.

Among the above-described soft polymers, a diene type soft polymer is preferable, and specifically a hydride, in which a carbon-carbon unsaturated bond of said soft polymer is hydrogenated, is superior in rubber elasticity, mechanical strength, flexibility and dispersibility.

(2) An alcoholic compound is a compound provided with at least one non-phenol hydroxyl group in the molecule, and preferably provided with at least one hydroxyl group and at least one ether bond or ester bond. Specific examples of such compounds include polyhydric alcohol of at least dihydric, preferably alchol of at least trihydric and more preferably an alcoholic ether compound and an alcoholic ester compound in which one of the hydroxyl group in polyhydric alcohol having 3–8 hydroxyl groups is etherified or esterified.

Polyhydric alcohols of at least dihydric include, for example, polyethylene glycohol, glycerol, trimethylol propane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane, 1,5,6-trihydroxy-3-oxohexane pentaerythritol, and tris(2-hydroxyethyl)isocyanurate, and, in particular, preferable are polyhydric alcohols of at least trihydric and more preferable are polyhydric alcohols provided with 3–8 hydroxyl groups. In the case of preparing an alcoholic ester compound, such as glycerol, diglycerol and triglicerol, which capable of synthesizing an alcoholic ester compound containing an α,β-diol are preferred.

These alcoholic compounds include, for example, polyhydric alcoholic ester compounds such as glycerin monostearate, glycerin monolaurate, glycerin monobehenate, diglycerin monostearate, glycerin distearate, glycerin dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; 3-(octyloxy)-1,2-propanediol, 3-(decyloxy)-1,2-propanediol, 3-(lauryloxy)-1,2-propanediol, 3-(4-nonylphenyoxy)-1,2-propanediol, 1,6-dihydroxy-2,2-di(hydroxymethyl)-7-(4-nonylphenyloxy)-4- oxoheptane, an alcoholic ether compound prepared by a reaction of, a condensate of p-nonylphenylether with formaldehyde, and glycidol; an alcoholic ether compound prepared by a reaction of, a condensate of p-octylphenylether with formaldehyde, and glycidol; an alcoholic ether compound prepared by a reaction of, a condensate of p-octylphenylether with dicyclopentadiene, and glycidol. These alcoholic compounds can be utilized alone or in combination of at least two types. The molecular weight of these polyhydric alcoholic compounds is not specifically limited, however, is generally 500–2000 and preferably 800–1500, due to minimum decrease of transparency.

As (3) organic or inorganic filler, ordinary organic polymer particles or cross-linked organic polymer particles can be utilized, including, for example, those of polyolefins such as polyethylene and polypropylene; halogen-containing vinyl polymers such as polyvinyl chloride and polyvinylidene chloride; polymers derived from an α,β-unsaturated acid such as polyallylate and polymethacrylate; polymers derived from unsaturated alcohol such as polyvinyl alcohol and polyvinyl acetate; polymers derived from polyethylene oxide or bisglycidyl ehter; aromatic condensed polymers such as polyphenylene oxide, polycarbonate and polysulfone; polyurethane; polyamide; polyester; aldehyde.phenol type resin; and natural polymer compounds.

Inorganic filler includes, for example, particles of 1st group element compounds such as lithium fluoride and borax (sodium borate hydrate); 2nd group element compounds such as magnesium carbonate, magnesium phosphate, calcium carbonate, strontium titanate and barium carbonate; 4th group element compounds such as titanium dioxide (titania) and titanium monoxide; 6th group element compounds such as molybdenum dioxide and molybdenum trioxide; 7th group element compounds such as manganese chloride and manganese acetate; 8th–10th group element compounds such as cobalt chloride and cobalt acetate; 11th group element compounds such as copper iodide (I); 12th group element compounds such as zinc oxide and zinc acetate; 13th group element compounds such as aluminum oxide (alumina), aluminum fluoride, aluminosilicate (almina silicate, kaolin, kaolinite); 14th group element compounds such as silicon oxide (silica, silica gel), cliftonite, carbon, graphite and glass; and natural minerals such as carnallite, kainite, mica (mica, phlogopite) and byrose mineral.

The blending amount of above (1)–(3) is determined by a combination of an alicyclic hydrocarbon type copolymer and the compounding compound, however, generally a glass transition temperature and transparency of the composition will lowered when the blending amount is too large, which is unsuitable for utilization as an optical material. While milky-whitening of an optical element may be caused under high temperature and high humidity when the blending amount is too small. The blending amount is generally 0.01–10 weight parts, preferably 0.02–5 weight parts and specifically preferably 0.05–2 weight parts against 100 weight parts of an alicyclic hydrocarbon type copolymer. A prevention effect of milky-whitening under an environment of high temperature and high humidity can not be achieved when the blending amount is too small, while heat resistance and transparency of an optical element will be deteriorated when the blending amount is too large.

Herein, in the above "resin containing a polymer provided with an alicyclic structure", such as a UV absorbent, a light stabilizer, a near infrared absorbent, a colorant such as dye and pigment, sliding agent, a plasticizer, an anti-static agent and a fluorescent whitening agent as other compounding agents can be appropriately blended, and these can be utilized alone or in combination of at least two types; and the blending amount is suitably selected within a range not to disturb the objective of this invention.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'methyl-phenyl)benzotriazole, 2-(2H-benzotriazole-2-il)-4-methyl-6-(3,4,5,6-tetrahydrophthalimidylmethyl)phenol, 2-(2H-benzotriazole-2-il)-4,6-bis(1-methyl-1-phenylethyl)phenol, 2-(2'-hydroxy-3',5'-di-tertiary-butyl-phenyl)benzotriazole, 2-(2'-hydroxy-3'-tertiary-butyl-5'-methyl-phenyl)-5-chlorobenzotriazole, 2-(2'-hydroxy-5'-tertiary-octylphenyl)benzotriazole, 2-(2'-hydroxy-3',5'-di-tertiary-amylphenyl)benzotriazole, 2-[2'-hydroxy-3'-(3'',4'',5'',6''-tetrahydrophthalimidomethyl)-5'-methylphenyl]benzotriazole and 2,2'-methylenebis-[4-(1,1,3,3-tetramthylbutyl)-6-(2H-benzotriazole-2-il)phenol]. Among these, preferable are 2-(2'-hydroxy-5'-methyl-phenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to heat resistance and low volatility.

Light stabilizers include such as benzophenone type light stabilizers, benzotriazole type light stabilizers and hindered-amine type light stabilizers, however, in this invention, preferably utilized are hindered-amine type light stabilizers with respect to transparency and coloring resistance of a lens. Among hindered-amine type light stabilizers (hereinafter, described as "HALS"), those having a Mn of polystyrene conversion, which is measured by use of GPC employing THF as a solvent, of preferably 1,000–10,000, more preferably 2,000–5,000 and specifically preferably 2,800–3,800. When the Mn is too small, a predetermined amount may not be blended due to evaporation at the time of said HALS being blended in a block copolymer by thermal fusion kneading, or foams and silver streaks may be generated at the time of thermal fusion optical element in such as injection molding, resulting in deterioration of manufacturing stability. Further, a volatile component may be generated as a gas from a lens in the case of the lens is used for a long time while a lamp is lit. On the contrary, when the Mn is too large, dispersibility into a block copolymer is lowered to decrese transparency of the lens, resulting in decrease of an effect of light fastness improvement. Therefore, in this invention, a lens, which is superior in manufacturing stability, low gas generation as well as transparency, can be obtained by setting the Mn of HALS in the above range.

Specific examples of these HALS include high molecular weight HALS in which a plural number of pyperidine rings are bonded via a triazine skeleton such as N,N',N'',N'''-tetrakis-[4,6-bis-{butyl-(N-methyl-2,2,6,6-tetramethylpyperidine-4-yl)amino}-triazine-2-yl]-4,7-diazadecane-1,10-diamine, a polycondensate of dibutyl amine, 1,3,5-triazine and N,N'-bis(2,2,6,6-tetramethyl-4-pyperidyl)butylamine, poly[{(1,1,3,3-tetramethylbutyl)amino-1,3,5-triazine-2,4-diyl}[(2,2,6,6-tetramethyl-4-pyperidyl)imino]-hexamethylene[(2,2,6,6-tetramethyl-4pyperidyl)imino]], a polycondensate of 1,6-hexadiamine-N,N'-bis(2,2,6,6-tetramethyl-4-pyperidyl) and morphorine-2,4,6-trichloro-1,3,5-triazine, poly[(6-morphorino-s-tiazine-2,4-diyl)(2,2,6,6-tetramethyl-4-pyperidyl)imno]-hexamethylene[(2,2,6,6-tetramethyl-4-pyperidyl)imino]; and a high molecular weight HALS in which a pyperidine ring is bonded via a ester bond such as a polymer of dimethyl succinate and 4-hydroxy-2,2,6,6-tetramethyl-1-pyperidineethanol, a mixed esterified compound of 1,2,3,4-butane tetracarbonate, 1,2,2,6,6-pentamethyl-4-pyperidinol and 3,9-bis(2-hydroxy-1,1-dimethylethyl)-2,4,8,10-tetraoxaspiro[5,5]undecane.

Among these, preferable are a polycondensate of dibutyl amine and 1,3,5-triazine and N,N'-bis(2,2,6,6-tetramethyl-4-pyperidyl)butylamine, poly[{(1,1,3,3-tetramethylbutyl)amino-1,3,5-triazine-2,4-diyl}[(2,2,6,6-tetramethyl-4-pyperidyl)imino]-hexamethylene[(2,2,6,6-tetramethyl-4-pyperidyl)imino]] and a polymer of dimethyl succinate and 4-hydroxy-2,2,6,6-tetramethyl-1-pyperidineethanol, having a Mn of 2,000–5,000.

The blending amount of the above UV absorbent and HALS against a block copolymer according to this invention is preferably 0.01–20 weight parts, more preferably 0.02–15 weight parts and most preferably 0.05–10 weight parts against 100 parts of the polymer. When the addition amount is too small, the effect to improve light fastness cannot be achieved sufficiently, resulting in generation of coloring in the case of outdoor applications for a long period of time. On the other hand, when the blending amount of HALS is too large, transparency of the lens is deteriorated due to generation of a gas arising from a part of HALS or deterioration of dispersibility of a block copolymer.

Further, the above "resin containing a polymer provided with an alicyclic structure" compositions can be prepared by suitably mixing the above each component. The mixing methods are not specifically limited provided they can sufficiently disperse each component into a hydrocarbon type polymer, and include a method in which resin being in a fused state is kneaded by such as a mixer, a biaxial kneader, a roll, a Brabender and extruder and a method in which each component is dissolved in a suitable solvent to be dispersed and followed by being coagulated. In the case of employing a biaxial kneader, the resin composition is extruded as a bar form generally in a fused state, then being cut into a suitable length by use of a strand cutter. resulting in being mostly utilized as a pelletized molding material.

In more detail, "resin containing a polymer provided with an alicyclic structure" is preferably contains a block polymer provided with polymer block [A] which contains repeating unit [1] represented by following formula (11), and polymer block [B] which contains repeating unit [1] represented by following formula (11), and repeating unit [2] represented by following formula (12) or/and repeating unit [3] represented by following formula (13), and the relationship between mol fraction a (mol %) of repeating unit [1] in aforesaid polymer block [A] and mol fraction b (mol %) of repeating unit [1] in aforesaid polymer block [B] preferably satisfies a>b.

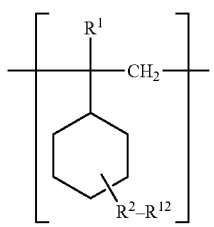

Formula (11)

In formula (11), $R^1$ represents a hydrogen atom or an alkyl group having a carbon number of 1–20; and $R^2$–$R^{12}$ each represent a hydrogen atom, an alkyl group having a carbon number of 1–20, a hydroxyl group, an alkoxy group having a carbon number of 1–20 or a halogen group.

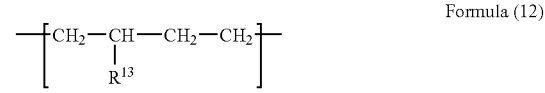

Formula (12)

In formula (12), $R^{13}$ represents a hydrogen atom or an alkyl group having a carbon number of 1–20.

Formula (13)

In formula (13), $R^{14}$ and $R^{15}$ each represent a hydrogen atom or an alkyl group having a carbon number of 1–20.

A preferable structure of repeating unit [1] represented by above formula (11) is one in which $R^1$ is a hydrogen atom or a methyl group, and all $R^2$–$R^{12}$ are hydrogen atoms. When the content of a repeating unit [1] in polymer block [A] is in the above range, transparency and mechanical strength are superior. The residual part other than the aforesaid repeating unit [1] in polymer block [A] is a hydride of a repeating unit arising from chain conjugated dien and chain vinyl compound.

Polymer block [B] contains aforesaid repeating unit [1], and repeating unit [2] represented by following formula (12) or/and repeating unit [3] represented by following formula (13). The content of repeating unit [1] in polymer block [B] is preferably 40–95 mol % and more preferably 50–90 mol %. When the content of repeating unit [1] is in the above range, transparency and mechanical strength are superior. It is preferred to make (2×m2+m3) of not less than 2 mol %, more preferably 5–60 mol % and most preferably 10–50 mol %, when a mol fraction of repeating unit [2] is m2 (mol %) and a mol fraction of repeating unit [3] is m3 (mol %), in block [B].

Preferable structures of repeating unit [2] represented by above formula (12) are those in which $R^{13}$ is a hydrogen atom or a methyl group.

Preferable structures of repeating unit [3] represented by above formula (12) are those in which $R^{14}$ is a hydrogen atom and $R^{15}$ is a methyl group or an ethyl group.

When the content of aforesaid repeating unit [2] or repeating unit [3] in polymer block [B] is too small, the mechanical strength is decreased. Therefore, the transparency and mechanical strength are superior when the content of repeating unit [2] and repeating unit [3] are in the above range. Polymer block [B] may further contain repeating unit [X] represented by following formula (X). The content of repeating unit [X] is in a range not to disturb the characteristics of block copolymer of this invention, and is preferably not more than 30 mol % and more preferably not more than 20 mol %, against the total block copolymer.

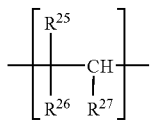

Formula (X)

In formula (X), $R^{25}$ represents a hydrogen atom or an alkyl group having a carbon number of 1–20; $R^{26}$ represents a nitrile group, alkoxycarbonyl group, a formyl group, a hydroxycarbonyl group or a halogen group; and $R^{27}$ represents a hydrogen atom. Or $R^{26}$ and $R^{27}$ may bond each other to form an acid anhydride or an imide group.

Further, block copolymer utilized in this invention satisfies relationship a>b, when a mol fraction of repeating unit [1] in polymer block [A] is a and a mol fraction of repeating unit [1] in polymer block [b] is b. Thereby, the transparency and mechanical strength are superior.

Further, a block copolymer utilized in this invention is superior in mechanical strength and heat resistance, in the case of ratio (ma/mb) is preferably 5/95–95/5, more preferably 30/70–95/5 and most preferably 40/60–90/10, when ma is a mol number of the total repeating unit constituting block [A], and mb is a mol number of the total repeating unit constituting block [B].

The molecular weight of a block copolymer utilized in this invention is in a range of preferably 10,000–300,000, more preferably 15,000–250,000 and most preferably 20,000–200,000, based on a polystyrene (or polyisoprene) conversion weight average molecular weight (hereinafter, described as "Mw") measured by means of gel permeation chromatography (hereinafter, described as GPC) employing tetrahydrofuran as a solvent. When the Mw of a block copolymer is in the above range, the balance of mechanical strength, heat resistance and molding capability is excellent.

The molecular weight distribution of a block copolymer can be suitably selected depending on application purposes, however, the mechanical strength and heat resistance are superior when it is in a range of not more than 5, more preferably not more than 4 and most preferably not more than 3, based on ratio (Mw/Mn) of Mw to a number average molecular weight (hereinafter, described as "Mn") of polystyrene (polyisoprene) conversion, which is measured by means of GPC.

The glass transition temperature (hereinafter, described as "Tg") of a block copolymer is suitably selected according to application purposes, however, is preferably 70–200° C., more preferably 80–180° C. and most preferably 90–160° C., based on a measured value on the higher temperature side by use of a differential scanning type calorimeter (hereinafter, described as ""DSC).

The above block copolymer utilized in this invention may be any of a di-block copolymer of ([A]-[B]) form provided with polymer block [A] and polymer block [B], a tri-block copolymer of ([A]-[B]-[A]) form or ([B]-[A]-[B]) form, or a block copolymer in which at least total four of polymer block [A] and polymer block [B] are alternately connected. Further, it may be a block copolymer in which these blocks are bonded in a radial form.

A block copolymer utilized in this invention can be prepared by the following method. The methods include such a method, in which a monomer mixture containing an aromatic vinyl compound or/and an alicyclic vinyl compound provided with an unsaturated bond in the ring, and a monomer mixture containing a vinyl type monomer, are polymerized to prepare a block copolymer provided with a polymer block containing a repeating unit arising from an aromatic vinyl compound or/and an alicyclic vinyl compound, and a polymer block containing a repeating unit arising from a vinyl type monomer, and an aromatic ring or/and an alicyclic ring of said block copolymer being hydrogenated; and a method, in which a monomer mixture containing an unsaturated alicyclic vinyl compound, and a monomer mixture containing a vinyl type monomer (except an aromatic vinyl compound and an alicyclic vinyl compound) are polymerized to prepare a block copolymer provided with a polymer block, which contains a repeating unit arising from an alicyclic vinyl compound and a polymer block containing a repeating unit arising from a vinyl type monomer. Among them, a more preferable block copolymer utilized in this invention can be prepared, for example, by the following method.

(1) As the first method, firstly, a monomer mixture [a'] containing not less than 50 mol % of an aromatic vinyl compound or/and an alicyclic vinyl compound provided with an unsaturated bond in the ring is polymerized to prepare polymer block [A'] containing a repeating unit arising from an aromatic vinyl compound or/and an alicyclic compound provided with an unsaturated bond in the ring. A monomer mixture [b'], which contains not less than 2 mol % of a vinyl type monomer (except an aromatic vinyl compound and an alicyclic vinyl compound) and an aromatic vinyl compound or/and an alicyclic vinyl compound provided with an unsaturated bond in the ring at a ratio of not more than the ratio in a monomer mixture [a'], are polymerized to prepare a polymer block [B'] containing a repeating unit arising from an aromatic vinyl compound or/and an alicyclic vinyl compound and a repeating unit arising from vinyl type monomer. After preparing a block copolymer provided with the aforesaid polymer block [A'] and polymer block [B'] is obtained, an aromatic ring or/and an alicyclic ring of said block polymer is hydrogenated.

(2) As the second method, firstly, a monomer mixture [a] containing not less than 50 mol % of a saturated alicyclic vinyl compound is polymerized to prepare polymer block [A] containing a repeating unit arising from a saturated alicyclic vinyl compound. A monomer mixture [b], which contains not less than 2 mol % of a vinyl type monomer (except an aromatic vinyl compound and an alicyclic vinyl compound) and a saturated alicyclic vinyl compound at a ratio of not more than the ratio in a monomer mixture [a], is polymerized to prepare a polymer block [B] containing a repeating unit arising from a saturated alicyclic vinyl compound and a repeating unit arising from vinyl type monomer. Block copolymer provided with aforesaid polymer block [A] and polymer block [B] is prepared via at least these processes.

Among the above-described methods, above method (1) is more preferred with respect to such as easy availability of monomers, a polymerization yield and easy introduction of a repeating unit [1] into polymer block [B'].

Specific examples of an aromatic vinyl compound in above method (1) include styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, 4-phenylstyrene, and those in which a substituent such as a hydroxyl group and an alkoxy group is introduced therein. Among them, styrene, 2-methylstyrene, 3-methylstyrene and 4-methylstyrene are preferred.

Specific examples of an unsaturated alicyclic vinyl compound in above method (1) include such as cyclohexenyl ethylene, α-methylcyclohexenyl ethylene and α-t-butylcyclohexenyl ethylene, and these provided with a substituent such as a halogen group, an alkoxy group or a hydroxyl group.

These aromatic vinyl compounds and alicyclic vinyl compounds can be utilized each alone or in combination of at least two types, however, in this invention, it is preferred to utilize an aromatic vinyl compound, and among them more preferred is styrene or α-methylstyrene, in either monomer mixture [a'] and [b'].

A vinyl type monomer utilized in the above method includes a chain vinyl compound and a chain conjugated diene compound.

Specific examples of a chain vinyl compound include chain olefin monomers such as ethylene, propyrene, 1-butene, 1-pentene and 4-methyl-1-pentene; and most preferable among them are ethylene, propyrene and 1-butene.

Chain conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable is a chain conjugated diene and specifically preferable are butadiene and isoprene. These chain vinyl compounds and chain conjugated dienes can be utilized alone or in combination of at least two types.

When a monomer mixture containing the above-described monomer is polymerized, the polymerization reaction may be performed by any method of such as radical polymerization, anionic polymerization and cationic polymerization, however, preferable is anionic polymerization and most preferable is living anion polymerization in the presence of an inert solvent.

Anionic polymerization is performed in the presence of a polymerization initiator in a temperature range of generally 0–200° C., preferably 20–100° C. and specifically preferably 20–80° C. As an initiator, utilized can be organic monolithiums such as n-butyl lithium, sec-butyl lithium, t-butyl lithium, hexyl lithium and phenyl lithium; and polyfunctional organic lithium compounds such as dilithiomethane, 1,4-dilithiobutane, 1,4-dilithio-2-ethyl cyclohexane.

Inert solvents utilized include, for example, aliphatic hydrocarbons such as n-butane, n-pentane, isopentane, n-hexane, n-heptane and isooctane; alicyclic hydrocarbons such as cyclopentane, cyclohexane, methylcyclopentane, methylcycloheane and decalin; aromatic hydrocarbons such as benzene and toluene, and it is preferred to employ aliphatic hydrocarbons and alicyclic hydrocarbons among them, because these can be also utilized as an inert solvent in hydrogenation reaction as they are. These solvents can be utilized each alone or in combination of at least two types, and utilized so as to make a ratio of generally 200–10,000 weight parts against 100 weight parts of the total using monomer.

When polymerizing each polymer block, a polymerization promoter or a randomizer can be utilized to prevent a chain of one certain component from growing long. In particular, when performing polymerization by means of anionic polymerization, such as a Lewis base compound can be utilized as a randomizer. Specific examples of a Lewis base compound include ether compounds such as dimethyl ether, diethyl ether, diisopropyl ether, dibutyl ether, tetrahydrofuran, diphenyl ether, ethyleneglycol diethyl ether and ethyleneglycol methyl phenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphosphine. These Lewis base compounds can be utilized each alone or in combination of at least two types.

A method to prepare a block copolymer by means of living anion polymerization includes conventionally well known methods such as a consecutive addition polymerization reaction method and a coupling method; however, a consecutive addition polymerization reaction method is preferably utilized in this invention.

In the case of preparing the above block copolymer provided with polymer block [A'] and polymer block [B'] by a consecutive addition polymerization reaction method, a process to prepare polymer block [A'] and a process to prepare polymer block [B'] are continuously performed in succession. Specifically, monomer mixture [a'] is polymerized, in an inert solvent in the presence of living anion polymerization catalyst, to prepare polymer block [A'], and successively monomer mixture [b'] is added into the reaction system to continue polymerization, resulting in preparation of polymer block [B'] connected with polymer block [A']. Further, according to a requirement, monomer mixture [a'] is added again and polymerization is performed to connect polymer block [A'] with the aforesaid product to form a tri-block polymer; and further, monomer mixture [b'] is added again and polymerization is performed to connect polymer block [B'] with the aforesaid product to form a tetra-block polymer.

The prepared block copolymer is recovered by such as a steam stripping method, a direct desolvent method and an alcohol coagulation method. In the case of employing a solvent, which is inactive in a hydrogenation reaction, in a polymerization reaction, a block copolymer is not required to be recovered from the polymerization solution because the polymerization solution can be utilized also in a hydrogenation reaction process as it is.

Among block copolymers (hereinafter, referred as "block copolymer before hydrogenation") provided with polymer block [A'] and polymer block [B'], preferable are those having a repeating unit of the following structure.

Preferable polymer block [A'] constituting a block copolymer before hydrogenation is a polymer block containing not less than 50 mol % of repeating unit [4] represented by following formula (14).

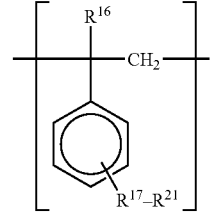

Formula (14)

In formula (14), $R^{16}$ represents a hydrogen atom or an alkyl group having a carbon number of 1–20, and $R^{17}$–$R^{21}$ represent each independently a hydrogen atom, an alkyl group having a carbon number of 1–20, a hydroxyl group, an alkoxy group having a carbon number of 1–20 or a halogen group. Herein, [$R^{17}$–$R^{21}$] described above represents $R^{17}$, $R^{18}$, ... and $R^{21}$.

Further, preferable polymer block [B'] is one which necessarily contains aforesaid repeating unit [4] and at least either one of repeating unit [5] represented by following formula (15) or repeating unit [6] represented by following formula (16). Further, relationship a'>b' is satisfied when a mol fraction of repeating unit [4] in polymer block [A'] is a' and a mol fraction of repeating unit [4] in polymer block [B'] is b'.

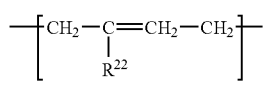

Formula (15)

In formula (15), $R^{22}$ represents a hydrogen atom or an alkyl group having a carbon number of 1–20.

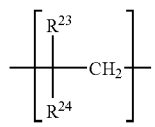

Formula (16)

In formula (16), $R^{23}$ represents a hydrogen atom or an alkyl group having a carbon number of 1–20, and $R^{24}$ represents a hydrogen atom, or an alkyl group or alkenyl group, which have a carbon number of 1–20.

Further, in block [B'], repeating unit [Y] represented by following formula (Y) may be contained.

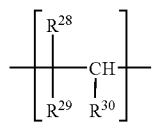

Formula (Y)

In formula (Y), $R^{28}$ represents a hydrogen atom or an alkyl group having a carbon number of 1–20; $R^{29}$ represents a nitrile group, an alkoxycarbonyl group, a formyl group, a hydroxycarbonyl group or a hlogen group; and $R^{30}$ represents a hydrogen atom. Or $R^{29}$ and $R^{30}$ may bond each other to form an acid anhydride or an imide group.

Further, a preferable block copolymer before hydrogenation has the ratio (ma'/mb') of 5/95–95/5, more preferably 30/70–95/5 and most preferably 40/60–90/10, when a mol number of the total repeating unit constituting block [A'] is ma' and a mol number of the total repeating unit constituting block [B'] is mb'. When ma'/mb' is in the above range, the mechanical strength and heat resistance are superior.

The molecular weight of a preferred block copolymer before hydrogenation is in a range of 12,000–400,000, more preferably 19,000–350,000 and most preferably 25,000–300,000, based on a polystyrene (or isoprene) conversion Mw measured by means of GPC employing THF as a solvent. The mechanical strength is lowered when Mw of a block copolymer is extremely small, while a hydrogenation ratio is lowered when it is extremely large.

The molecular weight distribution of a preferred block copolymer before hydrogenation is suitably selected according to application purposes, however, the ratio (Mw/Mn) of Mw against Mn, of polystyrene(or polyasoprene) conversion, which is measured by means of GPC, is preferably not more than 5, more preferably not more than 4 and most preferably not more than 3. The hydrogenation ratio is improved when Mw/Mn is in this range.

Tg of a preferable block copolymer before hydrogenation may be suitably selected according to application purposes, however, is 70–150° C., more preferably 80–140° C. and most preferably 90–130° C. based on the measured value on the higher temperature side by means of DSC.

When performing a hydrogenation reaction of a carbon-carbon double bond of an unsaturated ring, such as an aromatic ring and a cycloalkene ring, and an unsaturated bond of a main chain or side chain, in the aforesaid copolymer before hydrogenation, there is no specific limitation with respect to a reaction method and a reaction form and a commonly known method can be applied; however, preferable is a hydrogenation method which can provide a high hydrogenation ratio and minimize polymer chain cutting reaction, including a method which is performed in an organic solvent utilizing a catalyst containing at least one metal selected from nickel, cobalt, iron, titanium, rhodium, palladium, ruthenium and rhenium. As a hydrogenation catalyst, either of an inhomogeneous system catalyst and a homogeneous system catalyst can be utilized.

An inhomogeneous type catalyst can be utilized as a metal or a metal compound itself, or being held by a suitable carrier. Carriers include, for example, active carbon, silica, alumina, calcium carbon, titania, magnesia, zirconia, diatomaceous earth and silicon carbide, and the carrying amount of a catalyst is in a range of generally 0.01–80 weight % and preferably 0.05–60 weight %. As a homogeneous system catalyst, a catalyst in which a nickel, cobalt, titanium or iron compound and an organometalic compound are combined, or an organometalic complex catalyst of such as rhodium, parlladium, platinum, ruthenium and rhenium. As compounds of nickel, titanium and iron, for example, acetylacetonates, naphtenates, cyclobutadienyl compounds and cyclopentadienyl dichloro compounds, of various metals can be utilized. As organoaluminum compounds, preferably utilized can be alkylaluminums such as triethylaluminum and triisobutylaluminum; aluminum halogenides such as diethylaluminum chloride and ethylaluminum dichloride; and hydrogenated alkyl aluminums such as diiosbutylaluminum hydride.

As examples of an organometallic complex catalyst, utilized are metal complexes such as a γ-dichloro-π-benzene complex, a dichloro-tris(triphenylphosphine) complex and a hydride-chloro-triphenylphosphine complex of each metal described above. These hydrogenated catalysts can be utilized each alone or in combination of at least two types, and the using amount is preferably 0.01–100 weight parts and more preferably 0.05–50 parts and most preferably 0.1–30 parts, against 100 weight parts of a polymer.

A hydrogenation reaction is performed at generally 10–250° C., however, preferably at 50–200° C. and more preferably at 80–180° C., because a hydrogenation ratio can be increased as well as a polymer chain cutting reaction can be minimized. Further, the hydrogen pressure is generally 0.1–30 MPa, however, is more preferably 1–20 MPa and most preferably 2–10 MPa, with respect to operation easiness in addition to the above reasons.

A hydrogenation ratio of thus obtained hydrides, with respect to any of a carbon-carbon unsaturated bond of the main chain, and a carbon-carbon double bond of an aromatic ring and a cycloalkene ring, is preferably not less than 90%, more preferably not less than 95% and most preferably not less than 97%, based on a measurement by means of $^1$H-NMR. When the hydrogenation ratio is low, birefringence may increase and thermal stability of the obtained copolymer may be deteriorated.

A copolymer after finishing the hydrogenation reaction can be recovered by a method in which a solvent is directly removed from the solution of a hydride by drying after removing a hydrogenation catalyst by a method such as filtration and centrifugal separation, and a method in which the solution of a copolymer is poured into a poor solvent for the block copolymer resulting in coagulation of the copolymer.

Further, milky-whitening under an environment of high temperature and high humidity for a long period can be prevented without deteriorating various characteristics such as transparency, thermal resistance and mechanical strength by blending a soft polymer having the lowest glass transition temperature of not higher than 30° C. into a block copolymer of this invention.

Specific examples of these soft polymers include, for example, olefin type soft polymers such as liquid polyethylene, polypropyrene, poly-1-butene, an ethylene.α-olefine copolymer, a propylene.α-olefine copolymer, an ethylene.propylene.diene copolymer (EPDM) and an ethylene.propylene.styrene copolymer; isobutylene type soft polymers such as polyisobutylene, isobutylene.isoprene rubber and an isbutylene.styrene copolymer; diene type soft polymers such as polybutadiene, polyisoprene, a butadiene.styrene random copolymer, an isoprene.styrene random copolymer, an acrylonitrile.butadiene copolymer, an acrylonitrile.butadiene.styrene copolymer, a butadiene.styrene block copolymer, an isoprene.styrene block copolymer and a styrene.isoprene.styrene block copolymer; silicon-containing soft polymers such as dimethylpolysiloxane, diphenylpolysiloxane and dihydroxypolysiloxane; soft polymers containing an α,β-unsaturated acid such as polybutylacrylate, polybutylmethacrylate, polyhydroxyethylmethacrylate, polyacrylamide, polyacrylonitrile and a butylacrylate.styrene copolymer; soft polymers containing an unsaturated alcohol, and amine or an acyl derivative thereof or acetal, such as polyvinyl alcohol, polyvinyl acetate, polyvinyl stearate, a vinyl acetate.styrene copolymer; epoxy type soft polymers such as polyethylene oxide, polypropylene oxide and epichlorohydrine rubber; fluorine-containing soft polymers such as vinylidene fluoride type rubber and tetrafluoroethylene-propylene rubber; and other soft polymers such as natural rubber, polypeptide, protein, a polyester type thermoplastic elastomer, a vinyl chloride type thermoplastic elastomer and a polyamide type thermoplastic elastomer. These soft polymers may be those provided with a cross-linking structure or those in which a functional group is introduced by a modification reaction.

Among the above soft polymers, a diene type soft polymer is preferable, and specifically, hydrides in which a carbon-carbon unsaturated bond of said soft polymer is hydrogenated are superior in rubber elasticity, mechanical strength, flexibility and dispersibility. The blending amount of a soft polymer differs depending on types of the compound, however, generally, when the blending amount is too large, the glass transition temperature and transparency of a block copolymer is significantly lowered, which makes the copolymer unusable as a lens. While, milky-whitening of a molding under high temperature and high humidity may be caused when the blending amount is too small. The blending amount is preferably 0.01–10 weight parts, more preferably 0.02–5 weight parts and most preferably 0.05–2 weight parts, against 100 weight parts of a block copolymer.

A method to form a block copolymer composition by blending the above compounding agent in a block copolymer utilized in this invention includes, for example, a method in which a block copolymer is kneaded with a compounding agent in a fused state by use of such as a mixer, a Brabender and an extruder; and a method in which a block copolymer and a compounding agent are dissolved in a suitable solvent and dispersed, followed by being coagulated. In the case of utilizing a biaxial kneader, the product is generally extruded as a strand state after having been kneaded and then often utilized by being cut into a pellet form by use of a pelletizer.

"Resin containing a polymer provided with an alicyclic structure", other than the above resin, may be those containing a hydrogenated norbornene ring-opening polymer, a saturated bond ratio of which is 99.92–99.99% calculated from a peak area detected with a UV spectrometer and a differential refractometer in gel permeation chromatography (GPC).

A saturated bond ratio is a calculated value corresponding to a ratio of a carbon-carbon saturated bond in the total carbon-carbon bonds in an open ring polymer hydride, which is calculated from peak areas $S_1$ and $S_2$ detected with a UV spectrometer and a differential refractometer in gel permeation chromatography (GPC), as described below. The saturated bond ratio is represented by the following equation: saturated bond ratio (%)=100+k×($S_1/S_2$), when a peak area detected by a UV spectrometer is $S_1$ and a peak detected by a differential refractometer is $S_2$ in the case of a molecular weight of a hydrogenated norbornene ring-opening polymer being measured by means of gel permeation chromatography (GPC). Herein, $S_1$ generally becomes small, when the smaller becomes a ratio of carbon-carbon double bond in a polymer. Further, "100—saturated bond ratio" is a ratio of a carbon-carbon unsaturated bond. When hydrogenation is completely performed, the saturated bond ratio is 100%.

In the above equation, k is calculated according to the following procedure. (1) Hydrogenation ratios of a plural number of polymer samples are measured by means of $^1$H-NMR. (2) A sample solution is prepared by use of cyclohexane as a solvent so as to make a concentration of a polymer of 0.5 weight %. (3) The molecular weight of the sample solution obtained in above (2) is measured by means of gel permeation chromatography (GPC) and ($S_1/S_2$) is calculated from a peak area ($S_1$) which is detected with a UV spectrometer and a peak area ($S_2$) which is detected with a differential refractometer, of GPC. (4) Plotted are a hydrogenation ratio calculated by means of $^1$H-NMR on the ordinate and $S_1/S_2$ on the abscissa, and the slope k calculated by a method of least square is defined as k. k is generally a negative value. Herein, a hydrogenation ratio by means of $^1$H-NMR is calculated from an integrated value of a peak area in the $^1$H-NMR spectrum of a polymer before and after hydrogenation.

A saturated bond ratio is calculated according to the following procedure. (1) A solution, for gel permeation chromatography (GPC) measurement of a hydrogenated norbornene ring-opening polymer, is prepared. Cyclohexane is employed as a solvent, and the concentration of the aforesaid hydride in the solution is set to 0.5 weight %. (2) The molecular weight of the solution prepared in above (1) is measured by means of gel permeation chromatography (GPC) and a peak area ratio ($S_1/S_2$) is calculated from a peak area ($S_1$) which is detected with a UV spectrometer and a peak area ($S_2$) which is detected with a differential refractometer, of GPC. (3) A saturated bond ratio is calculated from peak area ratio ($S_1/S_2$) calculated in above (2) and calculated k, according to the following equation:

$$\text{Saturated bond ratio (\%)}=100+k\times(S_1/S_2)$$

A norbobnene open ring polymer hydride is provided with 50–100 weight %, preferably 70–100 weight % and more preferably 90–100 weight % of a repeating unit arising from a norbornene monomer represented by following formula (21).

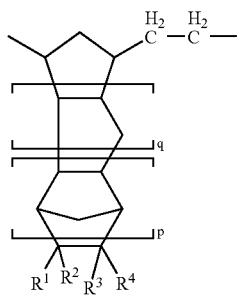

Formula (21)

(In general formula (21), $R^1$–$R^4$ each independently represent a hydrogen atom, a hydrocarbon group having a carbon number of 1–20, or a group containing a halogen atom, a silicon atom, an oxygen atom or a nitrogen atom; and $R^1$ and $R^4$ may bond each other to form a ring. p is 0, 1 or 2. q is 0 or 1.)

A hydrogenated norbornene ring-opening polymer is prepared as follows: a norbornene monomer and an open ring polymerization catalyst are charged in a reaction system to be subjected to open ring polymerization, and said catalyst is added even after finishing addition of said monomer to complete open ring polymerization resulting in preparation of a norbornene type open ring polymer, which is then hydrogenated in the presence of a hydrogenation catalyst.

A norbornene monomer constituting a hydrogenated norbornene ring-opening polymer is norbornenes, norbornene derivatives provided with a ring structure other than a norbornene ring, or polycyclic cyclo-olefins provided with a norbornene ring of such as tetracycododecenes and hexacycoheptadecenes, and typically represented by following general formula (22). These monomers may be further provided with a hydrocarbon group such as an alkyl group, an alkenyl group and an alkylydene group; a group containing a nitrogen atom, an oxygen atom, a silicon atom, a phosphor atom or a sulfur atom; or a double bond other than the double bond of a norbornene ring.

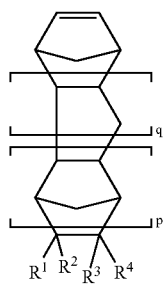

Formula (22)

(In general formula (22), $R^1$–$R^4$, p and q are identical to those in above general formula (21).)

Norbornenes are norbornene monomers in which p and q of general formula (22) are 0. Specific examples include unsubstituted or alkyl group substituted norbornenes such as norbornene, 5-methylnorbornene, 5-ethylnorbornene, 5-butylnorbornene, 5-hexylnorbornene, 5-decylnorbornene, 5-cyclohexylnorbornene and 5-cyclopentylnorbornene; norbornenes provided with an alkenyl group such as 5-ethylidenenorbornene, 5-vinylnorbornene, 5-propenylnorbornene, 5-cyclohexenylnorbornene and 5-cyclopentenylnorbornene; norbornenes provided with an aromatic group such as 5-phenylnorbornene; norbornenes provided with an oxygen atom such as 5-methoxycarbonylnorbornene, 5-ethoxycarbonynorbornen, 5-methyl-5-methoxycarbonylnorbornen, 5-methyl-5-ethoxycarbonylnorbornen, norbornenyl-2-methylpropionate, norbornenyl-2-methyloctanate, norbornene-5,6-dicarbonate anhydride, 5-hydroxymethylnorbornene, 5,6-di(hydroxymethyl)norbonene, 5,5-di(hydroxymethyl)norbonene, 5-hydroxy-i-propylnorbornene, 5,6-dicarboxynorbornene and 5-methoxycarbonyl-6-carboxynorbornene; and norbornenes provided with a group containing a nitrogen atom such as norbornene-5,6-dicarboxylic acid imide.

Norbornene derivatives provided with a ring structure other than a norbornene ring are norbornene monomers in which p is 0, q is 0 or 1, and $R^1$ and $R^4$ bond each other to form a ring structure other than a norbornene ring and a 5-membered ring, in general formula (22). Specifically, listed are dicyclopentadienes in which p is 0 and q is 1, and norbornene derivatives in which p is 0, q is 1 and an aromatic ring is provided. Specific examples of dicyclopentadienes include tricyclo[4. 3. 0. $1^{2.5}$]deca-3,7-diene (customary name: dicyclopentadiene), which is provided with a double bond in a 5-membered ring portion, and tricyclo[4. 3. $1^{2.5}$. 0]deca-3-ene, tricyclo[4. 4. $1^{2.5}$.0]unda-3-ene, in which a double bond in a 5-membered ring is saturated. Specific examples of norbornene derivatives which have p of 0 and q of 1 and are provided with an aromatic ring include tetracyclo[6. 5. $1^{2.5}$. $0^{1.6}$. $0^{8.13}$] trideca-3,8,10,12-tetraene (also referred to as 1,4-methano-1,4,4a,9a-tetrahydrofluorene).

Tetracyclododecenes are norbornene monomers which have p of 1 and q of 0 in general formula (22). Specific examples include unsubstituted or alkyl group substituted tetracyldodecenes such as tetracyldodecene, 8-methyltetracycldodecene, 8-ethyltetracycldodecene, 8-cyclohexyltetracycldodecene and 8-cyclopentyltetracycldodecene; tetracyclododecenes provided with a double bond outside the ring such as 8-methylidene tetracycldodecene, 8-ethylidene tetracycldodecene, 8-vinyltetracyclodecene, 8-propenyltetracyclodecene, 8-cyclohexenyltracycldodecene and 8-cyclopentenyltetracycldodecene; tetracyclodecenes provided with an aromatic ring such as 8-phenyltetracyclododecene; tetracyclodecenes containing an oxygen atom such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarbonate and tetracyclododecene-8,9-dicarbonate anhydride; tetracyclodecenes containing a nitrogen atom such as 8-cyanotetracyclododecene and tetracyclododecene-8,9-dicarboxylic acid imide; tetracyclodecenes containing a halogen atom such as 8-chlorotetracyclododecene; tetracyclododecenes containing a silicon atom such as 8-trimethoxysilyltetracyclododecene.

Hexacycloheptadecenes are norbornene monomers having p of 2 and g of 0 in general formula (22). Specific examples include unsubstituted or alkyl group substituted hexacycloheptadecenes such as hexacycloheptadecene, 12-methylhexacycloheptadecene, 12-ethylhexacycloheptadecene, 12-cyclohexylhexacycloheptadecene and 12-cyclopentylhexacycloheptadecene; hexacycloheptadecenes provided with a double bond outside the ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene and 12-cyclopentenylhexacycloheptadecene; hexacycloheptadecenes provided with an aromatic ring such as 12-phenylhexacycloheptadecene; hexacycloheptadecenes containing an oxygen atom such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-anhydride and hexacycloheptadecene-12,13-dicarbonate anhydride; hexacycloheptadecenes containing a nitrogen atom such as 12-cyanohexacycloheptadecene and hexacycloheptadecene-12,13-dicarbimide; hexacycloheptadecenes containing a halogen atom such as 12-chloro hexacycloheptadecene; cycloheptadecenes containing a silicon atom such as 12-trimethoxysilyltetracyclodecene. The above norbornene monomers may be utilized each alone or in combination of at least two types.

A hydrogenated norbornene ring-opening polymer may contain a repeating unit arising from a monomer which is copolymerizable with a norbornene monomer. Other monomers which are copolymerizable with a norbornene monomer are not specifically limited, however, for example, include cycloolefins such as cyclobutene, cyclopentene, cyclohexene, 3,4-dimethylcyclopentene, 3-methylcyclohexene, 2-(2-methylbutyl)-1-cyclohexene and cyclooctene, 3a,5,6,7a-tetrahydro-4,7-methano-1H-indene; and non-conjugated dienes such as 1,4-hexadiene, 4-methyl-1,4-hexadiene, 5-metyl-1,4-hexadiene and 1,7-octadiene.

The content of these repeating units arising from other monomers which are copolymerizable with a norbornene monomer is generally 0–50 weight %, preferably 0–30 weight % and more preferably 0–10 weight %.

The polyisoprene conversion weight average molecular weight of a norbornene open ring polymer hydride, which is measured by means of gel permeation chromatography employing cyclohxane as a solvent, is generally 10,000–100,000, preferably 13,000–70,000, more preferably 14,000–60,000 and most preferably 15,000–50,000. Further, the molecular weight distribution (MWD), which is represented by a ratio of a weight average molecular weight to a number average molecular weight (Mw/Mn), is generally 1.5–5.0, preferably 1.7–4.0 and more preferably 1.8–3.0.

A norbornene open ring polymer hydride is more preferable when the smaller is the ratio of a component having the polyisoprene conversion weight average molecular weight (Mw), which is measured by means of gel permeation chromatography employing cyclohxane as a solvent, of not less than 75,000. Specifically, it is not more than 15 weight % and preferably not more than 10 weight %, based on the total polymer.

The glass transition temperature (Tg) of a norbornene open ring polymer hydride is suitably selected according to application purposes, however, is in a range of generally 30–300° C., preferably 60–250° C. and more preferably 80–200° C. Heat resistance and light fastness of the obtained molding are deteriorated when the glass transition temperature is extremely low, while mold processing capability is deteriorated when it is extremely high.

The manufacturing method of a norbornene open ring polymer hydride includes performing open ring polymerization while adding a norbornene monomer and an open ring polymerization catalyst (an initial addition catalyst) into the reaction system, and preparing a norbornene type open ring polymer by completing open ring polymerization with addition of said catalyst even after finishing said monomer addition, followed by hydrogenation in the presence of a hydrogenation catalyst.

A norbornene monomer, to which this manufacturing method can be applied, includes a norbornene monomer constituting the hydride. The ratio of a norbornene monomer is generally 50–100 weight %, preferably 70–100 weight %, more preferably 90–100 weight % and most preferably 100 weight %. By setting the ratio of a norbornene monomer in the above range, mechanical strength of the prepared molding is improved.

Further, in a manufacturing method of a norbornene open ring polymer hydride, utilized may be a monomer which is copolymerizable with the above-described norbornene monomer. Other monomers which are copolymerizable with the above-described norbornene monomer are not specifically limited and include cycloolefins such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene; and non-conjugated dienes such as 1,4-hexadiene, 4-methyl-1,4-hexadiene, 5-methyl-1,4-hexadiene and 1,7-octadiene. The ratio of these other monomers which are copolymerizable with a norbornene monomer is generally 0–50 weight %, preferably 0–30 weight % and more preferably 0–10 weight %.

In a manufacturing method of a norbornene open ring polymer hydride, the polymerization reaction can be performed either with or without a solvent, and the type of a solvent is not specifically limited in the case of utilizing a solvent, provided it can sufficiently dissolve a norbornene monomer and the open ring polymer. In particular, it is preferable to perform polymerization in an inert organic solvent.

The inert organic solvent includes, for example, aromatic hydrocarbons such as benzene, toluene and xylene; aliphatic hydrocarbons such as n-pentane, hexane and heptane; alicyclic hydrocarbons such as cyclopentane and cyclohexane; hydrocarbon halogenides such as stylenedichloride, dichloroethane, dichloroethylene, tetrachloroethane, chlorobenzene, dichlorobenzene and trichlorobenzene. Among them, preferable are aliphatic hydrocarbons such as n-pentane, hexane and heptane; alicyclic hydrocarbons such as cyclopentane and cyclohexane; or halogenides htereof. These solvents can be utilized each alone or in combination of at least two types, and the using amount is in a range of generally 10–1000 weight parts, preferably 50–700 weight parts and more preferably 100–500 weight parts against 100 parts of a norbornene monomer.

The manufacturing method of a norbornene open ring polymer hydride includes performing open ring polymerization while adding a norbornene monomer and an open ring polymerization catalyst (an initial addition catalyst) into the reaction system.

In this manufacturing method, a norbornene monomer and an open ring polymerization catalyst may be added either by mixing or each independently, however, it is preferable to perform open ring polymerization by adding the residual norbornene monomer and an open ring polymerization catalyst after a part of a norbornene monomer, inert organic solvent and a promoter are charged into a reaction vessel. The charging amount of a norbornene monomer in this case is not more than 50 weight % and preferably not more than 40 weight %, against the total amount of a norbornene monomer used in a manufacturing method of a norbornene open ring polymer hydride.

A promoter applicable to a manufacturing method of a norbornene open ring polymer hydride includes those utilized as a promoter of an open ring catalyst. Specifically, listed are organic aluminum compounds and organic tin compounds, and preferable are organic aluminum compounds.

Specific examples of organic aluminum compounds include trialkylaluminum such as trimethylaluminum, triethylaluminum, tri-n-propylaluminum, triisopropylaluminum and triisobutylaluminum; alkylhalidealuminum such as diethylaluminum monochloride and ethylaluminum dichloride, however, preferably include such as triethylaluminum, triisobutylaluminum and diethylaluminum chloride.

These promoters can be utilized each alone or in combination of at least two types. The addition amount of a promoter is 0.005–10 mol % and preferably 0.02–5 mol % based on a norbornene monomer. By utilizing a promoter in the above range, generation of such as a gel and a high molecular weight component are minimized as well as polymerization activity is high to make easier control of the molecular weight.

In a manufacturing method of a norbornene open ring polymer hydride, incorporated to an open ring polymerization reaction may be a molecular weight modifier or a reaction controlling agent other than a norbornene monomer, an open ring polymerization catalyst and a promoter, As a molecular weigh modifier, generally utilized are such as chain monoolefins and chain conjugated dienes. Specific examples include 1-butene, 2-btene, 1-pentene, 1-hexane, 1-heptene, 1-octene, 1-dodecene and 1,4-hexadiene. The using amount of a molecular weight modifier is suitably selected according to polymerization conditions, however, is generally 0.2–10 mol %, preferably 0.4–7 mol % and more preferably 0.5–4 mol %, against a norbornene monomer.

As a reaction controlling agent, utilized can be at least one type of a polar compound selected from polar compounds containing active hydrogen such as alcohol and amine; and polar compounds not containing active hydrogen such as ether, ester, ketone and nitrile. A polar compound containing active hydrogen is effective to prevent gel generation and to obtain a polymer having a specific molecular weight, and alcohol is preferable among them. While, a polar compound without containing active hydrogen is effective to depress formation of a component having a low molecular weight, which may deteriorate mechanical strength, and among them preferable are ether, ester and ketone, and specifically preferable is ketone.

Alcohols include, for example, saturated alcohols such as methanol, ethanol, propanol, isopropanol, butanol, isobutanol, t-butanol, pentanol, isopentanol, hexanol and cyclohexanol; unsaturated alcohols such as phenol and benzyl alcohol, and preferably are propanol, isopropanol, butanol and isobutanol.

Esters include, for example, methyl formate, ethyl formate, methyl acetate, ethyl acetate, propyl acetate, isopropyl acetate, methyl benzoate, ethyl benzoate, propyl benzoate and isopropyl benzoate, and preferable among them are methyl acetate and ethyl acetate.

Ethers include, for example, dimethyl ether, diethyl ether, dibutyl ether, ethyleneglycol dibutyl ether and triethyleneglycol dibutyl ether, and preferable among them are diisopropyl ether and diethyl ether.

Ketones include, for example, acetone, methyl ethyl ketone, diethyl ketone, methyl phenyl ketone and diphenyl ketone, and preferable among them are actone and methyl ethyl ketone.

Reaction controlling agents can be utilized each alone or in combination of at least two types. Particularly, in a norbornene open ring polymer hydride, it is preferable to utilize a polar compound containing active hydrogen in combination with a polar compound without active hydrogen, and specifically preferable are combinations of alcohol with ketone, alcohol with nitrile, alcohol with ether, and alcohol and ester. The using amount of a reaction controlling agent is in a range of generally 0.001–10 mol % and preferably 0.01–5 mol %, against a norbornene monomer.

The open ring polymerization is performed under a temperature range of generally −20–100° C., preferably 0–100° C., more preferably 10–80° C. and most preferably 10–50° C. The reaction rate is decreased when the temperature is too low, while the control of the reaction is difficult as well energy cost is high when the temperature is too high. That is, by adjusting the temperature in to a range of −20–100° C., polymerization can be advanced at a suitable reaction rate in addition that reaction control is easy and energy cost is depressed low.

The pressure condition of open ring polymerization is generally 0–5 MPa, preferably an ordinary pressure −1 MPa and more preferably an ordinary pressure −0.5 MPa.

Open ring polymerization may be performed under an inert gas atmosphere such as nitrogen and argon, to prevent the obtained polymer from such as degradation or coloring due to oxidation.

Open ring polymerization catalysts applicable to a manufacturing method of a norbornene open ring polymer hydride are commonly known open ring polymerization catalysts of a norbornene monomer, which are disclosed in JP-B No. 41-20111 (hereinafter, JP-B refers to Examined Japanese Patent Application Publication), JP-A No. 46-14910, JP-B Nos. 57-17883 and 57-61044, JP-A Nos. 54-86600, 58-127728 and 1-240517. Specifically, they are compounds of transition metals of 4th to 10th group in the periodic table, and include halogenides, oxyhalogenides, alkoxyhalogenides, alkoxides, carbonates, (oxy)acetylacetonates and carbonyl complexes of these transition metals.

Specific examples include $TiCl_4$, $TiBr_4$, $VOCl_3$, $VOBr_3$, $WBr_4$, $WBr_6$, $WCl_2$, $WCl_4$, $WCl_5$, $WCl_6$, $WF_4$, $WI_2$, $WOBr_4$, $WOCl_4$, $WOF_4$, $MoBr_2$, $MoBr_3$, $MoBr_4$, $MoCl_4$, $MoCl_5$, $MoF_4$, $MoOCl_4$, $MoOF_4$, $WO_2$, $H_2WO_4$, $Na_2WO_4$, $K_2WO_4$, $(NH_4)_2WO_4$, $CaWO_4$, $CuWO_4$, $MgWO_4$, $(CO)_5WC(OCH_3)$ $(CH_3)$, $(CO)_5WC(OC_2H_5)$ $(CH_3)$, $(CO)_5WC(OC_2H_5)$ $(C_4H_5)$, $(CO)_5MoC(OC_2H_5)$ $(CH_3)$, $(CO)_5Mo=C(C_2H_5)$ $(N(C_2H_5)_2)$, tridecylammonium molybdate and tridecylammonium tungstate.

Among above open ring polymerization catalysts, compounds of W, Mo, Ti or V are preferred, and in particular, halogenides, oxyhalogenides or alkoxyhalogenides thereof are more preferred, with respect to such as practical polymerization reactivity.

The addition amount of an open ring polymerization catalyst is generally 0.001–5 mol %, preferably 0.005–2.5 mol % and more preferably 0.01–1 mol %, against a norbornene monomer.

In a manufacturing method of a norbornene open ring polymer hydride, open ring polymerization is preformed while adding a norbornene monomer and an open ring polymerization catalyst into the reaction system, and said catalyst is further added (an additional catalyst) after finishing said monomer addition. The timing of additional addition of an open ring polymerization include, for example, those immediately after finishing addition of a norbornene monomer addition, or after an elapse of time after finishing addition of said monomer. Further, a method of additional addition of an open ring polymerization catalyst includes, for example, a method in which an open ring polymerization catalyst is added at once, a method in which said catalyst is added continuously, or a method in which said catalyst is added intermittently, however, a method of continuous addition is preferred.

In a manufacturing method of a norbornene open ring polymer hydride, the polymerization conversion ratio at the time of finishing addition of a norbornene monomer is preferably 90–99% and more preferably 93–97%, and the amount of additional catalyst is preferably not less than 0.00005 mol % and more preferably not less than 0.0025 mol %, against a norbornene monomer.

In a manufacturing method of a norbornene open ring polymer hydride, open ring polymerization is preferably performed while stirring the inside of the reaction system. Rapid temperature rise due polymerization reaction heat can be suitably depressed by performing open ring polymerization while stirring the inside of the reaction system.

In a manufacturing method of a norbornene open ring polymer hydride, the open ring polymerization reaction is terminated after polymerization is advanced until the aimed molecular weight or polymerization conversion ratio is reached. Thereafter, an open ring polymerization catalyst is deactivated to prevent gelation of the polymerization reaction solution, and further thereafter the deactivated open ring polymerization catalyst is appropriately eliminated.

A method to deactivate an open ring polymerization catalyst includes, for example, a method in which a catalyst deactivator is added into the polymerization reaction solution.

As a catalyst deactivator, exemplified are compound provided with a hydroxyl group such as water, alcohols, carboxylic acids and phenols.

Alcohols include mono- or poly-alcohols of an aliphatic group, an alicyclic group and an aromatic group such as methanol, ethanol, 1-propanol, 2-propanol, 1-butanol, 2-butanol, 3-methyl-1-butanol, 2-ethyl-1-hexanol, 2-propene-1-ol, 1,2-ethanediol, 1,2-butanediol, 1,4-butanediol, 1,6-hexanediol, glycerin, pentaerythritol, 2-ethoxyethanol, 2,2-dichloro-1-ethanol, 2-bromo-1-ethanol and 2-phenyl-1-ethanol.

Carboxylic acids include mono-, di- or poly-carboxylic acids of an aliphatic group, an alicyclic group and an aromatic group such as formic acid, acetic acid, trichloroacetate, acrylic acid, oxalic acid, maleic caid, propane tricarboxylic acid, tartaric acid, citric acid, cyclopentane carboxylic acid, cyclohexane carboxylic acid, benzoic acid, phthalic acid and pyromerit acid.

Phenols include such as phenol, cresol and xylenol. These catalyst deactivators can be utilized alone or in combination of at least two types.

Water or water-soluble compounds (for example, a compound having a carbon number of not more than 4) among these compounds provided with a hydroxyl group are preferable because they are hardly remained in a polymer due to the low solubility in a polymer solution. Among them, water and lower alcohols are preferred and it is specifically preferable to utilize water and alcohols simultaneously, because catalyst deactivation is more efficient compared to the case of utilizing water alone, as well as precipitation of catalyst residue becomes easier compared to the case of utilizing alcohol alone. The preferable using ratio of alcohol is 0.1–5 weight parts and specifically 0.2–2 weight parts, against 1 weight part of water.

The amount of a catalyst deactivator is set at any amount provided it is sufficient to deactivate a polymerization catalyst, and is in a range of 1–20 mol equivalents more preferably 2–10 mol equivalents against a stoichiometric amount required to deactivate a polymerization catalyst. For example, in the case of utilizing 1 mol of hexachlorotungstate and 1.5 mol of triethylaluminum as an open ring polymerization catalyst and methanol as a catalyst deactivator, since 6 mol of methanol against 1 mol of hexachlorotangstate and 3 mol against 1 mol of triethyl aluminum are required on stoichiometory, the stoichiometric amount of methanol necessary to deactivate open ring polymerization catalysts is 10.5 mol.

Further, in the case that a polymerization catalyst precipitates as a result of addition of a catalyst deactivator into the polymerization solution, such as activated clay, talc, diatomaceous earth, bentonite, synthetic zeorite, silica gel and almina powder may be added as coagulation nuclei or a coagulation promoter for the precipitating insoluble component. A range of the addition amount is arbitrary, however, is preferably approximately 0.1–10 times based on the weight of an open ring polymerization catalyst.

The addition of a catalyst deactivator is performed at any temperature of −50–100° C. and preferably 0–80° C., and under any pressure of 0–0.5 MPa and preferably an ordinary pressure −0.5 MPa, and the system is stirred under the condition for 0.5–10 hours and preferably 1–3 hours.

In a manufacturing method of a norbornene open ring polymer hydride, since a hydrogenation catalyst is liable to be poisoned due to generation of a hydrogen halogenide by addition of a polymerization catalyst deactivator, in the case of employing a transition metal halogenide as an open ring polymerization catalyst, it is preferable to add an acid scavenger in advance, after the polymerization proceeds to reach a molecular weight or polymerization conversion ratio corresponding to the purpose and before addition of a polymerization deactivator. Further, it is preferable to additionally add an acid scavenger after addition of a polymerization catalyst deactivator and before start of hydrogenation reaction.

Acid scavengers include metal hydroxides such as sodium hydroxide, potassium hydroxide, calcium hydroxide, magnesium hydroxide and aluminum hydroxide; metal oxides such as calcium oxide and magnesium oxide; metals such as aluminum, magnesium, zinc and iron; salts such as calcium carbonate, magnesium carbonate, sodium carbonate, potassium carbonate, sodium hydrogen carbonate, potassium hydrogen carbonate, hydrotalcite $(Mg_6Al_2(OH)_{16}CO_3.4H_2O)$, sodium acetate and magnesium acetate; and epoxy compounds such as ethylene oxide, propylene oxide, butylenes oxide, butyl glycidyl ether, pheny glycidyl ether, cyclohexene oxide, 4-vinylcyclohexene oxide and styrene oxide.

Salts provided with an acid scavenging effect are salts exhibiting an alkaline property, and are preferably a salt of a strong acid and a weak alkali. Among these acid scavengers, epoxy compounds and salts, and combinations thereof are preferable as an acid scavenger utilized before addition of a polymerization catalyst deactivator, because of an excellent acid scavenging effect. Salts are preferred as an acid scavenger which is additionally added at the time of hydrogenation. They can effectively depress the corrosion of a reaction vessel under the temperature condition at the time of hydrogenation.

The amount of an acid scavenger is not less than 0.5 equivalents, preferably 1–100 equivalents and more preferably 2–10 equivalents, against the maximum amount of hydrogen halogenide which can be generated by hydrolysis of the utilized open ring polymerization catalyst, that is, a stoichiometric amount.

Addition of an acid scavenger is performed at an arbitrary temperature of −50–100° C. and preferably 0–80° C., and under an arbitrary pressure of 0–5 MPa and preferably an ordinary pressure −0.5 MPa. Successive addition and reaction of a polymerization catalyst deactivator are performed in a similar manner to the above description.

In the case of an acid scavenger being added, it is preferable that hydrogenation catalyst maintains the activity even in the state that an open ring polymerization catalyst is not eliminated before the hydrogenation process and the polymerization catalyst residue coexists.

In a manufacturing method of a norbornene open ring polymer hydride, hydrogenation is performed by adding a hydrogenation catalyst after the open ring polymerization reaction described above. As a hydrogenation catalyst, commonly utilized in hydrogenation of olefin compounds and aromatic compounds can be employed without specific limitation, and an inhomogeneous type catalyst and a homogeneous type catalyst can be generally employed.

Inhomogeneous system catalysts include, for example, nickel, palladium, platinum, or solid catalysts in which these metals are carried by a carrier such as carbon, silica, diatomaceous earth, alumina and titanium oxide; and catalysts containing combinations of such as nickel/silica, nickel/diatomaceous earth, nickel/alumina, palladium/carbon, palladium/silica, palladium/diatomaceous earth and palladium/alumina.

Homogeneous system catalysts include, for example, catalysts containing a combination of a transition metal compound with an alkylaluminum compound or an alkyl lithium, such as catalysts containing combinations of cobalt acetate/triethylaluminum, cobalt acetate/triisobutylaluminum, nickel acetate/triethylaluminum, nickel acetate/triisobutylaluminum, nickel acetylacetonate/triethylaluminum, nickel acetylacetonate/triisobutylaluminum, titanocene chloride/n-butyllithium and zirconocene chloride/n-butyllithium.

Hydrogenation catalysts can be utilized each alone or in combination of at least two types. The using amount of a hydrogenation catalyst is in a range of generally 0.01–100 weight parts, preferably 0.1–50 weight parts and more preferably 1–30 weight parts, against 100 weight parts of a norbornene type open ring polymer. The hydrogenation reaction is performed under a hydrogen pressure of generally 0.1–30 MPa, preferably 1–20 MPa and more preferably 2–10 MPa, at a temperature range of 0–250° C., and for a reaction time of 1–20 hours.

In a manufacturing method of a norbornene open ring polymer hydride, a norbornene open ring polymer hydride is recovered by the following procedure. In the case of utilizing an inhomogeneous system catalyst as a hydrogenation catalyst, said hydride can be obtained by removing a hydrogenation catalyst by filtration after the hydrogenation reaction described above and successive drying by means of a coagulation drying method or a direct drying method employing such as a thin layer drier. A norbornene open ring polymer hydride can be obtained generally as a powder form or a pellet form. On the other hand, in the case of utilizing a homogeneous system catalyst, the catalyst is deactivated by addition of alcohol and/or water and eliminated by filtration after having been made insoluble in a solvent.

Into a norbornene open ring polymer hydride, other polymers, various type of compounding agents, organic or inorganic filler may be added alone or in combination of at least two types.

As other polymers, elastomers such as polybutadiene, polyisobutylene, PBS, SIS, and SEBS; resin such as polystyrene, poly(meth)acrylate, polycarbonate, polyester, polyether, polyamide, polyimide and polysulfone can be blended. Further, these other polymers can be utilized each alone or in combination of at least two types.

Compounding agents are not specifically limited provided they are generally utilized in thermoplastic resin materials, and include, for example, an antioxidant, a UV absorbent, a light stabilizer, a near infrared absorbent, colorants such as dye and pigment, sliding agent, a plasticizer, an antistatic agent, a fluorescent whitening agent, a slow burning agent, an anti-blocking agent and a leveling agent.

Among them, is preferably added is an antioxidant which includes such as phenolic antioxidants, phosphite antioxidants and sulfur-containing antioxidants, more preferably phenolic antioxidants and most preferably an alkyl substituted phenolic antioxidant. It is possible to prevent coloring and strength decrease of a molding due to such as oxidation deterioration at the time of molding, without decreasing low water absorbability.

Organic or inorganic filler includes, for example, minerals such as silica, diatomaceous earth, alumina, titanium oxide, magnesium oxide, pumice powder, pumice balloon, basic magnesium carbonate, dolomite, calcium oxide, calcium carbonate, calcium sulfate, potassium titanate, barium sulfate, calcium sulfite, talc, clay, mica and asbestos; fiber such as glass fiber, boron fiber, silicon carbide fiber, polyethylene fiber, polypropylene fiber, polyester fiber and polyamide fiber; glass flake, glass beads, calcium silicate, montmorillonite, bentonite, graphite, aluminum powder and molybdenum sulfide.

These filler can be added each alone or in combination of at least two types. The blending ratio of filler can be suitably determined according to each function and application purposes within a range of not disturbing the purpose of this invention.

The method of blending of the above-described additive in a norbornene type open polymer hydride includes such as a method in which a hydrogenated norbornene ring-opening polymer is fused to be kneaded with a compounding agent by use of a mixer, a biaxial kneader, a roll, a Brabender and extruder, and a method in which the additive is dissolved and dispersed in a suitable solvent followed by being coagulated. In the case of employing a biaxial kneader, the product is generally extruded into a strand form after having been kneaded, then mostly utilized by being cut into a pellet form by a pelletizer.

A hydrogenated norbornene ring-opening polymer can be molded into a molding to be utilized for various purposes. A molding method is not specifically limited and a fused molding method is preferably employed to obtain a molding which is excellent in such as low birefringence, mechanical strength and dimensional precision. A fused molding method includes such as an injection molding method, an extrusion molding method, a press molding method and a blow molding method, however, an injection molding method is preferred with respect to such as low birefringence and dimensional stability.

The molding condition is suitably selected according to a using purpose and a molding method, however, in the case of an injection molding method, the resin temperature of a hydrogenated norbornene ring-opening polymer is selected in a range of generally 150–400° C., preferably 200–350° C. and more preferably 230–330° C. The fluidity is deteriorated resulting in causing a loss or strain in a molding when the resin temperature is extremely low, while silver streaks or molding defects such as yellowing of a molding may possibly generate due to thermal decomposition when the resin temperature is extremely high. A molding can be utilized in various forms such as a spherical form, a bar form, a plate form, a column form, a tubular form, a fiber form, or a film or sheet form.

A molding of a norbornene open ring polymer hydride is preferably provided with a yellowing chromaticity difference $\Delta YI$ of not more than 0.5, when being molded into a plate form. Herein, a yellowing chromaticity difference $\Delta YI$ is defined as a difference with chromaticity index of air YI, by measuring a yellowing chromaticity index YI at an ordinary temperature employing air as a blank by use of a chromaticity meter. $\Delta YI$ becomes the smaller value, as the smaller is coloring.

Next, a manufacturing method of objective lens 15 will be explained.

First, two optical elements 41 and 42 are prepared by subjecting "resin containing a polymer provided with an alicyclic structure" explained above to a commonly known injection technique. After preparing each of optical elements 41 and 42, first layer 43 having a layer thickness of 50–15000 nm is deposited on surface 42a of optical element 42, then second layer 44 being deposited on first layer 43, and thereafter further deposited is third layer 45 on second layer 44.

Deposition of first, second and third layers 43, 44 and 45 are performed by a treatment employing a commonly known method such as an evaporation method, a CVD (Chemical Vapor Deposition) and a sol gel method. The deposition method of first, second and third layers 43, 44 and 45 is not specifically limited provided it can deposits first, second and third layers 43, 44 and 45 having high transparency. Further, to minimize light absorption values by first, second and third layers 43, 44 and 45, it is necessary to suitably control an introduction amount of an oxygen gas and a deposition rate so that the deposition of layers is not performed under a condition of oxygen shortage.

In the case of performing the deposition of first, second and third layers 43, 44 and 45 by a treatment employing an evaporation method as an example of the deposition treatment; when gases introduced into a vacuum chamber, the vacuum degree in said vacuum chamber is maintained at $0.5 \times 10^{-2} - 3 \times 10^{-2}$ Pa while introducing such as an oxygen gas, an argon gas, a nitrogen tetrafluoride gas and a nitrogen gas into the vacuum chamber; on the other hand when gases are not introduced, the vacuum degree in the vacuum chamber is maintained at $0.7 \times 10^{-2}$ Pa.

In this state, utilizing an electron gun heating evaporation source, a low refractive index material or an intermediate refractive index material is fusing evaporated until the layer thickness reaches 50–15000 nm, resulting in formation of first layer 43 having a layer thickness of 50–15000 nm on surface 42a of optical element 42. In the case of forming first layer 43 containing a mixture of a low refractive index material and an intermediate refractive index material, an evaporation source of a low refractive index material and an evaporation source of an intermediate refractive index material may be separately arranged in a vacuum chamber to perform multi-source evaporation utilizing the both evaporation sources. In this case, the refractive index of first layer 43 for light of 405 nm can be suitably adjusted within a range of from 1.45 to less than 1.7 by varying the mixing ratio of a low refractive index material and an intermediate refractive index material. After deposition of first layer 43, a high refractive index material is fusing evaporated by use of an electron gun heating evaporation source, in a similar manner to formation of said first layer 43, to form second layer 44 on first layer 43. After deposition of second layer 44, a low refractive index material or a low/intermediate refractive index material is fusing evaporated by use of an electron gun heating evaporation source, in a similar manner to formation of said second layer 44, to form third layer 45 on second layer 44.

After deposition of first, second and third layers 43, 44 and 45 on surface 42a of optical element 42, said optical element 42 and optical element 41 are adhered at each edge portion, resulting in completion of the manufacturing of objective lens 15.

In the case of further depositing a layer similar to second and third layers 44 and 45 on third layer 45, a treatment according to the aforesaid deposition method of second and third layers 44 and 45 may be suitably performed, and also in the case of depositing a layer similar to first, second and third layers 43, 44 and 45 and a layer similar thereto on the surface other than surface 42a of optical element 42 (surface 41a and rear surface 41b of optical element 41 and rear surface 42b of optical element 42), a treatment according to the aforesaid deposition method of first, second and third layers 43, 44 and 45 may be suitably performed. Then after finishing the deposition treatment of each of optical elements 41 and 42, optical element 41 and optical element 42 are adhered each other at the edge portion.

In the above embodiment, light emitted from blue light source 4 or red light source 5 is converged to give the maximum strength at surface 42a of optical element 42 of objective lens 15 in optical pickup apparatus 1, however, since first, second and third layers 43, 44 and 45 are deposited on surface 42a of optical element 42 containing lens body 40 and first layer 43, a refractive index of which is smaller than that of said second layer 44, is arranged between lens body 40 (optical element 42) and second layer 44, it is possible to reduce the heat generated on the surface of second layer 44 to be conveyed to lens body 40 (particularly to optical element 42) due to the presence of said first layer 43.

In addition, in this embodiment, since the layer thickness of first layer 43 is relatively thick as thick as 50–15000 nm, it is possible to further reduce the heat generated on the surface of second layer 44 to be conveyed to lens body 40 (particularly optical element 42). Therefore, even in the case of handling light of a short wavelength blue light region as transmitting light, it is possible to improve abrasion resistance of first, second and third layers 43, 44 and 45 as well as supressing a shape deformation of the surface of lens body 40 (particularly surface 42a of optical element 42).

Further, in this embodiment, first layer 43 contains a low refractive index material, an intermediate refractive index material, or a mixture thereof, and when a fluoride having a low oxygen content, among compounds of a low refractive index material and an intermediate refractive index material, is applied as first layer 43, it is possible to prevent the additives from being oxidized or degraded in the case of an additive being added in resin which constitutes lens body 40 (each of optical elements 41 and 42), resulting in improvement of abrasion resistance of first, second and third layers 43, 44 and 45 as well as restraining a shape deformation of the surface of lens body 40 (particularly surface 42a of optical element 42).

Further, in this embodiment, with respect to first layer 43, since a refractive index of said first layer 43 for light of a wavelength 405 nm is in a range of ±10% of a refractive index of lens body 40 (particularly optical element 42) for light of 405 nm, the difference of refractive indexes between first layer 43 and lens body 40 (particularly optical element 42) is small. Generally, in the case of accumulating layers having different refractive indexes each other on a lens body for the purpose of antireflection of light, periodical variation in a spectral reflectance may be generated when a layer thickness of a smaller refractive index layer deposited on a lens body becomes not less than 1000 nm, however, in this embodiment, reflectance variation can be restrained low so that a rapid increase of a reflectance can be restrained within not more than 1.5% in said first, second and third layers 43, 44 and 45 even when layer thicknesses of first, second and third layers 43, 44 and 45 may vary, resulting in the practical usable level of objective lens 15 being maintained.

Herein, this invention is not limited to the above embodiment, and various improvements and amendments of design may be possible provided they do not disturb the purpose of this invention.

For example, in the above embodiment, described is an example in which applied are blue light of a specific wavelength within wavelengths of 350–450 nm and red light of a specific wavelength within wavelengths of 620–680 nm as light to transmit objective lens 15, however, near infrared light of wavelengths of 750–810 nm may be additionally applied, as well as light of a wavelength other than these wavelengths of 350–450 nm, 620–680 nm and 750–810 nm may be further applied. Further, the layer constitution and the resin composition of lens body 40 applied in objective lens 15 according to this invention may be also applied to collimator 11, splitter 12, ¼ wavelength plate 13, cylindrical lens 16 and concave lens 17, which constitute optical pickup apparatus 1 as well as to optical elements utilized for applications other than optical pickup apparatus 1, and finally, preferably applicable to the all applications provided the application is an optical element to converge light of a specific wavelength within 350–450 nm.

Further, with respect to the layer constitution on surface 42a of optical element 42, a sub layer may be provided between surface 42a of optical element 42 and first layer 43 to improve adhesion of the layer; an anti-staining layer may be provided on the layer, which is arranged at the outermost side such as third layer 45 in FIG. 2, to prevent staining; and provided may be a water-repellant layer having water-repellency or an anti-static layer to prevent adhesion of dirt and dust due to static electricity.

"A sub layer", for example, preferably contains a silane coupling treated layer.

"An anti-staining layer" and "a water-repellant layer" preferably contain such as a fluorine type organic compound and a silicone type organic compound, and the layer thickness is preferably not more than 7 nm. In the case of constituting "an anti-staining layer" and "a water-repellant layer" by a fluorine type organic compound, for example, a thin layer of perfluoroalkylsilane is formed by means of vacuum evaporation utilizing WR 1 (a product name manufactured by Merck KGaA) as an evaporation material or by coating a fluorine type coating solution L-182560 (a product name manufactured by Sumitomo 3M Co., Ltd.). On the other hand, in the case of constituting "an anti-staining layer" and "a water-repellant layer" with a silicone type organic compound, a thin layer of dimethyldiethoxysilane (DMDES) is preferably formed by an atmospheric pressure plasma method (refer to JP-A No. 2003-161817).

"An anti-static layer" is preferably constituted of a transparent conductive thin layer, the layer thickness of which is generally not more than 10 nm. "An anti-static layer" specifically preferably contains any single substance of tin oxide, indium oxide or zinc oxide; or a mixture of at least two types of these compounds, by such as a vacuum evaporation method and a sputtering method.

Figure 3:
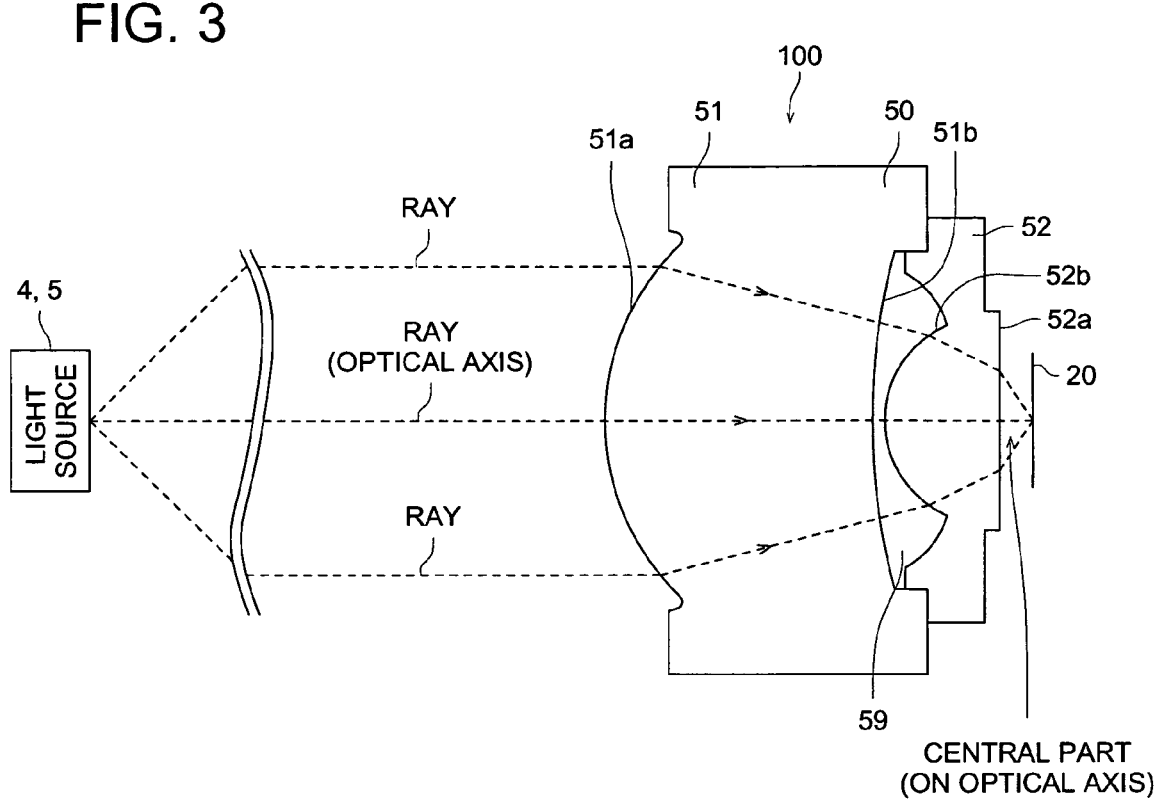
FIG. 3 is a schematic cross-section view of a modification of the objective lens illustrated in FIG. 2.

Further, objective lens 100 shown in FIG. 3 may be applied instead of objective lens 15. FIG. 3 is a cross-sectional view drawing to illustrate a brief constitution of objective lens 100.

Objective lens 15 shown in FIG. 2 is a compatible lens capable of converging the both of blue light and red light, while objective lens 100 shown in FIG. 3 is preferably utilized as an exclusive blue light lens capable of converging blue light. For this purpose, objective lens 100 shown in FIG. 3 is fixed at the position of objective lens 15 shown by a solid line in FIG. 1 at the time of being set on optical pickup apparatus 1 and designed so that light emitted from blue light source 4 is made into a converged spot on the recording plane of BD or AOD 20.

With respect to the details of objective lens 100, objective lens 100 is provided with lens body 50 made of resin and lens body 50 is constituted of two optical elements 51 and 52. Lens body 50 is provided with a structure, in which each of optical elements 51 and 52 contains resin similar to that of aforesaid optical elements 41 and 42 and is adhered each other at the edge portion to form hollow portion 59, and which is a structure similar to the aforesaid lens body 40 with respect to these points.

Optical element 51 as the first optical element is arranged on the side of blue light source 4 or red light source 5 and optical element 52 as the second optical element is arranged on the side of BD or AOD 20, or DVD 30. In detail, surface 51a of optical element 51 is facing to blue light source 4 or red light source 5; surface 52a of optical element 52 is facing to BD or AOD 20, or DVD 30; and rear surface 51b of optical element 51 and rear surface 52b of optical element 52 are facing to each other.

Surface 51a and rear surface 51b of optical element 51 are constituted of aspheric surfaces, and rear surface 52b of optical element 52 is constituted of an aspheric surface. Surface 52a of optical element 52 is constituted of a flat plane.

The layer constitution applied on surface 42a of optical element 42 is applied on surface 52a of optical element 52. The layer constitution applied on surface 42a of optical element 42 may be also applied on surface 51a of optical element 51, rear surface 51b of optical element 51 or rear surface 52b of optical element 52.

Each of optical elements 51 and 52 is provided with a positive paraxial power, and particularly, optical element 52 is molded so as to satisfy the both conditions of following Formulae (51) and (52).

$0.8 \leq NA$ \hfill Formula (51)

$0.2 \leq \beta \leq 0.5$ \hfill Formula (52)

In Formula (51), NA is a numerical aperture on the image side of optical element 52. In Formula (52), β is a lens magnification of optical element 52.

In the case of the condition of above Formula (51) is satisfied, a converged spot having an excellent spot diameter can be formed on a recording plane of an optical information recording medium (specifically BD or AOD 20) particularly out of a light flux emitted from blue light source 4 which emits monochromatic light of wavelength of near 405 nm.

With respect to the condition of above Formula (52), when a lens magnification β is not less than 0.2, variation of wavefront aberration due to temperature change is decreased resulting in enlarging the temperature range in which objective lens 100 is usable. On the other hand, when a lens magnification β is not more than 0.5, since the distance on the light axis between surface 52a of optical element 52 and the surface of BD or AOD 20 does not become too short, it is possible to decrease the possibility of collision of objective lens with BD or AOD 20.

Herein, a manufacturing method of objective lens 100, namely, preparation of optical elements 51 and 52 and a layer deposition treatment on each of optical elements 51 and 52, is similar to the manufacturing method of above objective lens 15, except for design items such as a size and a shape of each of optical elements 51 and 52 are different from those of each of optical elements 41 and 42.

Figure 4:
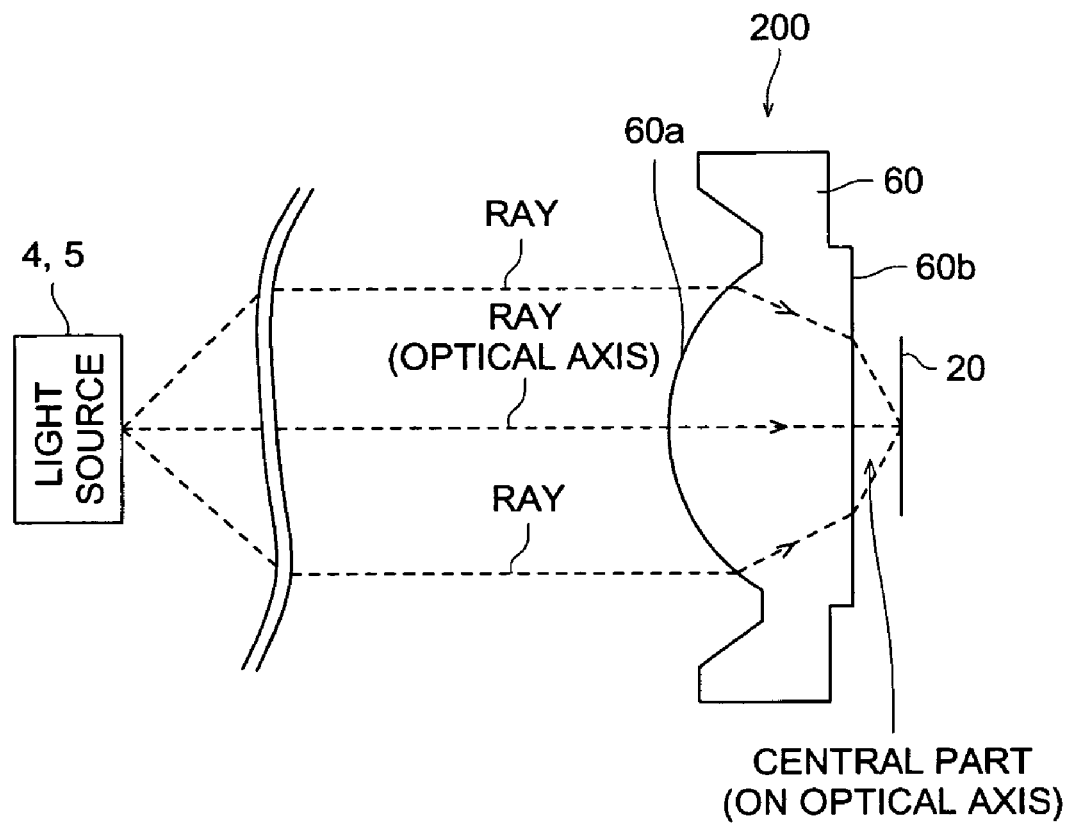
FIG. 4 is a schematic cross-section view of a modification of the objective lens illustrated in FIG. 2 or FIG. 3.

Further, objective lens 200 shown in FIG. 4 may be applied instead of above objective lens 15. FIG. 4 is a cross-sectional drawing to illustrate a brief constitution of objective lens 200.

Objective lens 15 shown in FIG. 2 is a compatible lens capable of converging the both of blue light and red light, while objective lens 200 shown in FIG. 4 is preferably utilized as an exclusive blue light lens capable of converging blue light, similar to objective lens 100 shown in FIG. 3. For this purpose, objective lens 200 shown in FIG. 4 is fixed at the position of objective lens 15 shown by a solid line in FIG. 1 at the time being set on optical pickup apparatus 1 and designed so that light emitted from blue light source 4 is made into a converged spot on the recording plane of BD or AOD 20.

With respect to the details of objective lens 200, objective lens 200 is provided with lens body 60 which is constituted of resin similar to above optical elements 41 and 42. Lens body 60 is constituted of one optical element. Objective lens 200 is provided with a structure, which is similar to each objective lens described above with respect that lens body 60 is constituted of resin similar to above-described optical elements 41 and 42, but different from above-described objective lenses 15 and 100 with respect that lens body 60 is constituted of one optical element.

In lens body 60, surface 60a is facing to blue light source 4 or red light source 5 and rear surface 60b is facing to BD or AOD 20. The both of surface 60a and rear surface 60b of lens body 60 contains aspheric surfaces. A layer constitution, which is applied on surface 42a of optical element 42, is applied on rear surface 60b of lens body 60. A layer constitution provided on surface 42a of optical element 42 may also be applied on surface 60a of lens body 60.

Lens body 60 is formed so as to satisfy following Formula (60).

$$0.8 \leq d/f \leq 1.8 \qquad \text{Formula (60)}$$

In above Formula (60), d is a thickness on the optical axis and f is a focal distance for light of a wavelength 405 nm.

The condition of above Formula (60) is one to obtain excellent image height characteristics. With respect to the condition of above Formula (60), when d/f is not less than 0.8, the central thickness of lens body does not become too short, the image height characteristics is not deteriorated, and the sensitivity of surface decentering error decreases, and when d/f is not more than 1.8, the center thickness (the thickness on axis) of lens body 60 becomes not too large; image height characteristics does not deteriorates; the sensitivity of decentering error decreses; and a spherical aberration and a coma aberration are possible to be properly corrected.

Herein, a manufacturing method of objective lens 200, that is, such as preparation of lens body 60 and a layer deposition treatment on lens body 60, is similar to the manufacturing method of objective lens 15 described above, except that the design items such as the size and shape of lens body 60 are different from those of each of optical elements 41 and 42.

EXAMPLES

Example 1

In this example 1, 30 samples aimed for an objective lens are prepared and the characteristics or properties of prepared samples 1–30 each were measured and evaluated.

(1) Preparation of Samples 1–30

(1-1) Preparation of Lens Body

First, an arbitrary one type of resin was manufactured according to the following manufacturing method of (1-1-1) and (1-1-2) as "resin containing a polymer provided with an alicyclic structure" constituting a lens body. Wherein, "part(s)" and "%" in following (1-1-1) and (1-1-2) are based on weight unless otherwise mentioned.

(1-1-1) Manufacturing Method of Polymer

Unhydrated cyclohexane of 320 parts, 60 parts of styrene and 0.38 part of dibutyl ether were charged in a stainless steal polymerization vessel equipped with a stirrer and a polymerization reaction was started by addition of 0.36 part of n-butyl lithium solution (a 15% content hexane solution) while stirring. After the polymerization reaction was performed for 1 hour, 20 parts of a mixed monomer containing 8 pats of styrene and 12 parts of isoprene were added into the reaction solution, and 0.2 part of isopropyl alcohol were added to terminate the reaction after further 1 hour of the polymerization reaction was performed. Mw of an obtained block copolymer was 102,100 and Mw/Mn was 1.11.

Next, 400 parts of the polymerization reaction solution described above was transferred to a pressure resistant vessel equipped with a stirrer, and 10 parts of a nickel catalyst on silica-alumina carrier (manufactured by Nikki Chemicals Industry Co., Ltd; E22U, amount of nickel: 60%) as a hydrogenation catalyst were added and mixed. The inside of the reaction vessel was replaced by a hydrogen gas and hydrogen was further supplied while the solution was stirred, and the temperature was set as high as 160° C. to continue the reaction at 4.5 MPa for 8 hours, resulting in achievement of hydrogenation to aromatic rings. After finishing the hydrogenation reaction, the reaction solution was filtered to eliminate a hydrogenation catalyst and diluted with addition of 800 parts of cyclohexane, then said reaction solution was pored into 3,500 parts of isopropanol (having been filtered through a filter having a pore size of 1 μm in a clean room of a classification of 1000) to make a block copolymer be precipitated, which was separation recovered by filtration and dried under reduced pressure at 80° C. for 48 hours. The block copolymer thus obtained was a diblock copolymer containing a block containing a repeating unit arising from styrene (hereinafter, referred to as "St") and a block containing a repeating unit arising from styrene and isoprene (hereinafter, referred to as "St/Ip"), and the mol ratio of each block was as follows: St: (St/Ip)=69:31 (St: Ip=10:21). Mw of said block copolymer was 85,100, Mw/Mn was 1.17, the hydrogenation ratio of a main chain and an aromatic ring was 99.9%, and Tg was 126.5° C.

(1-1-2) Manufacturing of Resin 0.1 part of styrene-ethylene-butylene-styrene block copolymer (Septone 2002, manufactured by Kuraray Co., Ltd.); 0.1 part of tetrakis-[methylene-3-(3',5'-di-tertiary-butyl-4'-hydroxyphenyl)propionate]methane (Irganox 1010, manufactured by Ciba Speciality Chemicals Corp.) as an antioxidant; 0.1 part of 2-(2'-hydroxy-5'-mehtyl-phenyl) benzotriazole (Tinuvin P, manufactured by Ciba Speciality Chemicals Corp.) as a benzotriazole type UV absorber; and 0.1 part of a polycondensation product [HALS (A), Mn=3,000] of dibutylamine, 1,3,5-triazine-N,N'-bis(2,2,6,6-tetramethyl-4-pyperidyl)-1,6-hexamethylenediamine and N-(2,2,6,6-tetramethyl-4-pyperidyl)butylamine as a HALS, each was added against 100 parts of the block copolymer which were obtained by the above manufacturing of a polymer, and the mixture was kneaded by use of a biaxial kneader (manufactured by Toshiba Kikai Co., Ltd.; TEM-35B, screw diameter of 37 mm, L/D=32, screw rotational number of 150 rpm, resin temperature of 240° C., feed rate of 10 kg/hour), followed by being extruded in a strand form, which was then cooled by water and cut by a plletizer to be made into pellets. The pellets were dried by use of a hot air drier at 70° C. for 2 hours to eliminate moisture, and pellets after having been dried were injection molded resulting in preparation of an aimed lens body.

Herein, in this example 1, 30 sheets of molded plates, having an outer diameter of 30 mm, a thickness of 3 mm and a refractive index for light of a wavelength 405 nm of 1.53, were prepared and utilized as a lens body.

(1-2) Preparation of Samples 1–13 and 29

By employing a commonly known vacuum evaporation technique, the first layer was deposited on the lens body prepared above, the second layer was deposited on the first layer, and the third layer was deposited on the second layer, resulting in preparation of samples 1–13 and 29.

With respect to each layer of samples 1–13 and 29, evaporation materials (materials utilized as a evaporation source; hereinafter, refers the same meaning), layer materials (materials which constitute layers; hereinafter, refers the same meaning), introduced gases (gases introduced into a vacuum chamber during an evaporation treatment; hereinafter, refers the same meaning), refractive indexes (refractive indexes for light of a wavelength 405 nm; hereinafter, refers the same meaning), and layer thicknesses (thicknesses of layers; hereinafter, refers the same meaning) are shown in tables 1 and 2. Herein, in tables 1 and 2, "Substance H5", "Substance L5", "Substance M3" and "Substance M2" each represent a product name of an evaporation material manufactured by Merc Corp (same meaning in following tables 3–5 and 10–13).

TABLE 1

| | Sample 1 | Sample 2 | Sample 3 | Sample 4 | Sample 5 | Sample 6 | Sample 7 |
|---|---|---|---|---|---|---|---|
| The first layer (a low refractive index material or a medium refractive index material) | | | | | | | |
| Evaporation material | Silicon oxide | Silicon oxide | Lanthanum fluoride | Cerium fluoride | A mixed material of magnesium fluoride and cerium fluoride | Silicon oxide | Magnesium fluoride |
| Layer material | Silicon oxide | Silicon oxide | Lanthanum fluoride | Cerium fluoride | A mixed material of magnesium fluoride and cerium fluoride | Silicon oxide | Magnesium fluoride |
| Introduced gas | None | None | Argon gas | None | None | None | Carbon tetrafluoride gas |
| n1 | 1.46 | 1.46 | 1.6 | 1.63 | 1.56 | 1.46 | 1.33 |
| d1 (nm) | 50 | 80 | 100 | 500 | 1000 | 6000 | 10000 |
| The second layer (a high refractive index material) | | | | | | | |
| Evaporation material | Substance H5 | Hafnium oxide | Zirconium oxide | Substance M3 | Substance M3 | Substance M3 | Hafnium oxide |
| Layer material | Lanthanum titanate | Hafnium oxide | Zirconium oxide | Lanthanum aluminate | Lanthanum aluminate | Lanthanum aluminate | Hafnium oxide |
| Introduced gas | Oxygen gas | Oxygen gas | Oxygen gas | Oxygen gas | Oxygen gas | Oxygen gas | Oxygen gas |
| n2 | 2.01 | 1.89 | 1.94 | 1.95 | 1.95 | 1.95 | 1.89 |
| d2 (nm) | 27 | 94 | 45 | 45 | 45 | 27 | 94 |
| The third layer (a low refractive index material or a low/medium refractive index material) | | | | | | | |
| Evaporation material | Substance L5 | Silicon oxide | Substance L5 | Silicon oxide | Silicon oxide | Substance L5 | Silicon oxide |
| Layer material | A mixed material of silicone oxide and aluminum oxide | Silicon oxide | A mixed material of silicone oxide and aluminum oxide | Silicon oxide | Silicon oxide | A mixed material of silicone oxide and aluminum oxide | Silicon oxide |
| Introduced gas | None | Oxygen gas | Oxygen gas | Oxygen gas | None | None | Oxygen gas |
| n3 | 1.49 | 1.46 | 1.49 | 1.46 | 1.46 | 1.49 | 1.46 |
| d3 | 86 | 61 | 83 | 83 | 83 | 86 | 61 |

TABLE 2

| | Sample 8 | Sample 9 (Comparison) | Sample 10 | Sample 11 | Sample 12 (Comparison) | Sample 13 | Sample 29 (Comparison) |
|---|---|---|---|---|---|---|---|
| | The first layer (a low refractive index material or a medium refractive index material) | | | | | The first layer (a high refractive index material) | The first layer (a low refractive index material) |
| Evaporation material | Substance L5 | Silicon oxide | A mixed material of aluminum oxide and silicon oxide | A mixed material of aluminum oxide and silicon oxide | Silicon oxide | Substance M2 | Silicon oxide |
| Layer material | Mixed material of silicon oxide and aluminum oxide | Silicon oxide | Aluminum silicon oxide | Aluminum silicon oxide | Silicon oxide | A mixed material of titanium oxide and praseodymium oxide | Silicon oxide |
| Introduced gas | Argon gas | None | Oxygen gas | None | None | Oxygen gas | Oxygen gas |
| n1 | 1.49 | 1.46 | 1.58 | 1.51 | 1.46 | 1.69 | 1.46 |
| d1 (nm) | 12000 | 16000 | 5000 | 15000 | 38 | 6000 | 500 |
| | The second layer (a high refractive index material) | | | | | | |
| Evaporation material | Zirconium oxide | Substance M3 | Hafnium oxide | Substance M3 | Substance M3 | Substance M3 | Aluminum oxide |
| Layer material | Zirconium oxide | Lanthanum aluminate | Hafnium oxide | Lanthanum aluminate | Lanthanum aluminate | Lanthanum aluminate | Aluminum oxide |
| Introduced gas | Oxygen gas | Oxygen gas | Oxygen gas | Oxygen gas | Oxygen gas | Oxygen gas | Oxygen gas |
| n2 | 1.94 | 1.95 | 1.88 | 1.76 | 1.95 | 1.76 | 1.62 |
| d2 (nm) | 108 | 27 | 37 | 74 | 70 | 77 | 67 |
| | The third layer (a low refractive index material or a low/medium refractive index material) | | | | | | |
| Evaporation material | Substance L5 | Substance L5 | Silicon oxide | Silicon oxide | Silicon oxide | Silicon oxide | Silicon oxide |
| Layer material | A mixed material of silicone oxide and aluminum oxide | A mixed material of silicone oxide and aluminum oxide | Silicon oxide | Silicon oxide | Silicon oxide | Silicon oxide | Silicon oxide |
| Introduced gas | Oxygen gas | None | Oxygen gas | Oxygen gas | None | Oxygen gas | Oxygen gas |
| n3 | 1.49 | 1.49 | 1.46 | 1.46 | 1.46 | 1.46 | 1.46 |
| d3 (nm) | 55 | 86 | 82 | 76 | 72 | 69 | 83 |

(1-3) Preparation of Samples 14–18

By employing a commonly known vacuum evaporation technique, the first layer was deposited on the lens body prepared above, the second layer was deposited on the first layer, the third layer was deposited on the second layer, the fourth layer was deposited on the third layer, and the fifth layer was deposited on the fourth layer, resulting in preparation of samples 14–18.

With respect to each layer of samples 14–18, evaporation materials, layer materials, introduced gases, refractive indexes n1–5, and layer thicknesses d1–5 are shown in table 3.

TABLE 3

| | Sample 14 | Sample 15 | Sample 16 | Sample 17 | Sample 18 (Comparison) |
|---|---|---|---|---|---|
| | The first layer (a low refractive index material or a medium refractive index material) | | | | |
| Evaporation material | Silicon oxide | Silicon oxide | Cerium fluoride | A mixed material of aluminum oxide and silicon oxide | Silicon oxide |
| Layer material | Silicon oxide | Silicon oxide | Cerium fluoride | Aluminum silicon oxide | Silicon oxide |
| Introduced gas | Oxygen gas | Argon gas | None | Oxygen gas | None |
| n1 | 1.46 | 1.46 | 1.63 | 1.60 | 1.46 |
| d1 (nm) | 100 | 150 | 400 | 5000 | 20 |

TABLE 3-continued

|  | Sample 14 | Sample 15 | Sample 16 | Sample 17 | Sample 18 (Comparison) |
|---|---|---|---|---|---|
| The second layer (a high refractive index material) | | | | | |
| Evaporation material | Substance H5 | Hafnium oxide | Hafnium oxide | Zirconium oxide | Cerium oxide |
| Layer material | Lanthanum titanate | Hafnium oxide | Hafnium oxide | Zirconium oxide | Cerium oxide |
| Introduced gas | Oxygen gas | Oxygen gas | Oxygen gas | Oxygen gas | Oxygen gas |
| n2 | 2.01 | 1.85 | 1.85 | 1.93 | 1.85 |
| d2 (nm) | 18.1 | 40 | 27 | 40 | 24 |
| The third layer (a low refractive index material) | | | | | |
| Evaporation material | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Introduced gas | None | None | None | Oxygen gas | None |
| n3 | 1.46 | 1.46 | 1.46 | 1.46 | 1.46 |
| d3 | 41.4 | 21 | 13 | 15 | 26 |
| The fourth layer (a high refractive index material) | | | | | |
| Evaporation material | Substance H5 | Hafnium oxide | Hafnium oxide | Zirconium oxide | Cerium oxide |
| Layer material | Lanthanum titanate | Hafnium oxide | Hafnium oxide | Zirconium oxide | Cerium oxide |
| Introduced gas | Oxygen gas | Oxygen gas | Oxygen gas | Oxygen gas | Oxygen gas |
| n4 | 2.01 | 1.85 | 1.85 | 1.93 | 1.85 |
| d4 (nm) | 33.2 | 74 | 109 | 80 | 53 |
| The fifth layer (a low refractive index material) | | | | | |
| Evaporation material | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Introduced gas | None | Oxygen gas | None | Oxygen gas | None |
| n5 | 1.46 | 1.46 | 1.46 | 1.46 | 1.46 |
| d5 | 99.7 | 95 | 83 | 97 | 83 |

(1-4) Preparation of Samples 19–28 and 30

By employing a commonly known vacuum evaporation technique, the first layer was deposited on the lens body prepared above, the second layer was deposited on the first layer, the third layer was deposited on the second layer, the fourth layer was deposited on the third layer, the fifth layer was deposited on the fourth layer, the sixth layer was deposited on the fifth layer, and the seventh layer was deposited on the sixth layer, resulting in preparation of samples 19–28 and 30.

With respect to each layer of samples 19–28 and 30, evaporation materials, layer materials, introduced gases, refractive indexes n1–n7, and layer thicknesses d1–d7 are shown in tables 4 and 5.

TABLE 4-1

|  | Sample 19 | Sample 20 | Sample 21 | Sample 22 | Sample 23 |
|---|---|---|---|---|---|
| | The first layer (a low refractive index material or a medium refractive index material) | | The first layer (a high refractive index material) | The first layer (a low refractive index material) | |
| Evaporation material | Silicon oxide | Cerium fluoride | Substance M2 | Silicon oxide | Silicon oxide |
| Layer material | Silicon oxide | Cerium fluoride | A mixed material of titanium oxide and praseodymium oxide | Silicon oxide | Silicon oxide |
| Introduced gas | None | None | Oxygen gas | None | None |
| n1 | 1.40 | 1.46 | 1.69 | 1.46 | 1.46 |
| d1 (nm) | 87.6 | 470 | 1000 | 1500 | 12000 |
| The second layer (a high refractive index material) | | | | | |
| Evaporation material | Substance H5 | Hafnium oxide | Substance M3 | Zirconium oxide | Titanium oxide |
| Layer material | Lanthanum titanate | Hafnium oxide | Lanthanum aluminate | Zirconium oxide | Titanium oxide |
| Introduced gas | Oxygen gas | Oxygen gas | Oxygen gas | Oxygen gas | Oxygen gas |
| n2 | 1.94 | 1.85 | 1.76 | 1.93 | 2.1 |
| d2 (nm) | 22.1 | 15 | 12.4 | 13.7 | 19.0 |

TABLE 4-1-continued

|  | Sample 19 | Sample 20 | Sample 21 | Sample 22 | Sample 23 |
|---|---|---|---|---|---|
| The third layer (a low refractive index material) | | | | | |
| Evaporation material | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Introduced gas | None | Oxygen gas | Oxygen gas | None | Oxygen gas |
| n3 | 1.46 | 1.46 | 1.46 | 1.46 | 1.46 |
| d3 | 41.2 | 35 | 34.4 | 39.5 | 40 |
| The fourth layer (a high refractive index material) | | | | | |
| Evaporation material | Substance H5 | Hafnium oxide | Substance M3 | Zirconium oxide | Titanium oxide |
| Layer material | Lanthanum titanate | Hafnium oxide | Lanthanum aluminate | Zirconium oxide | Titanium oxide |
| Introduced gas | Oxygen gas | Oxygen gas | Oxygen gas | Oxygen gas | Oxygen gas |
| n4 | 1.94 | 1.85 | 1.76 | 1.93 | 2.1 |
| d4 (nm) | 52.2 | 57 | 48.2 | 54.8 | 55.2 |

TABLE 4-2

|  | Sample 19 | Sample 20 | Sample 21 | Sample 22 | Sample 23 |
|---|---|---|---|---|---|
| The fifth layer (a low refractive index material) | | | | | |
| Evaporation material | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Introduced gas | None | Oxygen gas | Oxygen gas | None | Oxygen gas |
| n5 | 1.46 | 1.46 | 1.46 | 1.46 | 1.46 |
| d5 | 15.1 | 16 | 11.8 | 13.5 | 13.8 |
| The sixth layer (a high refractive index material) | | | | | |
| Evaporation material | Substance H5 | Hafnium oxide | Substance M3 | Zirconium oxide | Titanium oxide |
| Layer material | Lanthanum titanate | Hafnium oxide | Lanthanum aluminate | Zirconium oxide | Titanium oxide |
| Introduced gas | Oxygen gas | Oxygen gas | Oxygen gas | Oxygen gas | Oxygen gas |
| n6 | 1.94 | 1.85 | 1.76 | 1.93 | 2.1 |
| d6 (nm) | 51.7 | 76 | 6.85 | 46.2 | 47.1 |
| The seventh layer (a low refractive index material) | | | | | |
| Evaporation material | Silicon oxide | Silicon oxide | Silicon oxide | Silicon oxide | Silicon oxide |
| Layer material | Silicon oxide | Silicon oxide | Silicon oxide | Silicon oxide | Silicon oxide |
| Introduced gas | None | Oxygen gas | Oxygen gas | None | Oxygen gas |
| n7 | 1.46 | 1.46 | 1.46 | 1.46 | 1.46 |
| d7 | 92.8 | 96 | 68.7 | 82.4 | 82.8 |

TABLE 5-1

|  | Sample 24 | Sample 25 | Sample 26 | Sample 27 | Sample 28 (Comparison) | Sample 29 (Comparison) |
|---|---|---|---|---|---|---|
| | The first layer (a low refractive index material or a medium refractive index material) | | | | | The first layer (a high refractive index material) |
| Evaporation material | Silicon oxide | Silicon oxide | A mixed material of aluminum oxide and silicon oxide | Silicon oxide | Silicon oxide | Hafnium oxide |
| Layer material | Silicon oxide | Silicon oxide | Aluminum silicon oxide | Silicon oxide | Silicon oxide | Hafnium oxide |
| Introduced gas | None | Oxygen gas | Oxygen gas | None | Oxygen gas | Oxygen gas |
| n1 | 1.46 | 1.46 | 1.50 | 1.46 | 1.46 | 1.85 |
| d1 (nm) | 3000 | 5000 | 7500 | 10000 | 16000 | 155 |

TABLE 5-1-continued

|  | Sample 24 | Sample 25 | Sample 26 | Sample 27 | Sample 28 (Comparison) | Sample 29 (Comparison) |
| --- | --- | --- | --- | --- | --- | --- |
| | | | The second layer (a high refractive index material) | | | |
| Evaporation material | Substance H5 | Hafnium oxide | Hafnium oxide | Zirconium oxide | Hafnium oxide | Zirconium oxide |
| Layer material | Lanthanum titanate | Hafnium oxide | Hafnium oxide | Zirconium oxide | Hafnium oxide | Zirconium oxide |
| Introduced gas | Oxygen gas | Oxygen gas | Oxygen gas | Oxygen gas | Oxygen gas | Oxygen gas |
| n2 | 1.94 | 1.85 | 1.85 | 1.93 | 1.85 | 1.93 |
| d2 (nm) | 22.1 | 14.8 | 12.4 | 13.7 | 12.4 | 7.4 |
| | | | The third layer (a low refractive index material) | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | Oxygen gas | Oxygen gas | None | Oxygen gas | None |
| n3 | 1.46 | 1.46 | 1.46 | 1.46 | 1.46 | 1.46 |
| d3 (n) | 41.2 | 41.5 | 34.4 | 39.5 | 34.4 | 48.5 |

TABLE 5-2

|  | Sample 24 | Sample 25 | Sample 26 | Sample 27 | Sample 28 (Comparison) | Sample 29 (Comparison) |
| --- | --- | --- | --- | --- | --- | --- |
| | | | The fourth layer (a high refractive index material) | | | |
| Evaporation material | Substance H5 | Hafnium oxide | Hafnium oxide | Zirconium oxide | Hafnium oxide | Zirconium oxide |
| Layer material | Lanthanum titanate | Hafnium oxide | Hafnium oxide | Zirconium oxide | Hafnium oxide | Zirconium oxide |
| Introduced gas | Oxygen gas | Oxygen gas | Oxygen gas | Oxygen gas | Oxygen gas | Oxygen gas |
| n4 | 1.94 | 1.85 | 1.85 | 1.93 | 1.85 | 1.93 |
| d4 (nm) | 52.2 | 57.4 | 48.2 | 54.8 | 48.2 | 37.3 |
| | | | The fifth layer (a low refractive index material) | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | Oxygen gas | Oxygen gas | None | Oxygen gas | None |
| n5 | 1.46 | 1.46 | 1.46 | 1.46 | 1.46 | 1.46 |
| d5 (nm) | 13 | 16 | 11.8 | 13.5 | 11.8 | 23.8 |
| | | | The sixth layer (a high refractive index material) | | | |
| Evaporation material | Substance H5 | Hafnium oxide | Zirconium oxide | Zirconium oxide | Zirconium oxide | Zirconium oxide |
| Layer material | Lanthanum titanate | Hafnium oxide | Zirconium oxide | Zirconium oxide | Zirconium oxide | Zirconium oxide |
| Introduced gas | Oxygen gas | Oxygen gas | Oxygen gas | Oxygen gas | Oxygen gas | Oxygen gas |
| n6 | 1.94 | 1.85 | 1.93 | 1.93 | 1.93 | 1.93 |
| d6 (nm) | 51.1 | 64.1 | 6.85 | 46.2 | 6.83 | 104.6 |
| | | | The seventh layer (a low refractive index material) | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | Oxygen gas | Oxygen gas | None | Oxygen gas | Oxygen gas |
| n7 | 1.46 | 1.46 | 1.46 | 1.46 | 1.46 | 1.46 |
| d7 (nm) | 92.1 | 97.2 | 68.7 | 82.4 | 68.6 | 82.5 |

(2) Measurement and Evaluation of Characteristics or Properties of Each Sample

With respect to each sample 1–30 prepared above, the following characteristics or properties were measured and evaluated.

(2-1) Measurement of Light Absorption Value

Light of a wavelength 405 nm was irradiated against each sample 1–30 to calculate transmittance T (%) and reflectance R (%), and a light absorption value of each sample 1–30 was calculated according to the following equation. Herein, "reflectance R" is a sum of reflectance of the both front and rear surfaces of each sample 1–30.

Light absorption value (%)=100(%)−transmittance $T$ (%)−reflectance $R$ (%)

The calculated results of each sample 1–30 are shown in table 6. In table 6, "A", "B" and "D" are based on the following criteria.

A: A light absorption value is less than 0.1%.

B: A light absorption value is not less than 0.1% but less than 0.5%.

D: A light absorption value is not less than 0.5%.

(2-2) Measurement of Layer Thickness

With respect to each sample 1–30, the cross-section of the first layer deposited directly on a lens body was observed through an electronmicroscope, and the layer thickness (nm) of said first layer in each sample 1–30 was measured. In the layer thickness measurement, a thickness at the central portion of a layer surface (a surface on which a layer is formed; the same meaning hereinafter) of each sample 1–30 was measured and the measured value was defined as a layer thickness. The measurement results of each sample 1–30 are shown in table 6.

(2-3) Measurement of Refractive Index

Quasi samples 1–30 were prepared by replacing the lens body of each sample 1–30 by glass (Such as a layer structure and a deposition method thereof, except for the types of a lens body, are similar to those in (1-2), (1-3) and (1-4) described above.), the refractive index of the first layer of each quasi sample 1–30 was measured by an eripsometer, and each refractive index was defined as a refractive index of the first layer of each sample 1–30. The measurement results of each sample 1–30 are shown in table 6.

(2-4) Observation of Shape Deformation

Light of a wavelength 405 nm was converged by a lens system to form a light flux having a peak intensity of 120 mW/mm$^2$, which is irradiated on the layer surface of each sample 1–30, and the appearance of said layer surface of each sample 1–30 was observed as well as the surface shape deformation of said layer surface of each sample 1–30 was measured by use of a surface roughness meter. Herein, the above observation and measurement were performed at 100 hours, 150 hours and 200 hours of irradiation time of light, and each sample 1–30 was kept under an atmosphere of a temperature of 85° C. and a relative humidity of 5% during light irradiation. The results of observation and measurement of each sample 1–30 are shown in table 6. In table 6, "A", "B", "C" and "D" are based on the following criteria.

A: No changes are observed even after 200 hours of irradiation.

B: No changes are observed after 150 hours of irradiation, however, some changes are observed after 200 hours of irradiation.

C: No changes are observed after 100 hours of irradiation, however, some changes are observed after 150 hours of irradiation.

D: Peeling of a layer or generation of cracks is recognized after 100 hours irradiation, and concave portion having a surface shape deformation of not less than 0.2 μm was formed.

(2-5) Evaluation of Reflectance

The reflectance of the layer surface of each sample 1–30 at a wavelength region of 350–900 nm was measured by use of lens reflectance meter USPM-250, manufactured by Olympus Optical Co., Ltd (spectral reflectance). The results of the measurement of each sample 1–30 are shown in table 6. In table 6, "B", "C" and "D" are based on the following criteria.

B: A wavelength of minimum reflectance Rmin is within 350–500 nm, the minimum reflectance Rmin is not more than 0.5%, and a spectrum amplitude in a lower reflectance region in a spectral reflectance is not more than 1.0%.

C: A wavelength of minimum reflectance Rmin is within 350–500 nm, the minimum reflectance Rmin is not more than 0.5%, and a spectrum amplitude in a lower reflectance region in a spectral reflectance is not more than 1.5%.

D: Being out of above criteria B and C.

Figure 5:
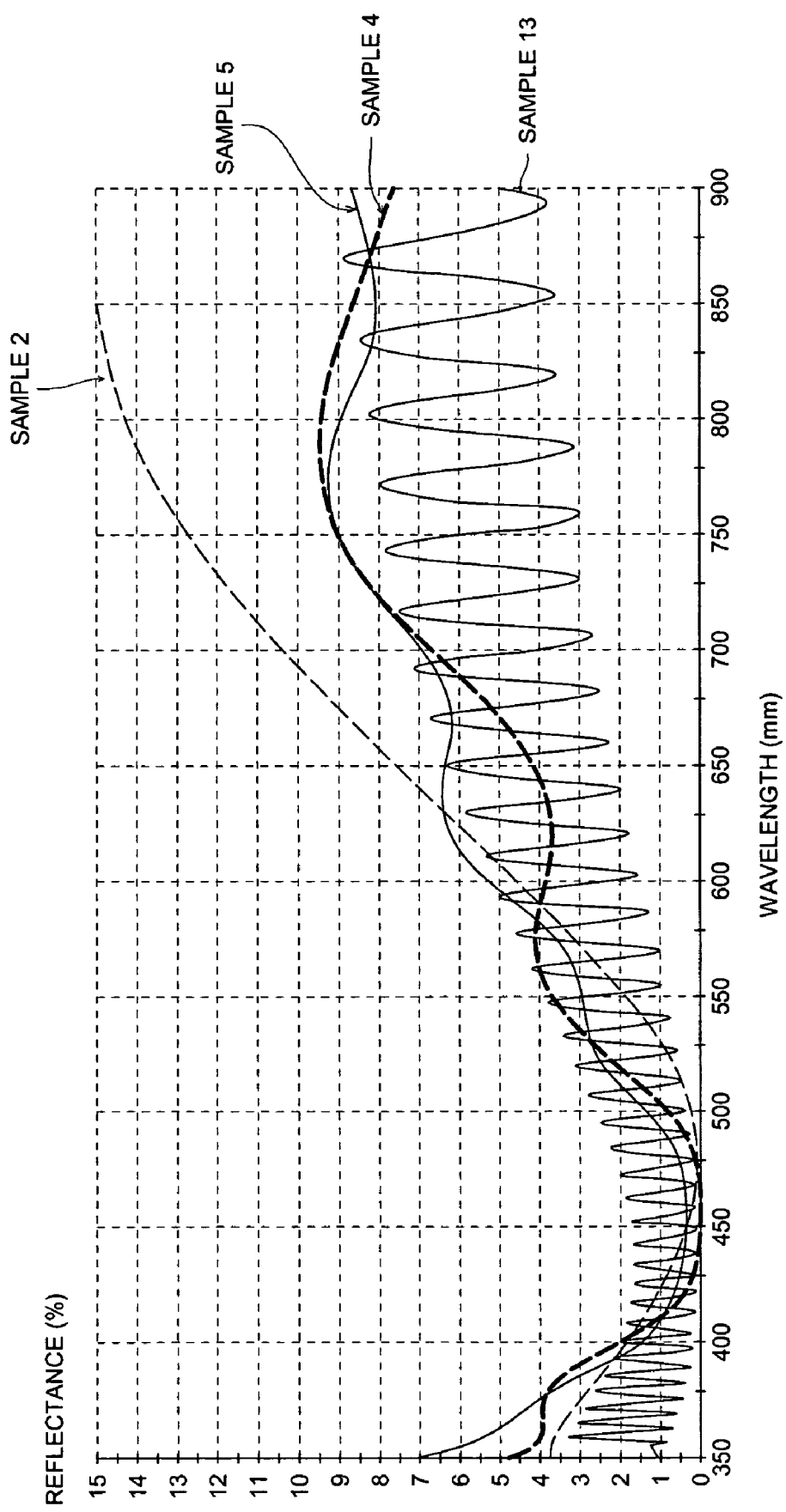
FIG. 5 shows relationships between wavelength and reflectance (spectroscopic reflectance) of the objective lenses of samples 2, 4, 5 and 13 of example 1.
Figure 6:
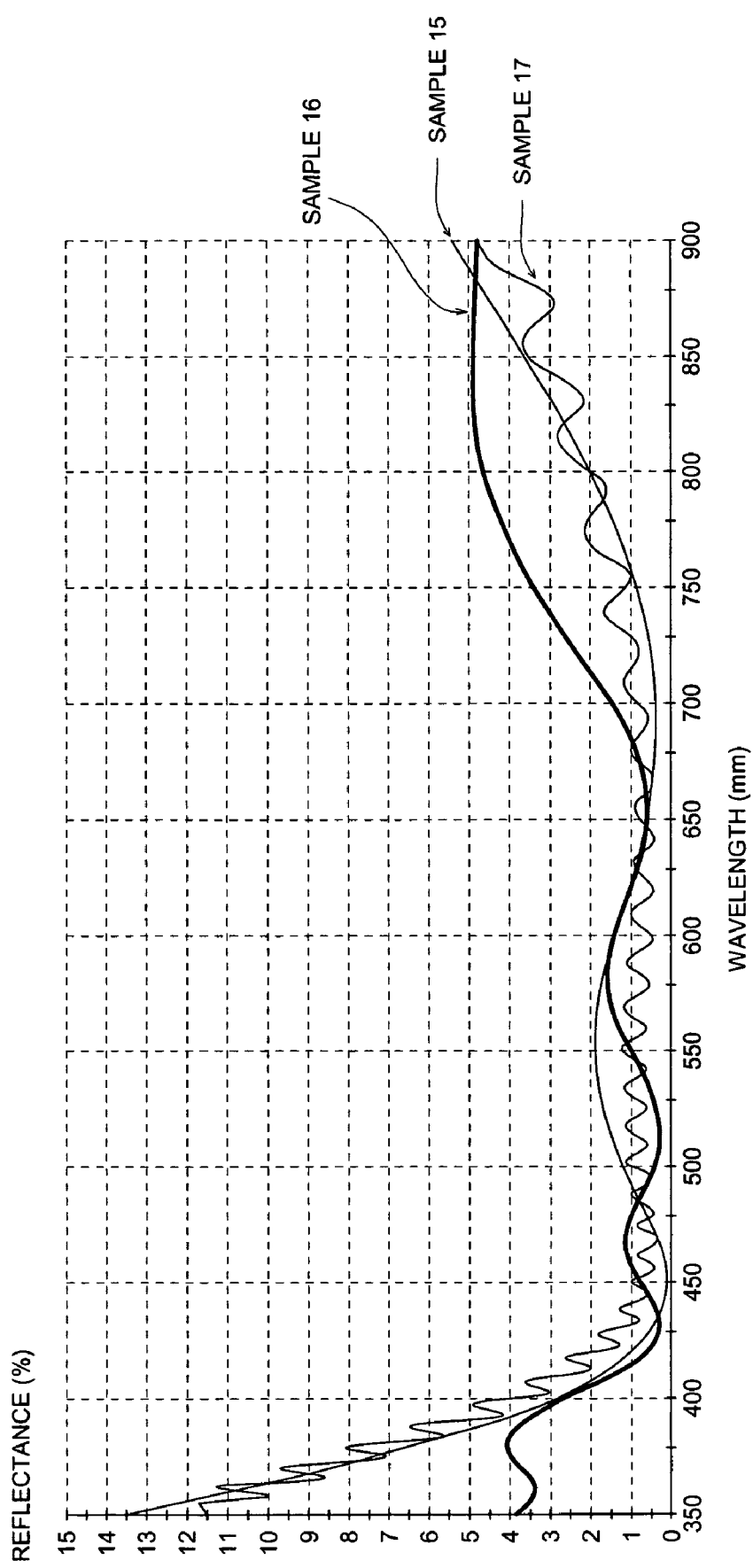
FIG. 6 shows relationships between wavelength and reflectance (spectroscopic reflectance) of samples 15, 16 and 17 of example 1.
Figure 7:
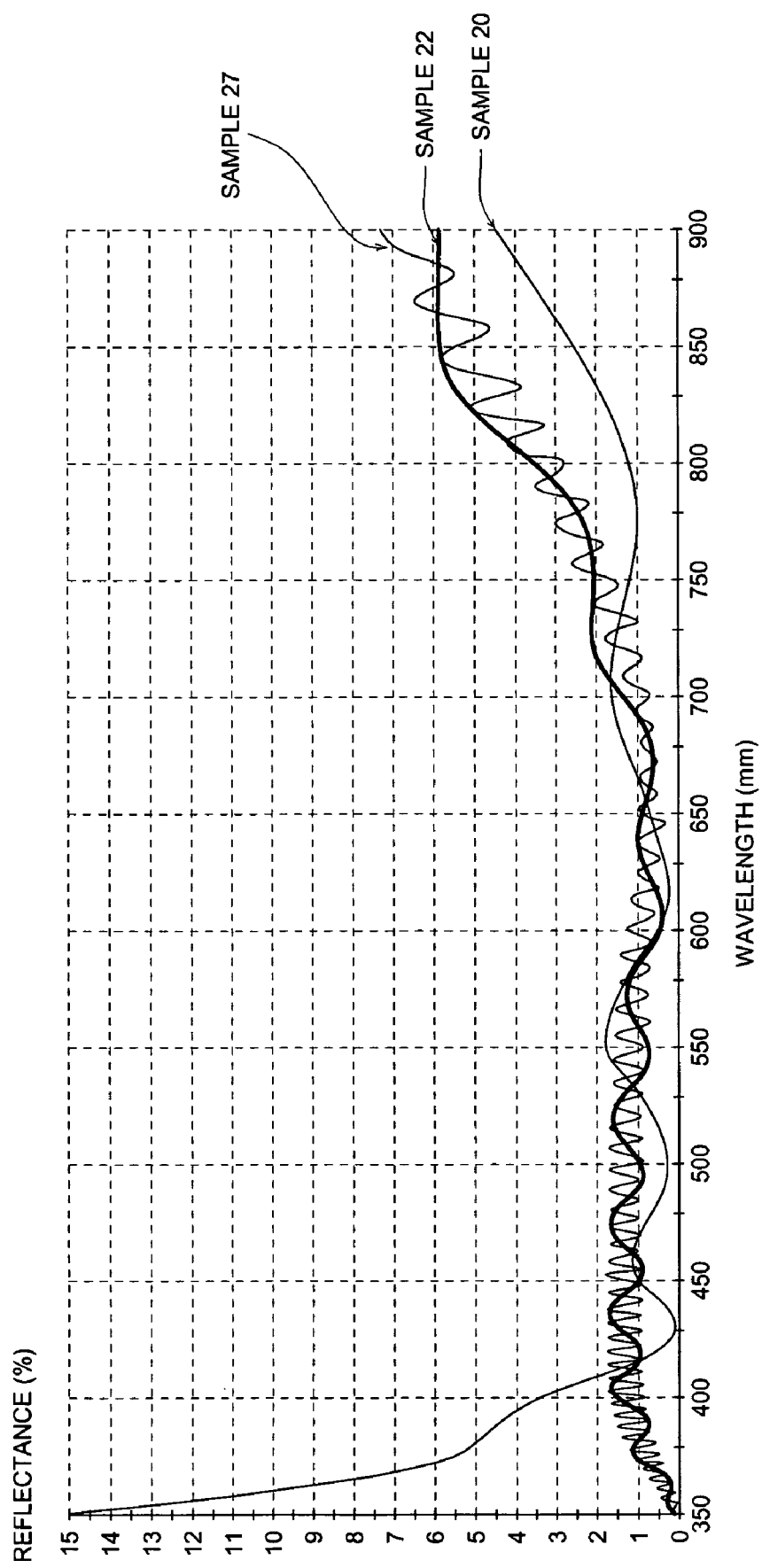
FIG. 7 shows relationships between wavelength and reflectance (spectroscopic reflectance) of samples 20, 22, and 27 of example 1.

Further, with respect to reflectance characteristics of each sample 1–30, the wavelength-reflectance characteristic diagrams (spectral reflectance) of samples 2, 4, 5 and 13 are shown in FIG. 5 as typical examples of a three-layered structure, the wavelength-reflectance characteristic diagrams (spectral reflectance) of samples 15, 16 and 17 are shown in FIG. 6 as typical examples of a five-layered structure, and the wavelength-reflectance characteristic diagrams (spectral reflectance) of samples 20, 22 and 27 are shown in FIG. 7 as typical examples of a seven-layered structure.

(Evaluation of Abrasion Resistance)

The layer surface of each sample 1–30 was wiped with a swab which had been immersed with isopropyl alcohol or B4 Lens Cleaning Liquid (a product name, manufactured by Nippon Swab Co., Ltd.), and the layer surface of each sample 1–30 was observed through a microscope at every ten times of the wiping operations to examine whether peeling of the layer had been caused or not in the layer surface of each sample 1–30. The results of the observation of each sample 1–30 are shown in table 6. In table 6, "A", "B" and "D" are based on the following criteria.

A: No peeling of the layer is observed even after 100 times of wiping.

B: No peeling of the layer is observed at 30 times of wiping, however, some peeling is observed at 100 times of wiping.

D: Some peeling is observed at 30 times of wiping.

(2-7) Evaluation of Environmental Resistance

A thermal resistance test and a high temperature and high humidity test were performed with respect to each sample 1–30, and the environmental resistance of each sample 1–30 was evaluated from the two types of tests. In a thermal resistance test, each sample 1–30 was kept under each of temperature environments of 85° C. and 90° C. for 168 hours, then kept at room temperature, and the appearance of the layer surface of each sample 1–30 was observed. While, in a high temperature and high humidity test, each sample 1–30 was kept under an environment of a temperature 60° C. and a humidity of 90% for 168 hours, then kept at room temperature, and the appearance of the layer surface of each sample 1–30 was observed. The evaluation results of environmental resistance of each sample 1–30 are shown in table 6. In table 6, "A", "B" and "D" are based on the following criteria.

A: No cracks or peeling of the layer are recognized in the both of a thermal resistance test (temperature of 90° C.) and a high temperature and high humidity test.

B: No cracks or peelings of a layer are recognized in the both of a thermal resistance test (temperature of 85° C.) and a high temperature and high humidity test, however, some cracks or peelings of a layer are recognized in a thermal resistance test (90° C.).

D: Some cracks or peelings of a layer are recognized in either of a thermal resistance test (temperature of 85° C.) or a high temperature and high humidity test.

(2-8) Overall Evaluation

Based on the results of (2-1)–(2-7) described above, each sample 1–30 was totally evaluated giving attention to whether each sample was most suitable as an objective lens or not (whether each sample reached a practically usable level or not). The evaluation results of each sample 1–30 are shown in table 6. In table 6, "A", "B", "C" and "D" are based on the following criteria.

A: Far superior than a practically usable level (There are at least two A's and no D's in items (2-4)–(2-7)).

B: Superior than a practically usable level (There is one or no A's, and no C's nor D's in items (2-4)–(2-7)).

C: Reached to a practically usable level (Not applied to the above A nor B, and there is no D's in items (2-4)–(2-7))

D: Not reached to a practically usable level (At least one D in items (2-4)–(2-7))

Herein, in samples 1–30, an arbitrary resin according to the manufacturing method of (1-1-1) and (1-1-2) described above, as "resin containing a polymer provided with a alicyclic structure" constituting a lens body, was utilized as a lens body, however, in addition to this, one type of arbitrary resin containing a hydrogenated norbornene ring-opening polymer described in the above embodiment was manufactured and samples similar to samples 1–30 were prepared employing said resin as a lens body to be measured and evaluated with respect to characteristics or properties of the samples in a similar manner to (2-1)–(2-8) described above. The measurement and evaluation results are not shown here, however, were similar to those of samples 1–30.

TABLE 6

|  | (2-1) Optical absorption value | (2-2) First layer thickness | (2-3) First layer refractive index | (2-4) Shape deformation | (2-5) Reflection characteristics | (2-6) Abrasion resistance | (2-7) Environmental resistance | (2-8) Overall evaluation |
|---|---|---|---|---|---|---|---|---|
| Sample 1 | B | 50 | 1.46 | C | B | B | B | C |
| Sample 2 | A | 80 | 1.49 | C | B | B | B | C |
| Sample 3 | A | 100 | 1.49 | B | B | B | A | B |
| Sample 4 | A | 500 | 1.46 | A | B | B | A | A |
| Sample 5 | A | 1000 | 1.46 | A | B | B | A | A |
| Sample 6 | A | 6000 | 1.46 | A | B | A | A | A |
| Sample 7 | A | 10000 | 1.49 | A | B | A | B | A |
| Sample 8 | A | 12000 | 1.49 | A | B | A | B | A |
| Sample 9 Comp. | A | 16000 | 1.46 | A | B | B | D | D |
| Sample 10 | A | 5000 | 1.58 | A | B | B | A | A |
| Sample 11 | A | 15000 | 1.51 | A | B | B | B | B |
| Sample 12 Comp. | A | 38 | 1.46 | D | B | D | B | D |
| Sample 13 | A | 6000 | 1.69 | A | C | B | B | C |
| Sample 29 Comp. | B | 500 | 1.46 | B | D | B | B | D |
| Sample 14 | B | 100 | 1.46 | B | B | B | B | B |
| Sample 15 | A | 150 | 1.46 | B | B | B | B | B |
| Sample 16 | A | 1000 | 1.46 | A | B | A | B | A |
| Sample 17 | A | 5000 | 1.62 | A | B | A | B | A |
| Sample 18 Comp. | D | 20 | 1.46 | D | B | D | B | D |
| Sample 19 | B | 87.6 | 1.46 | C | B | B | B | C |
| Sample 20 | A | 100 | 1.46 | B | B | B | B | B |
| Sample 21 | A | 1000 | 1.69 | B | C | B | B | C |
| Sample 22 | A | 1500 | 1.46 | A | B | A | B | A |
| Sample 23 | B | 12000 | 1.46 | B | A | A | B | A |
| Sample 24 | B | 3000 | 1.46 | B | A | A | B | A |
| Sample 25 | A | 5000 | 1.46 | A | B | A | B | A |
| Sample 26 | A | 7500 | 1.50 | A | B | A | B | A |
| Sample 27 | A | 10000 | 1.46 | A | B | A | B | A |
| Sample 28 Comp. | A | 16000 | 1.46 | A | B | B | D | D |
| Sample 30 Comp. | A | 155 | 1.85 | D | B | B | B | D |

Comp.: (Comparison)

It is clear from table 6 that in samples 1–13 and 29 provided with a layer constitution of a three-layered structure, excellent results were not obtained from samples 9 and 12, the thickness of the first layer of which was out of a range of 50–15000 nm, however, excellent results were obtained from samples 1–8, 10, 11 and 13, the thickness of the first layer of which was in a range of 50–15000 nm. In particular, it has been proved that the thickness of the first layer is preferably 100–15000 nm from the results of samples 3–8, 10, 11 and the thickness of the first layer is more preferably 500–12000 nm from the results of samples 4–8 and 10. Further, it has been proved from the result of sample 28 that minimum reflectance Rmin becomes not less than 0.5% resulting in deteriorated reflectance characteristics when the refractive index of the second layer is not more than 1.7.

In samples 14–18 provided with a layer constitution of a five-layered structure, an excellent result was not obtained from sample 18, the thickness of the first layer of which was out of a range of 50–15000 nm, however, excellent results were obtained from sample 14–17, the thickness of the first layer of which was in a range of 50–15000 nm.

In samples 19–28 and 30 provided with a layer constitution of a seven-layered structure, an excellent result was not obtained from sample 28, the thickness of the first layer of which was out of a range of 50–15000 nm, however, excellent results were obtained from sample 19–27, the thickness of the first layer of which was in a range of 50–15000 nm. Further, it has been proved from the result of sample 30 that the appearance of the layer surface changes as well as the surface shape deformation is significant when the refractive index of the first layer is not less than 1.7.

Further it has been proved from the results of samples 13 and 21 that periodical variation width of the spectral reflectance in vertical direction (spectrum amplitude in the spectral reflectance) becomes 1.5% or more, which can not be said as excellent reflectance characteristics, when the refractive index of the first layer is out of a range of ±10% of the refractive index of the lens body.

Example 2

In example 2, a plural number of samples were prepared utilizing a lens body corresponding to each lens body 40, 50 and 60 shown in FIGS. 2, 3 and 4, and characteristics or properties of each sample prepared were measured and evaluated.

(3) Preparation of Samples 41–54

(3-1) Preparation of Lens Bodys A, B and C (3-1-1) Preparation of Lens Body A

A lens body corresponding to lens body 40 of FIG. 2 was prepared according to the manufacturing method described in items (1-1-1) and (1-1-2) of example 1 above described, and was designated as lens body A. Lens characteristics of lens body A are shown in Table 7. With respect to the lens characteristics of lens body A, for light of wavelength 405 nm, NA=0.85, P1=0, |P1/P2|=0, $d_2/f_2$=1.31 and $f_2$=2.2 mm, where "NA" represents the numerical aperture on the image side of an optical element corresponding to optical element 42 of FIG. 2, "P1" represents the paraxial power of the optical element corresponding to optical element 41, "P2" represents the paraxial power of the optical element corresponding to optical element 42, "$d_2$" represents the thickness on the optical axis of the optical element corresponding to optical element 42 and was "$f_2$" represents the focal distance of the optical element (an optical element corresponding to the optical element 42 of FIG. 2) for light of a wavelength 405 nm.

TABLE 7

| Surface Number | r (mm) | d (mm) | $N_{780}$ | $N_{650}$ | $N_{405}$ | $v_d$ | Remarks |
|---|---|---|---|---|---|---|---|
| S0 |  | d0 (variable) |  |  |  |  | Light source |
| S1 | 73.397 | 0.700 | 1.53734 | 1.54090 | 1.56013 | 56.7 | Optical element A |
| S2 | 15.448 | 0.050 |  |  |  |  |  |
| S3 | 1.481 | 2.880 | 1.53734 | 1.54090 | 1.56013 | 56.7 | Optical element B |
| S4 | −2.213 | d4 (variable) |  |  |  |  |  |
| S5 | ∞ | d5 | 1.57062 | 1.57756 | 1.61949 | 30.0 | Transparent lens body |
| S6 | ∞ | (variable) |  |  |  |  |  |

| Aspheric Coefficient | | | | |
|---|---|---|---|---|
|  | S1 | S2 | S3 | S4 |
| κ | 1.0000E+01 | −3.2040E+02 | −6.9456E−01 | −4.2199E+01 |
| $A_4$ | −2.6004E−02 | −2.3152E−02 | 8.6333E−03 | 8.7350E−02 |
| $A_6$ | 7.5368E−03 | 6.4221E−03 | 2.2473E−03 | −6.8060E−02 |
| $A_8$ | −1.7309E−03 | −3.6784E−04 | −1.0354E−03 | 1.8814E−02 |
| $A_{10}$ | 2.0472E−04 | 5.9437E−05 | 7.9520E−04 | 1.38884E−04 |
| $A_{12}$ |  |  | −1.3879E−04 | −8.1055E−04 |
| $A_{14}$ |  |  | −3.9714E−05 |  |
| $A_{16}$ |  |  | 1.7745E−05 |  |
| $A_{18}$ |  |  | 3.6874E−07 |  |
| $A_{20}$ |  |  | −6.0458E−07 |  |

| Coefficient of Diffraction Surface | | |
|---|---|---|
|  | S1 | S2 |
| $b_2$ | −1.0333E−03 | −1.3785E−03 |
| $b_4$ | 5.8830E−04 | −5.1124E−05 |
| $b_6$ | −5.3581E−05 | −1.8337E−05 |
| $b_8$ | −1.2776E−04 | −1.3817E−06 |
| $b_{10}$ | 2.0884E−05 | −3.4287E−06 |

|  | High density DVD | DVD | CD |
|---|---|---|---|
| $d_0$ (variable) | ∞ | 28.951 | 18.099 |
| $d_4$ (variable) | 0.602 | 0.505 | 0.266 |
| $d_5$ (variable) | 0.100 | 0.600 | 1.200 |

In table 7, "optical element A" corresponds to optical element 41 of FIG. 2, "optical element B" corresponds to optical element 42 of FIG. 2, "S1" is a surface corresponding to surface 41a of FIG. 2, "S2" is a surface corresponding to rear surface 41b of FIG. 2, "S3" is a surface corresponding to rear surface 42b of FIG. 2, "S4" is a surface corresponding to surface 42a of FIG. 2, "r (mm)" is a radius of paraxial curvature, "d (mm)" is a thickness on an optical axis, "$N_{780}$" is a refractive index for light of a wavelength 780 nm, "$N_{650}$" is a refractive index for light of a wavelength 650 nm, "$N_{405}$" is a refractive index for light of a wavelength 405 nm, and "$v_d$" is an Abbe's number.

In table 7, with respect to the description of the table in the second column from the top, each surface S1, S2, S3 and S4 forms an aspheric shape represented by following Formula (101).

$$X = \frac{h^2/r}{1+\sqrt{1-(1+\kappa)h^2/r^2}} + \sum_{i=2}^{10} A_{2i}h^{2i} \qquad \text{Formula (101)}$$

In above Formula (101), "X" represents an axis in the optical axis direction (The progressing direction of light is positive.), "h" is an axis in the perpendicular direction to the optical axis (a height from the optical axis), "r" is a radius of paraxial curvature, "κ" is a cone constant, and "A" is an aspheric coefficient.

In table 7, with respect to the description of the third column from the top, each surface S1 and S2 is provided with a diffractive structure based on an optical path difference function $\Omega_b$ (mm) represented by following Formula (102).

$$\Phi_b = n\sum_{j=1}^{5} b_{2j} h^{2j}$$ Formula (102)

In above Formula (102), "b" represents a coefficient of a diffractive surface.

(3-1-2) Preparation of Lens Body B

A lens body corresponding to lens body 50 of FIG. 3 was prepared, following the manufacturing method described in items (1-1-1) and (1-1-2) of example 1 above described, and was designated as lens body B. Lens characteristics of lens body B are shown in Table 8. With respect to the lens characteristics of lens body B, NA=0.85, f=1.76 mm and β=0.368 for light of wavelength 405 nm, where "NA" represents the numerical aperture on the image side of the optical element corresponding to optical element 52 of FIG. 3, "f" represents the focal distance of the optical element (an optical element corresponding to optical element 52 of FIG. 3), and "β" represents a lens magnification of the optical element corresponding to optical element 52 of FIG. 3.

TABLE 8

| Surface number | r (mm) | d (mm) | N | $v_d$ | Remarks |
|---|---|---|---|---|---|
| 0 | ∞ | | | | Light source |
| 1 | 2.0993 | 2.5000 | 1.52469 | 56.5 | Objective lens |
| 2 | 7.4878 | 0.0500 | | | |
| 3 | 0.8495 | 1.1000 | 1.52469 | 56.5 | |
| 4 | ∞ | 0.2400 | | | |
| 5 | ∞ | 0.1000 | 1.61950 | 30.0 | Protective layer |
| 6 | ∞ | | | | |

| Aspheric Coefficient | | | |
|---|---|---|---|
| | The first surface | The second surface | The third surface |
| κ | −1.29619E−01 | 4.21216E+01 | −7.52178E−01 |
| $A_4$ | −3.32463E−03 | 7.05250E−03 | 1.33488E−01 |
| $A_6$ | −6.20097E−05 | −1.83155E−02 | 8.64895E−03 |
| $A_8$ | −5.15940E−04 | 9.12154E−03 | 2.15671E−01 |
| $A_{10}$ | −1.18058E−04 | −6.43084E−03 | −1.09974E−01 |
| $A_{12}$ | −6.64802E−05 | −7.44093E−03 | |
| $A_{14}$ | 1.21151E−04 | | |
| $A_{16}$ | −3.94410E−05 | | |

In table 8, "an objective lens" corresponds to said lens body B, "surface number 1" and "the first surface" correspond to surface 51a of FIG. 3, "surface number 2" and "the second surface" correspond to rear surface 51b of FIG. 3, "surface number 3" and "the third surface" correspond to rear surface. 52b of FIG. 3, "surface number 4" corresponds to surface 52a of FIG. 3, "r (mm)" is a radius of paraxial curvature, "d (mm)" is a thickness on the optical axis, "N" is a refractive index for light of wavelength 405 nm, and "$v_d$" an Abbe's number.

In table 8, with respect to the descriptions in the of the bottom column, the first surface, the second surface and the third surface are formed in an aspheric form represented by above Formula (101).

(3-1-3) Preparation of Lens Body C

A lens body corresponding to lens body 60 of FIG. 4 was prepared according to the manufacturing method described in items (1-1-1) and (1-1-2) of example 1 above described, and was designated as lens body C. Lens characteristics of lens body C are shown in Table 8. With respect to the lens characteristics of lens body B, NA=0.85, f=1.765 mm and d/f=1.47 for light of wavelength was 405 nm, where "NA" represents a numerical aperture on the image side, "f" represents the focal distance, and "d" represents a thickness on the optical axis.

TABLE 9

| λ = 405 (nm) |
| F = 1.765 (mm) |
| NA = 0.85 |
| Magnification = 0 |

| | r (mm) | d (mm) | N | $v_d$ |
|---|---|---|---|---|
| 1* | 1.17503 | 2.602 | 1.52523 | 59.5 |
| 2* | −1.04152 | 0.357 | | |
| 3 | ∞ | 0.100 | 1.61950 | 30.0 |
| 4 | ∞ | 0.000 | | |

| Aspheric Coefficient | | |
|---|---|---|
| | The first surface | The second surface |
| κ | −0.682004 | −29.373780 |
| $A_4$ | 0.180213E−01 | 0.297543E+00 |
| $A_6$ | 0.368416E−02 | −0.423018E+00 |
| $A_8$ | 0.140365E−02 | 0.295535E+00 |
| $A_{10}$ | 0.342876E−03 | −0.829290E−01 |
| $A_{12}$ | −0.311534E−04 | −0.252257E−03 |
| $A_{14}$ | 0.103341E−03 | |
| $A_{16}$ | 0.141728E−04 | |

*Aspheric Surface

In table 8, "1*" and "the first surface" correspond to surface 60a of FIG. 4, "2*" and "the second surface" correspond to rear surface 60b of FIG. 4, "r (mm)" is a radius of paraxial curvature, "d (mm)" is a thickness on the optical axis, "N" is a refractive index for light of a wavelength 405 nm, and "$v_d$" is an Abbe's number.

With respect to the descriptions in table 9, each of the first surface and the second surface is formed in an aspheric form represented by above Formula (101).

(3-2) Preparation of Samples 41–54

At least two layers were deposited on each lens body A, B and C prepared above by utilizing a commonly known vacuum evaporation method. The deposition patterns of the layers deposited on each lens body A, B and C are shown in tables 10–13. Herein, in tables 10–13, "the first layer" is a layer deposited directly on any one of lens bodys A, B and C, and "the m'th layer (m is a positive integer of at least 2)" is a layer deposited on the (m−1)'th layer.

TABLE 10

|  | Deposition pattern 1 | Deposition pattern 2 | Deposition pattern 3 |
|---|---|---|---|
| *The first layer* | | | |
| Evaporation material | Hafnium oxide | Zirconium oxide | Substance M3 |
| Layer material | Hafnium oxide | Zirconium oxide | Lanthanum aluminate |
| Introduced gas | Oxygen gas | Oxygen gas | Oxygen gas |
| n1 | 1.89 | 1.94 | 1.95 |
| d1 (nm) | 38 | 37 | 62 |
| *The second layer* | | | |
| Evaporation material | Silicon oxide | Silicon oxide | Silicon oxide |
| Layer material | Silicon oxide | Silicon oxide | Silicon oxide |
| Introduced gas | Argon gas | Argon gas | Argon gas |
| n2 | 1.46 | 1.46 | 1.46 |
| d2 (nm) | 90 | 78 | 81 |

TABLE 12

|  | Deposition pattern 12 | Deposition pattern 13 | Deposition pattern 14 |
|---|---|---|---|
| *The first layer* | | | |
| Evaporation material | Silicon oxide | Aluminum oxide | Silicon oxide |
| Layer material | Silicon oxide | Aluminum oxide | Silicon oxide |
| Introduced gas | None | Oxygen gas | None |
| n1 | 1.46 | 1.65 | 1.46 |
| d1 (nm) | 56 | 100 | 70 |
| *The second layer* | | | |
| Evaporation material | Substance H5 | Substance M3 | Zirconium oxide |
| Layer material | Lanthanum titanate | Lanthanum aluminate | Zirconium oxide |
| Introduced gas | Oxygen gas | Oxygen gas | Oxygen gas |
| n2 | 1.94 | 1.76 | 1.93 |
| d2 (nm) | 22.1 | 40 | 18 |

TABLE 11

|  | Deposition pattern 4 | Deposition pattern 5 | Deposition pattern 6 | Deposition pattern 7 | Deposition pattern 8 | Deposition pattern 9 | Deposition pattern 10 | Deposition pattern 11 |
|---|---|---|---|---|---|---|---|---|
| *The first layer* | | | | | | | | |
| Evaporation material | Silicon oxide | Silicon oxide | Lanthanum fluoride | Cerium fluoride | Substance L5 | Silicon oxide | A mixture of aluminum oxide and silicon oxide | Silicon oxide |
| Layer material | Silicon oxide | Silicon oxide | Lanthanum fluoride | Cerium fluoride | A mixture of silicon oxide and aluminum oxide | Silicon oxide | Silicon aluminum oxide | Silicon oxide |
| Introduced gas | None | None | Argon gas | None | Argon gas | None | None | None |
| n1 | 1.46 | 1.46 | 1.6 | 1.63 | 1.49 | 1.46 | 1.51 | 1.46 |
| d1 (nm) | 50 | 80 | 100 | 500 | 12000 | 16000 | 15000 | 38 |
| *The second layer* | | | | | | | | |
| Evaporation material | Substance H5 | Hafnium oxide | Zirconium oxide | Substance M3 | Zirconium oxide | Substance M3 | Substance M3 | Substance M3 |
| Layer material | Lanthanum titanate | Hafnium oxide | Zirconium oxide | Lanthanum aluminate | Zirconium oxide | Lanthanum aluminate | Lanthanum aluminate | Lanthanum aluminate |
| Introduced gas | Oxygen gas | Oxygen gas | Oxygen gas | Oxygen gas | Oxygen gas | Oxygen gas | Oxygen gas | Oxygen gas |
| n2 | 2.01 | 1.89 | 1.94 | 1.95 | 1.94 | 1.95 | 1.76 | 1.95 |
| d2 (nm) | 27 | 94 | 45 | 45 | 108 | 27 | 74 | 70 |
| *The third layer* | | | | | | | | |
| Evaporation material | Substance L5 | Silicon oxide | Substance L5 | Silicon oxide | Substance L5 | Substance L5 | Silicon oxide | Silicon oxide |
| Layer material | A mixed material of silicon oxide and aluminum oxide | Silicon oxide | A mixed material of silicon oxide and aluminum oxide | Silicon oxide | A mixed material of silicon oxide and aluminum oxide | A mixed material of silicon oxide and aluminum oxide | Silicon oxide | Silicon oxide |
| Introduced gas | None | Oxygen gas | Oxygen gas | Oxygen gas | Oxygen gas | None | Oxygen gas | None |
| n3 | 1.49 | 1.46 | 1.49 | 1.46 | 1.49 | 1.49 | 1.46 | 1.46 |
| d3 (nm) | 86 | 61 | 83 | 83 | 55 | 86 | 76 | 72 |

TABLE 12-continued

|  | Deposition pattern 12 | Deposition pattern 13 | Deposition pattern 14 |
|---|---|---|---|
| The third layer | | | |
| Evaporation material | Silicon oxide | Silicon oxide | Silicon oxide |
| Layer material | Silicon oxide | Silicon oxide | Silicon oxide |
| Introduced gas | None | Oxygen gas | None |
| n3 | 1.46 | 1.46 | 1.46 |
| d3 (nm) | 45 | 31 | 50 |
| The fourth layer | | | |
| Evaporation material | Substance H5 | Substance M3 | Zirconium oxide |
| Layer material | Lanthanum titanate | Lanthanum aluminate | Zirconium oxide |
| Introduced gas | Oxygen gas | Oxygen gas | Oxygen gas |
| n4 | 1.94 | 1.76 | 1.93 |
| d4 (nm) | 43 | 77 | 61 |
| The fifth layer | | | |
| Evaporation material | Silicon oxide | Silicon oxide | Silicon oxide |
| Layer material | Silicon oxide | Silicon oxide | Silicon oxide |
| Introduced gas | None | Oxygen gas | None |
| n5 | 1.46 | 1.46 | 1.46 |
| d5 (nm) | 100 | 15 | 15 |
| The sixth layer | | | |
| Evaporation material | — | Substance M3 | Zirconium oxide |
| Layer material | — | Lanthanum aluminate | Zirconium oxide |
| Introduced gas | — | Oxygen gas | Oxygen gas |
| n6 | — | 1.76 | 1.93 |
| D6 (nm) | — | 76 | 66 |
| The seventh layer | | | |
| Evaporation material | — | Silicon oxide | Silicon oxide |
| Layer material | — | Silicon oxide | Silicon oxide |
| Introduced gas | — | Oxygen gas | None |
| n7 | — | 1.46 | 1.46 |
| d7 (nm) | — | 105 | 103 |

TABLE 13-1

|  | Deposition pattern 15 | Deposition pattern 16 | Deposition pattern 17 | Deposition pattern 18 | Deposition pattern 19 | Deposition pattern 20 |
|---|---|---|---|---|---|---|
| Evaporation material | Silicon oxide | Silicon oxide | Silicon oxide | Silicon oxide | Silicon oxide | Hafnium oxide |
| Layer material | Silicon oxide | Silicon oxide | Silicon oxide | Silicon oxide | Silicon oxide | Hafnium oxide |
| Introduced gas | None | None | Oxygen gas | None | Oxygen gas | Oxygen gas |
| n1 | 1.46 | 1.46 | 1.46 | 1.46 | 1.46 | 1.85 |
| d1 (nm) | 87.6 | 1500 | 5000 | 10000 | 16000 | 155 |
| The second layer | | | | | | |
| Evaporation material | Substance H5 | Zirconium oxide | Hafnium oxide | Zirconium oxide | Hafnium oxide | Zirconium oxide |
| Layer material | Lanthanum titanate | Zirconium oxide | Hafnium oxide | Zirconium oxide | Hafnium oxide | Zirconium oxide |
| Introduced gas | Oxygen gas | Oxygen gas | Oxygen gas | Oxygen gas | Oxygen gas | Oxygen gas |
| n2 | 1.94 | 1.93 | 1.85 | 1.93 | 1.85 | 1.93 |
| d2 (nm) | 22.1 | 13.7 | 14.8 | 13.7 | 12.4 | 7.4 |
| The third layer | | | | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | None | Oxygen gas | None | Oxygen gas | None |
| n3 | 1.46 | 1.46 | 1.46 | 1.46 | 1.46 | 1.46 |
| d3 (nm) | 41.2 | 39.5 | 41.5 | 39.5 | 34.4 | 48.5 |

TABLE 13-2

|  | Deposition pattern 15 | Deposition pattern 16 | Deposition pattern 17 | Deposition pattern 18 | Deposition pattern 19 | Deposition pattern 20 |
|---|---|---|---|---|---|---|
| The fourth layer | | | | | | |
| Evaporation material | Substance H5 | Zirconium oxide | Hafnium oxide | Zirconium oxide | Hafnium oxide | Zirconium oxide |
| Layer material | Lanthanum titanate | Zirconium oxide | Hafnium oxide | Zirconium oxide | Hafnium oxide | Zirconium oxide |
| Introduced gas | Oxygen gas | Oxygen gas | Oxygen gas | Oxygen gas | Oxygen gas | Oxygen gas |
| n4 | 1.94 | 1.93 | 1.85 | 1.93 | 1.85 | 1.93 |
| d4 (nm) | 52.2 | 54.8 | 57.4 | 54.8 | 48.2 | 37.3 |

TABLE 13-2-continued

|  | Deposition pattern 15 | Deposition pattern 16 | Deposition pattern 17 | Deposition pattern 18 | Deposition pattern 19 | Deposition pattern 20 |
|---|---|---|---|---|---|---|
| The fifth layer | | | | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | None | Oxygen gas | None | Oxygen gas | None |
| n5 | 1.46 | 1.46 | 1.46 | 1.46 | 1.46 | 1.46 |
| d5 (nm) | 15.1 | 13.5 | 16 | 13.5 | 11.8 | 23.8 |
| The sixth layer | | | | | | |
| Evaporation material | Substance H5 | Zirconium oxide | Hafnium oxide | Zirconium oxide | Zirconium oxide | Zirconium oxide |
| Layer material | Lanthanum titanate | Zirconium oxide | Hafnium oxide | Zirconium oxide | Zirconium oxide | Zirconium oxide |
| Introduced gas | Oxygen gas | Oxygen gas | Oxygen gas | Oxygen gas | Oxygen gas | Oxygen gas |
| n6 | 1.94 | 1.93 | 1.85 | 1.93 | 1.93 | 1.93 |
| D6 (nm) | 51.7 | 46.2 | 64.1 | 46.2 | 6.83 | 104.6 |
| The seventh layer | | | | | | |
| Evaporation material | Silicon oxide | Silicon oxide | Silicon oxide | Silicon oxide | Silicon oxide | Silicon oxide |
| Layer material | Silicon oxide | Silicon oxide | Silicon oxide | Silicon oxide | Silicon oxide | Silicon oxide |
| Introduced gas | None | None | Oxygen gas | None | Oxygen gas | None |
| n7 | 1.46 | 1.46 | 1.46 | 1.46 | 1.46 | 1.46 |
| d7 (nm) | 92.8 | 82.4 | 97.2 | 82.4 | 68.6 | 82.5 |

At least two layers were deposited on each lens body A, B and C, in any one of deposition patterns 1–20 in tables 10–13, and these were designated as samples 41–54. The combination of lens bodys A, B or C with deposition patterns 1–20 in each sample 41–54 is shown in table 14. Herein, in table 14, "S1" is a surface corresponding to surface 41a of FIG. 2, rear surface 52b of FIG. 3 and surface 60a of FIG. 4, "S2" is a surface corresponding to rear surface 41b of FIG. 2, and rear surface 51b of FIG. 3, and rear surface 60b of FIG. 4, "S3" is a surface corresponding to surface 42b of FIG. 2 and rear surface 52b of FIG. 3, and "S4" is a surface corresponding to surface 42a of FIG. 2, and surface 52a of FIG. 3.

TABLE 14

| | Type of lens body | S1 Deposition pattern | S2 Deposition pattern | S3 Deposition pattern | S4 Deposition pattern |
|---|---|---|---|---|---|
| Sample 41 | C | 3 | 4 | — | — |
| Sample 42 | C | 3 | 5 | — | — |
| Sample 43 | B | 1 | 2 | 1 | 6 |
| Sample 44 | B | 1 | 2 | 1 | 7 |
| Sample 45 | B | 1 | 2 | 1 | 8 |
| Sample 46 | B | 1 | 2 | 1 | 10 |
| Sample 47 | A | 12 | 12 | 13 | 15 |
| Sample 48 | A | 12 | 12 | 13 | 16 |
| Sample 49 | A | 13 | 13 | 13 | 17 |
| Sample 50 | A | 13 | 14 | 14 | 18 |
| Sample 51 (Comparison) | C | 3 | 9 | — | — |
| Sample 52 (Comparison) | B | 1 | 2 | 1 | 11 |
| Sample 53 (Comparison) | A | 12 | 12 | 13 | 19 |
| Sample 54 (Comparison) | A | 13 | 13 | 14 | 20 |

(4) Measurement and Evaluation of Characteristics or Properties of Each Sample.

With respect to each of samples 41–54 prepared above, measurement and evaluation of the following characteristics or properties were performed.

(4-1) Measurement of Layer Thickness

With respect to each of samples 41–54, a layer thickness (nm) of the first layer according to the description of item (2-2) of example 1 described above. In the measurement of a layer thickness, a surface corresponding to rear surface 60b of FIG. 4 was an object of measurement with respect to each of samples 41, 42 and 51 which was constituted of lens body C; a surface corresponding to surface 52a of FIG. 3 was an object of measurement with respect to each sample 43–46 and 52 which was constituted of lens body B; a surface corresponding to surface 42a of FIG. 2 was an object of measurement with respect to each sample 47–50, 53 and 54 which was constituted of lens body A; and a thickness of the first layer at the central portion of each of surfaces corresponding to these rear surface 60b, surface 52a and surface 42a was measured to designate the measured value as a layer thickness of each of samples 41–54. The measurement result of each of samples 41–54 is shown in table 15.

(4-2) Measurement of Refractive Index

A refractive index of the first layer in each of samples 41–54 was measured by use of an eripsometer. In measurement of a refractive index, a surface corresponding to rear surface 60b of FIG. 4 was an object of measurement with respect to each sample 41, 42 and 51 which was constituted of lens body C; a surface corresponding to surface 52a of FIG. 3 was an object of measurement with respect to each of samples 43–46 and 52 which was constituted of lens body B; a surface corresponding to surface 42a of FIG. 2 was an object of measurement with respect to each of samples 47–50, 53 and 54 which was constituted of lens body A. The measurement result of each of samples 41–54 is shown in table 15. Herein, in a practical measurement of a refractive index, prepared were quasi samples 41–54 lens bodys A, B and C of which were replaced by a glass plate, and a refractive index of the first layer each of quasi samples 41–54 was measured by an eripsometer to make said refractive index of each of samples 41–54 was designated as a refractive index of the first layer.

(4-3) Observation of Shape Deformation

Under an environment of a temperature of 85° C. and a relative humidity of 5%, laser light of a wavelength 405 nm provided with an optical intensity of 25 mW/cm² was made into parallel light by a collimator lens, and the light was irradiated on each of samples 41–54. The light was incident on a surface corresponding to surface 60a of FIG. 4 with respect to each of samples 41, 42 and 51 which was constituted of lens body C; the light was incident on a surface corresponding to surface 51a of FIG. 3 with respect to each of samples 43–46 and 52 which was constituted of lens body B; the light was incident on a surface corresponding to surface 41a of FIG. 2 with respect to each of samples 47–50, 53 and 54 which was constituted of lens body A.

The appearance of each of samples 41–54 was observed as well as surface shape deformation of each of samples 41–54 was measured by use of a surface roughness meter at light irradiation time of 100 hours, 150 hours and 200 hours. A surface corresponding to rear surface 60b of FIG. 4 was an object of observation and measurement with respect to each of samples 41, 42 and 51 which was constituted of lens body C; a surface corresponding to surface 52a of FIG. 3 was an object of observation and measurement with respect to each of samples 43–46 and 52 which was constituted of lens body B; a surface corresponding to surface 42a of FIG. 2 was an object of observation and measurement with respect to each of samples 47–50, 53 and 54 which was constituted of lens body A. The results of observation and measurement of each of samples 41–54 are shown in table 15. In table 15, the criteria of "A", "B", "C" and "D" are same as the explanations described in item (2-4) of example 1.

(4-4) Evaluation of Abrasion Resistance

With respect to each sample 41–54, whether peeling of a layer was caused or not was observed as described in item (2-6) of example 1 above described. A surface corresponding to rear surface 60b of FIG. 4 was an object of observation with respect to each of samples 41, 42 and 51 which was constituted of lens body C; a surface corresponding to surface 52a of FIG. 3 was an object of observation with respect to each of samples 43–46 and 52 which was constituted of lens body B; a surface corresponding to surface 42a of FIG. 2 was an object of observation with respect to each of samples 47–50, 53 and 54 which was constituted of lens body A. The observation results of each of samples 41–54 are shown in table 15. In table 15, the criteria of "A", "B" and "D" are same as the explanations described in item (2-6) of example 1.

(4-5) Evaluation of Environmental Resistance

With respect to each of samples 41–54, environmental resistance was evaluated according to the explanation of item (2-7) in example 1. In each sample 41–54, all the surfaces, on which a layer had been deposited, were objects of the measurement. Evaluation results of environmental resistance of each of samples 41–54 are shown in table 15. In table 15, the criteria of "A", "B" and "D" are same as the explanations described in item (2-7) of example 1.

(4-6) Overall Evaluation

Based on the results of (4-1)–(4-5) described above, each of sample 41–54 was totally evaluated giving attention to whether each sample was most suitable as an objective lens or not (whether each sample reaches a practically usable level or not). The evaluation results of each of samples 41–54 are shown in table 15. In table 15, "A", "B", "C" and "D" are based on the following criteria.

A: Being far superior than a practically usable level (Item (4-3) described above is A; either one of two items (4-4) and (4-5) is A, and the other is B or A.).

B: Being superior than a practically usable level (One of three items (4-3), (4-4) and (4-5) described above is A, the rest two are B; or the all of three items (4-3), (4-4) and (4-5) are B).

C: Reaching to a practically usable level (There are some C's but no D's in three items (4-3), (4-4) and (4-5) described above.)

D: Not reaching to a practically usable level (There is at least one D in three items (4-3), (4-4) and (4-5) described above.)

Herein, in samples 41–54, an arbitrary resin according to the manufacturing method of (1-1-1) and (1-1-2) described above, as "resin containing a polymer provided with a alicyclic structure", was applied to lens bodys A, B and C, however, in addition to this, one type of arbitrary resin containing a hydrogenated norbornene ring-opening polymer described in the above embodiment was manufactured and samples similar to samples 1–30 were prepared employing said resin as lens bodys A, B and C to be measured and evaluated with respect to characteristics or properties of the samples in a similar manner to (4-1)–(4-6) described above. The measurement and evaluation results are not shown here, however, were similar to those of samples 41–54.

TABLE 15

|  | (4-1) First layer thickness (nm) | (4-2) First layer refractive index | (4-3) Shape deformation | (4-4) Abrasion resistance | (4-5) Environmental resistance | (4-6) Overall evaluation |
|---|---|---|---|---|---|---|
| Sample 41 | 50 | 1.46 | C | B | B | C |
| Sample 42 | 80 | 1.49 | C | B | B | C |
| Sample 43 | 100 | 1.49 | B | B | A | B |
| Sample 44 | 500 | 1.46 | A | B | A | A |

TABLE 15-continued

|  | (4-1) First layer thickness (nm) | (4-2) First layer refractive index | (4-3) Shape deformation | (4-4) Abrasion resistance | (4-5) Environmental resistance | (4-6) Overall evaluation |
|---|---|---|---|---|---|---|
| Sample 45 | 12000 | 1.49 | A | A | B | A |
| Sample 46 | 15000 | 1.51 | A | B | B | B |
| Sample 47 | 87.6 | 1.46 | C | B | B | C |
| Sample 48 | 1500 | 1.46 | A | A | B | A |
| Sample 49 | 5000 | 1.46 | A | A | B | A |
| Sample 50 | 10000 | 1.46 | A | A | B | A |
| Sample 51 | 16000 | 1.46 | A | B | D | D |
| Sample 52 Comp. | 38 | 1.48 | D | D | B | D |
| Sample 53 Comp. | 16000 | 1.46 | A | B | D | D |
| Sample 54 Comp. | 155 | 1.85 | D | B | B | D |

Comp.: (Comparison)

What is claimed is:

1. An objective lens for converging a monochromatic light flux having a specific wavelength in a range of 350 to 450 nm on an optical information recording medium while the objective lens is placed facing the optical information recording medium, the objective lens comprising:
   a lens body containing a polymer resin having an alicyclic structure;
   a first film having a refractive index of less than 1.7 for light having a wavelength of 405 nm;
   a second film having a refractive index of 1.7 or more for the light having the wavelength of 405 nm; and
   a third film having a refractive index of 1.55 or less for the light having a wavelength of 405 nm,
   wherein:
   the first film, the second film and the third film are provided on the lens body;
   the first film is provided between the lens body and the second film;
   the second film is provided between the first film and the third film; and
   a thickness of the first film is in a range of 50 to 15000 nm.

2. The objective lens of claim 1, wherein the thickness of the first film is in a range of 100 to 15000 nm.

3. The objective lens of claim 1, wherein the thickness of the first film is in a range of 500 to 12000 nm.

4. The objective lens of claim 1, wherein the first film contains a material selected from the group consisting of:
   silicon oxide, magnesium fluoride, aluminum fluoride, yttrium fluoride, lead fluoride, cerium fluoride, neodymium fluoride, lanthanum fluoride, aluminum oxide and a mixture thereof.

5. The objective lens of claim 1, wherein the second film contains a material selected from the group consisting of:
   hafnium oxide, zirconium oxide, yttrium oxide, lanthanum oxide, lanthanum aluminate, lanthanum titanate, praseodymium titanate, tantalum oxide, titanium oxide, niobium oxide and a mixture thereof.

6. The objective lens of claim 1, wherein the third film contains a material selected from the group consisting of:
   silicon oxide, magnesium fluoride, aluminum fluoride, yttrium fluoride and a mixture thereof; and
   a mixture of silicon oxide and aluminum oxide.

7. The objective lens of claim 1, wherein a refractive index of the first film for the light having the wavelength of 405 nm lies within ±10% of a refractive index of the lens body for the light having the wavelength of 405 nm.

8. The objective lens of claim 1, wherein the polymer resin forming the lens body contains an alicyclic hydrocarbon copolymer having a weight average molecular weight (Mw) of 1,000 to 1,000,000, wherein the copolymer contains:
   repeat unit (a) having a alicyclic structure represented by Formula (1); and
   repeat unit (b) having a chain structure represented by Formula (2) or Formula (3),
   provided that:
   a total weight of repeat units (a) and repeat units (b) is 90% by weight or more; and
   a total weight of repeat units (b) is 1% by weight or more and less than 10% by weight,

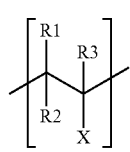

Formula (1)

-continued

Formula (2)

$$\left[ \begin{matrix} R4 \\ | \\ R5 \end{matrix} \begin{matrix} R6 \\ | \\ R7 \end{matrix} \right]$$

Formula (3)

$$\left[ \begin{matrix} R8 \\ | \\ R9 \end{matrix} \begin{matrix} R10 \\ | \\ R11 \end{matrix} \begin{matrix} R12 \\ | \\ R13 \end{matrix} \right]$$

where in Formula (1), X represents an alicyclic hydrocarbon group, R1 through R13 in Formulae (1), (2) and (3) each independently represent a hydrogen atom, a chain hydrocarbon group, a halogen atom, an alkoxy group, a hydroxyl group, an ether group, an ester group, a cyano group, an amide group, an imide group, a silyl group and a chain hydrocarbon group substituted by a polar group (a halogen atom, an alkoxy group, a hydroxyl group, an ether group, an ester group, a cyano group, an amide group, an imide group or a silyl group), and in Formula (3), "......" represents a carbon-carbon saturated bond or a carbon-carbon unsaturated bond.

9. The objective lens of claim 8, wherein the polymer resin forming the lens body contains a block polymer comprising polymer block [A] and polymer block [B], wherein:

polymer block [A] contains a first repeating unit represented by Formula (11);

polymer block [B] contains repeating units of one of the following combinations:

(i) a combination of the first repeating unit represented by Formula (11) and a second repeating unit represented by Formula (12);

(ii) a combination of the first repeating unit represented by Formula (11) and a third repeating unit represented by Formula (13); and (iii) a combination of the first repeating unit represented by Formula (11), the second repeating unit represented by Formula (12) and the third repeating unit represented by Formula (13), Formula (11)

where in Formula (11), $R^1$ represents a hydrogen atom or an alkyl group having a carbon number of 1 to 20, $R^2$ through $R^{12}$ each independently represent a hydrogen atom, an alkyl group having a carbon number of 1 to 20, a hydroxyl group, an alkoxy group having a carbon number of 1 to 20 or a halogen group, Formula (12)

$$-\left[ CH_2-\underset{R^{13}}{CH}-CH_2-CH_2 \right]-$$

where, in Formula (12), $R^{13}$ represents a hydrogen atom or an alkyl group having a carbon number of 1 to 20, Formula (13)

$$-\left[ \underset{R^{15}}{\overset{R^{14}}{|}}-CH_2 \right]-$$

where, in Formula (13), $R^{14}$ and $R^{15}$ each independently represent a hydrogen atom or an alkyl group having a carbon number of 1 to 20.

10. The objective lens of claim 1, wherein the polymer resin forming the lens body contains hydrogenated norbornene ring-opening polymer.

11. The objective lens of claim 1, wherein the lens body has thereon the first film, the second film and the third film on a surface facing to the optical information recording medium.

12. The objective lens of claim 1, wherein the lens body comprises:

a first optical element arranged at the light source side of the lens body; and a second optical element arranged at the optical information recording medium side of the lens body, wherein the second optical element has a positive paraxial power and the objective lens satisfies Formula (41) and Formula (42), $|P1/P2| \leq 0.2$  Formula (41)

$0.8 \leq d_2/f_2 \leq 1.8$  Formula (42)

wherein:

in Formula (41), P1 represents a paraxial power of the first optical element and P2 represents the paraxial power of the second optical element; and in Formula (42), $d_2$ represents a thickness of the second optical element on an optical axis and $f_2$ represents a focal length of the second optical element.

13. The objective lens of claim 1, wherein the lens body comprises:

a first optical element on a surface of the lens body facing a light source; and a second optical element on a surface of the lens body facing to the optical information recording medium, wherein the first optical element and the second optical element each has a positive paraxial power and the objective lens satisfies Formula (51) and Formula (52), $0.8 \leq NA$  Formula (51)

$0.2 \leq \beta \leq 0.5$  Formula (52)

wherein:

in Formula (51), NA represents a numerical aperture on a image side; and in Formula (52), β represents a lens magnification of the second optical element.

14. The objective lens of claim 1, wherein the lens body contains a single constituent, and the objective lens satisfies Formula (60), $$0.8 \leq d/f \leq 1.8 \qquad \text{Formula (60)}$$

where, in Formula (60), d represents a thickness of the objective lens on an optical axis, and f represents a focal length of the objective lens for a light flux having a wavelength of 405 nm.

15. An optical pickup apparatus comprising the objective lens of claim 1 and a light source emitting the monochromatic light having the specific wavelength in the range of 350 to 450 nm.

* * * * *